(12) United States Patent
Okumura et al.

(10) Patent No.: US 9,256,923 B2
(45) Date of Patent: Feb. 9, 2016

(54) IMAGE PROCESSING APPARATUS, IMAGE PROCESSING METHOD, AND PROGRAM

(71) Applicant: Sony Corporation, Tokyo (JP)

(72) Inventors: Akihiro Okumura, Kanagawa (JP); Ichiro Fujisawa, Kanagawa (JP); Katsutoshi Ando, Kanagawa (JP); Takashi Tsuchiya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 14/222,287

(22) Filed: Mar. 21, 2014

(65) Prior Publication Data
US 2014/0293083 A1 Oct. 2, 2014

(30) Foreign Application Priority Data
Mar. 29, 2013 (JP) .................................. 2013-074577

(51) Int. Cl.
*G06T 3/40* (2006.01)
(52) U.S. Cl.
CPC ............. *G06T 3/4053* (2013.01); *G06T 3/4015* (2013.01)
(58) Field of Classification Search
CPC ............................ G06T 3/4053; G06T 3/4015
See application file for complete search history.

(56) References Cited

U.S. PATENT DOCUMENTS

| 6,266,454 B1* | 7/2001 | Kondo | G06T 3/4015 375/E7.188 |
|---|---|---|---|
| 2002/0019892 A1* | 2/2002 | Kondo | G06F 3/13 710/62 |
| 2005/0111749 A1* | 5/2005 | Kondo | G06T 3/4023 382/261 |
| 2009/0161976 A1* | 6/2009 | Shiraki | G06T 5/003 382/255 |
| 2014/0293084 A1* | 10/2014 | Okumura et al. | 348/222.1 |

FOREIGN PATENT DOCUMENTS

JP 2000-341705 12/2000

* cited by examiner

*Primary Examiner* — Twyler Haskins
*Assistant Examiner* — Peter Chon
(74) *Attorney, Agent, or Firm* — Frommer Lawrence & Haug LLP; William S. Frommer

(57) ABSTRACT

An image processing apparatus includes: a representative value calculation unit that selects a designation area from a first image, and that calculates a representative value of each of the color components in the designation area, a class classification unit that performs class classification on the designation area, a coefficient reading unit that reads a coefficient that is stored in advance, a color component conversion unit that sets the pixel value relating to a predetermined pixel within the designation area to be a prediction tap, sets the pixel value of one color component, to be a reference, and converts the pixel value of each color component into a conversion value, and a product and sum calculation unit that sets the conversion value to be a variable and calculates each of the pixel values of a second image, by performing product and sum calculation which uses the coefficient which is read.

11 Claims, 35 Drawing Sheets

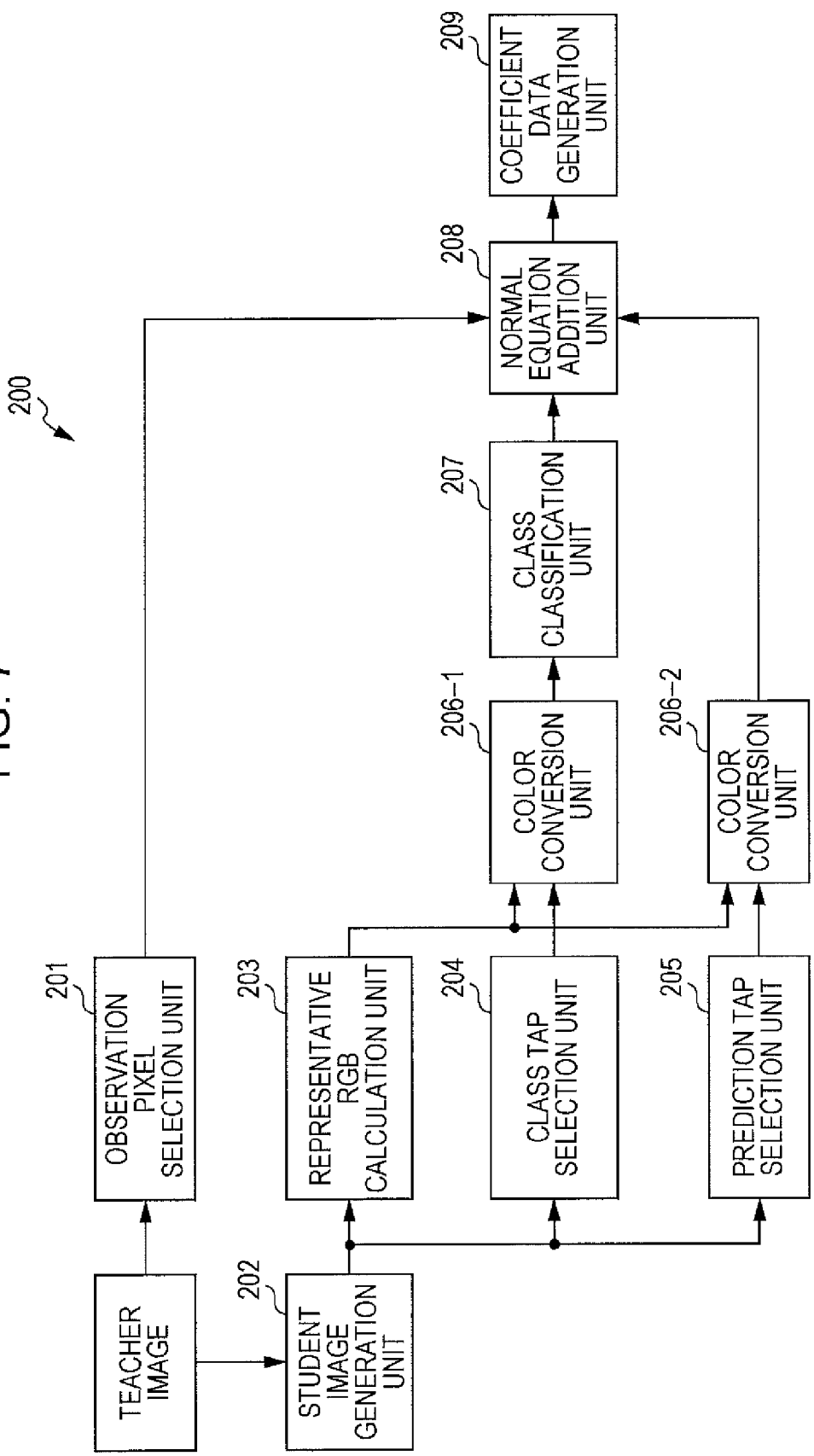

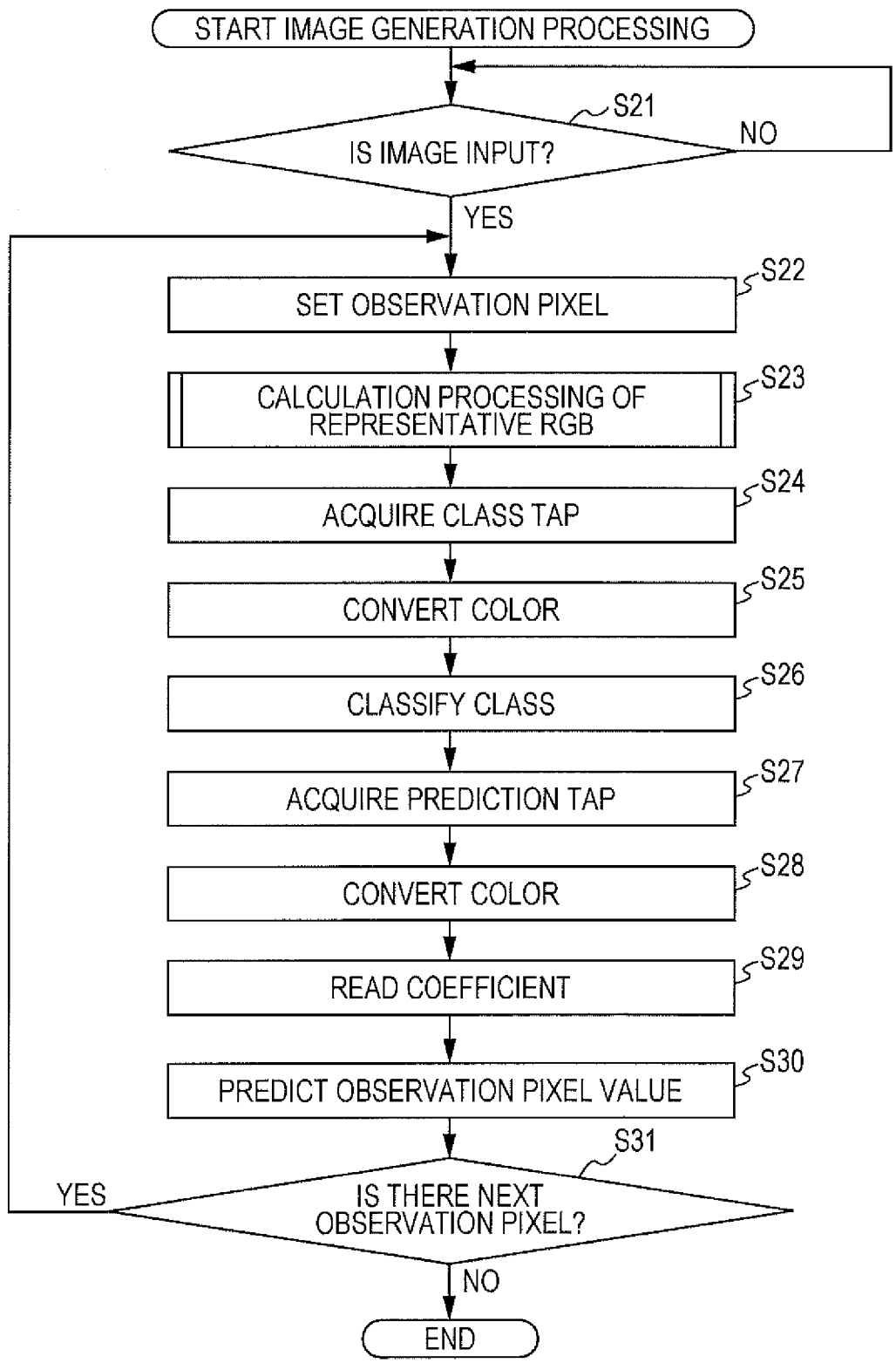

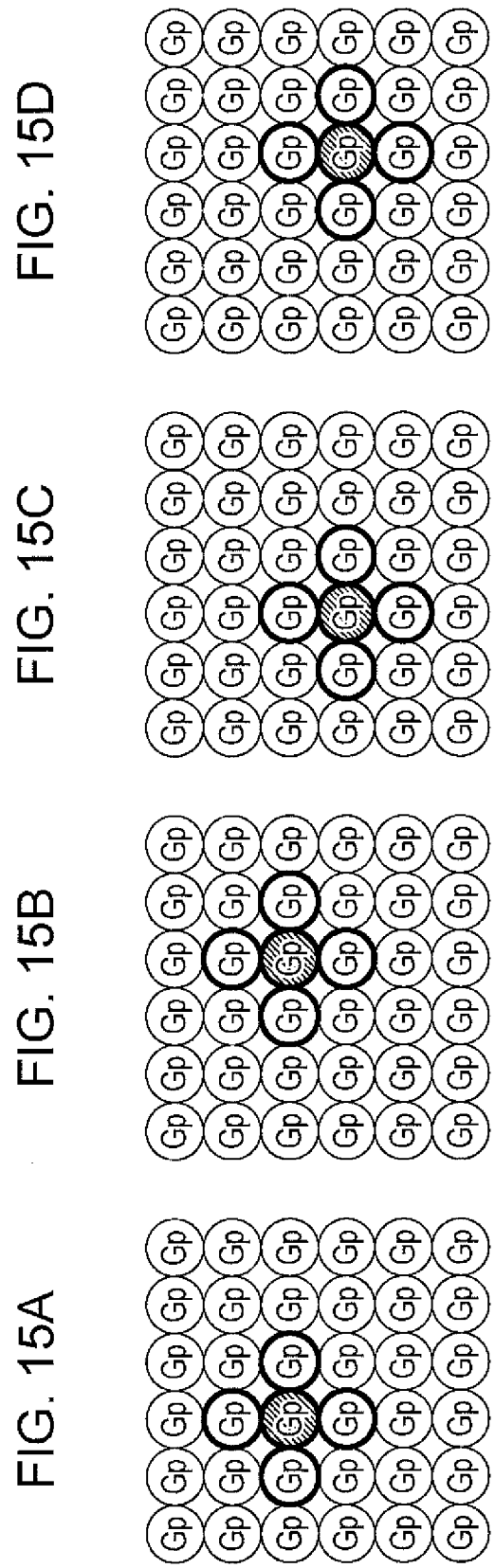

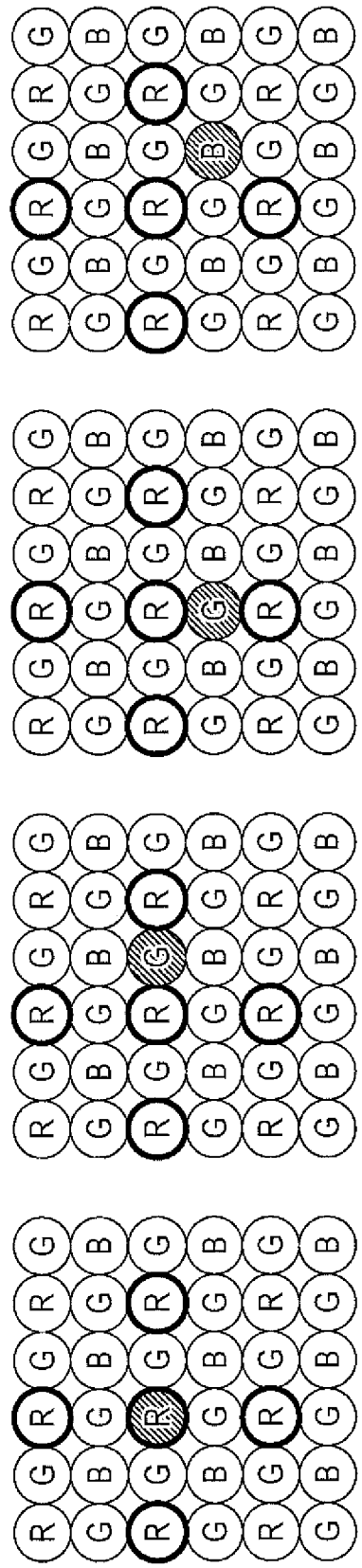

FIG. 25B
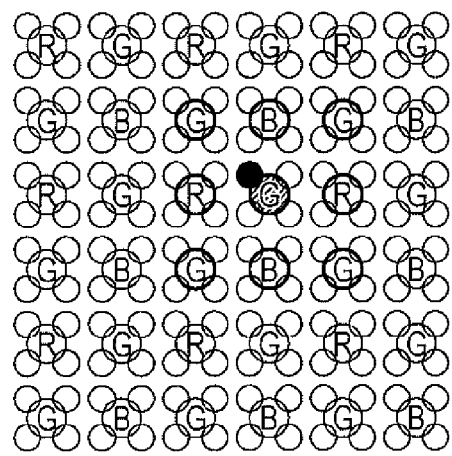 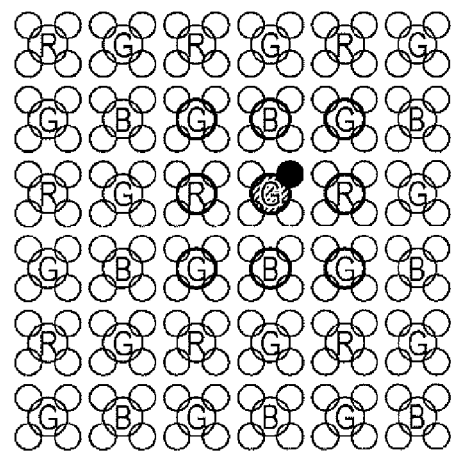
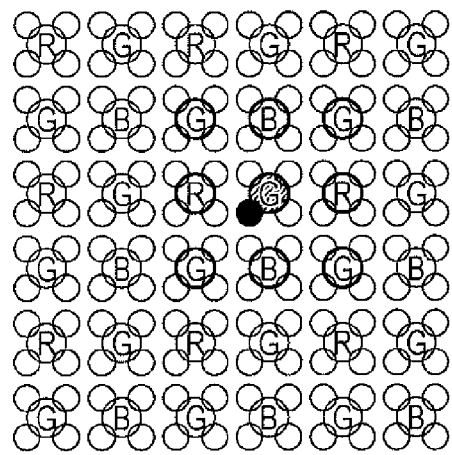 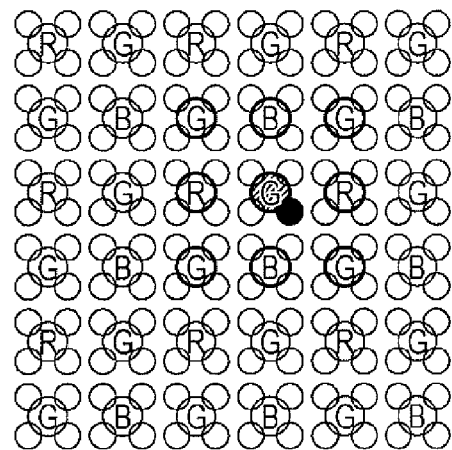

FIG. 25C
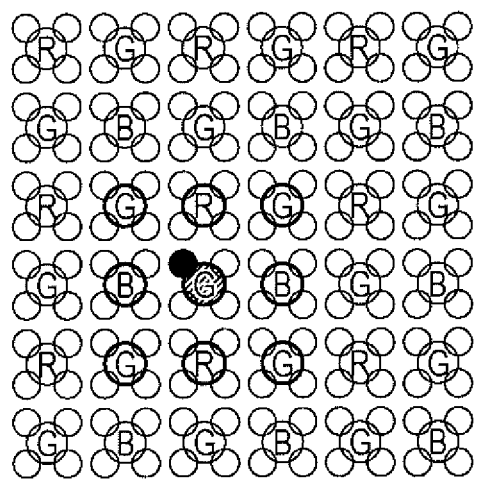
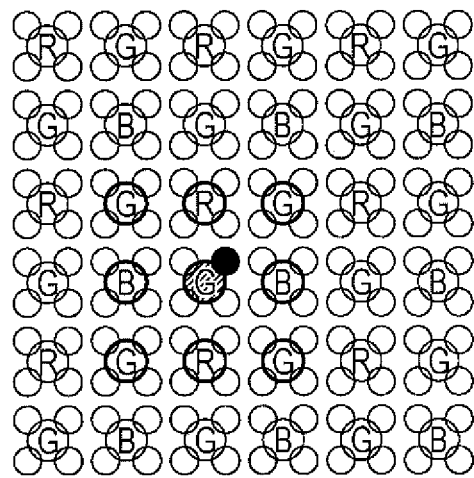
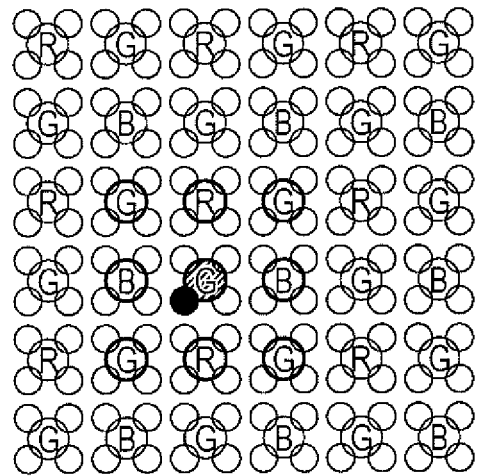
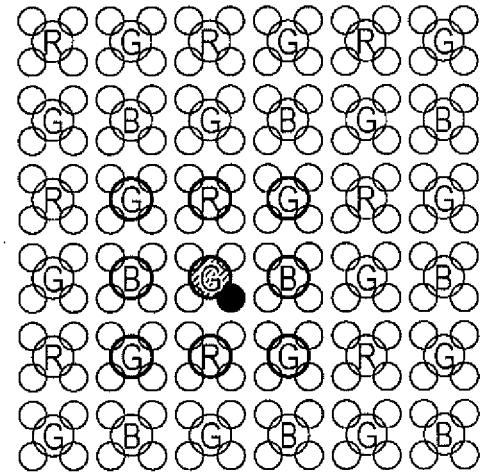

FIG. 25D
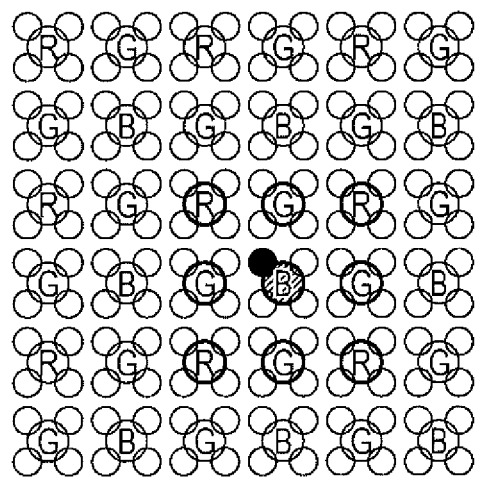
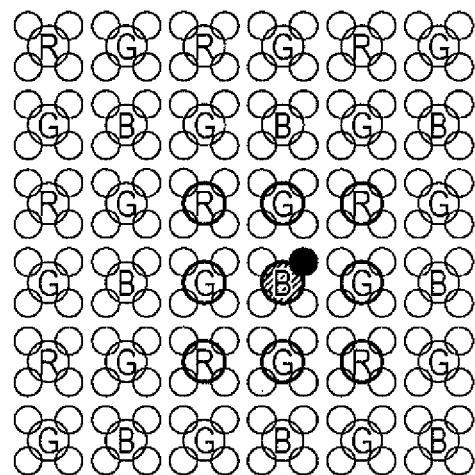
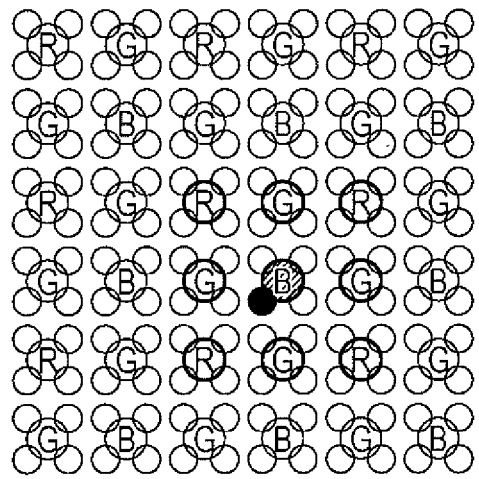
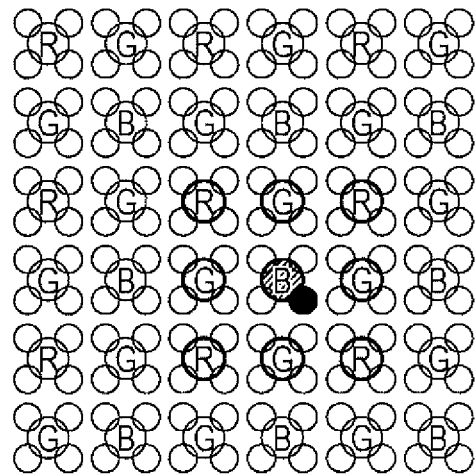

FIG. 26A
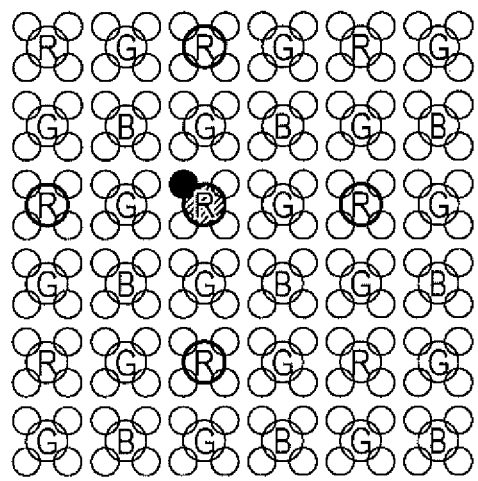
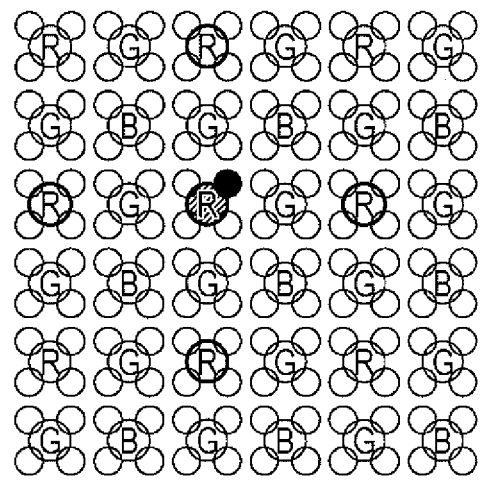
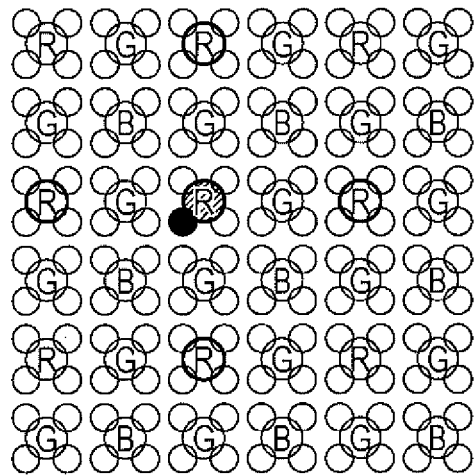
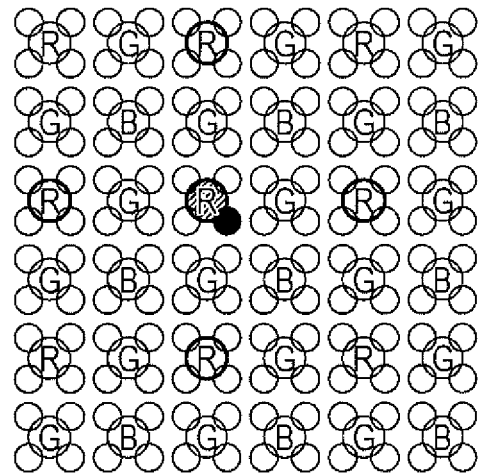

FIG. 26B
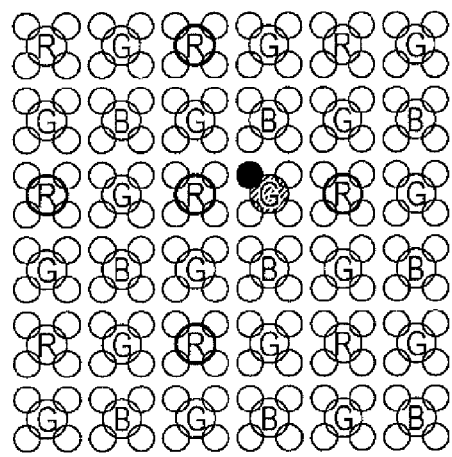
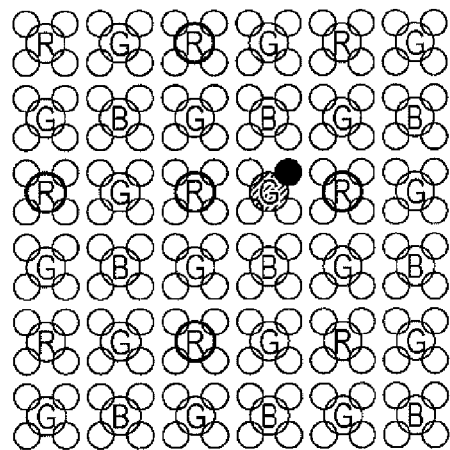
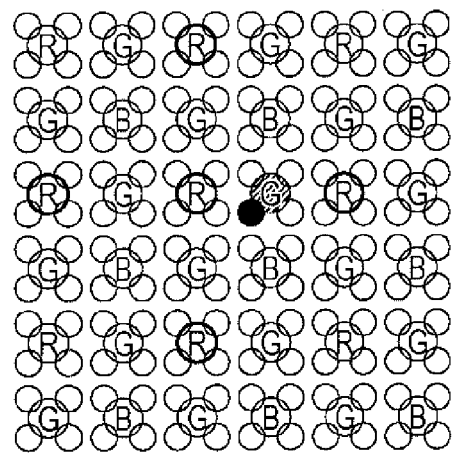
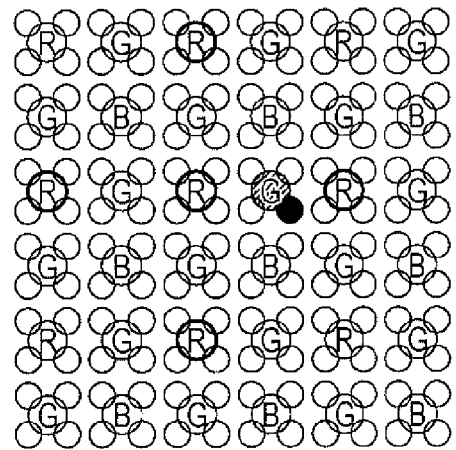

FIG. 26C
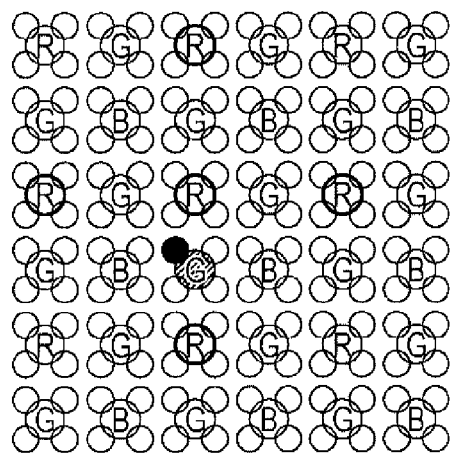
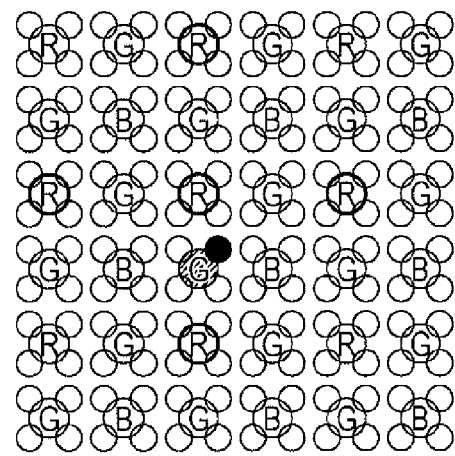
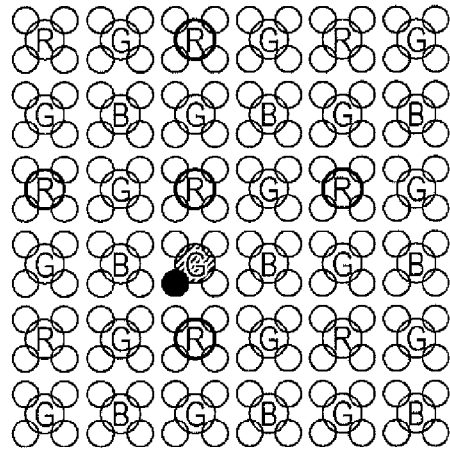
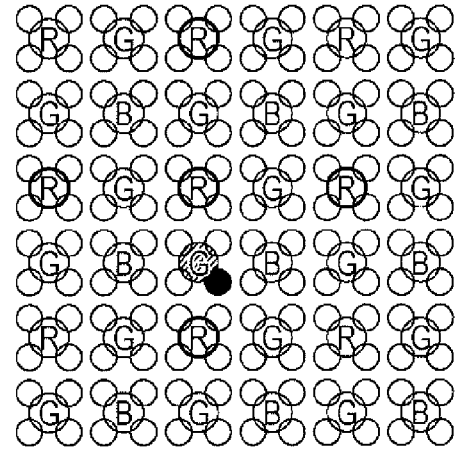

FIG. 26D
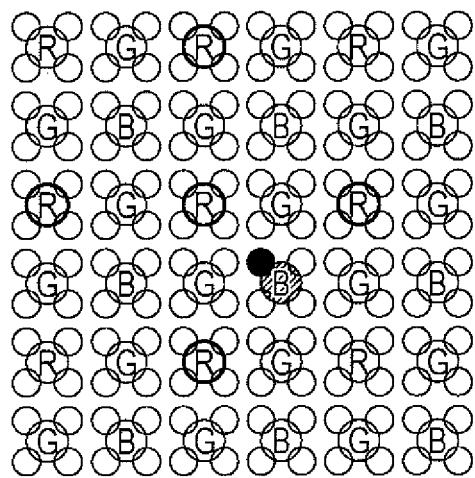
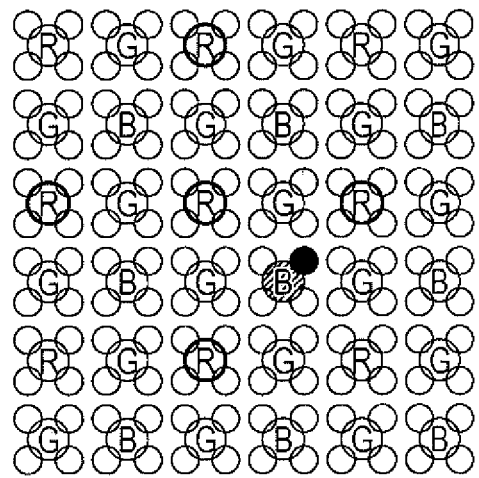
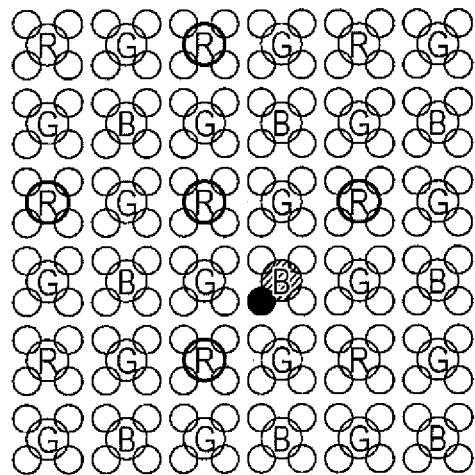
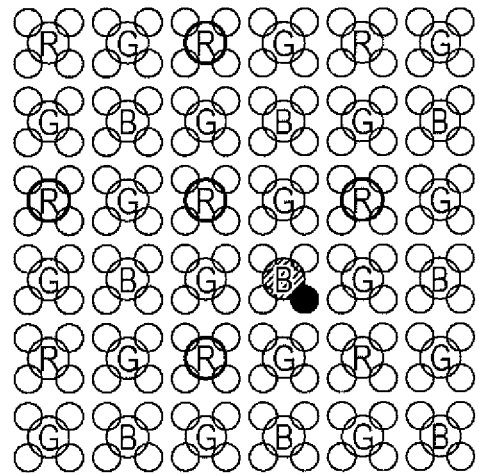

FIG. 27A
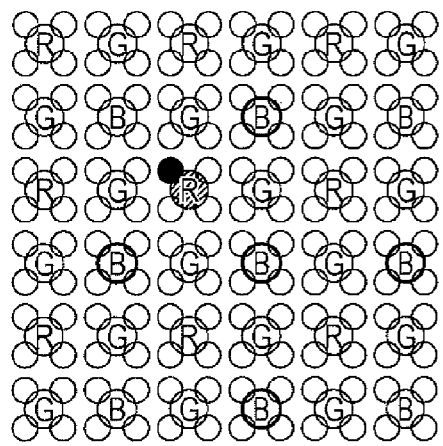
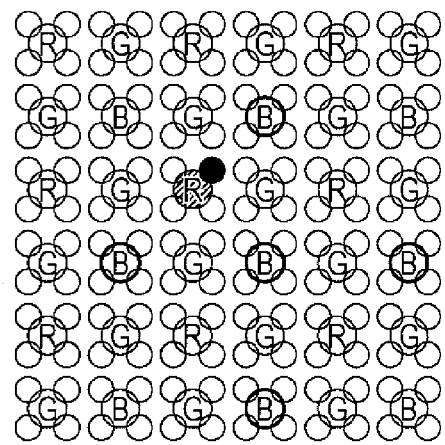
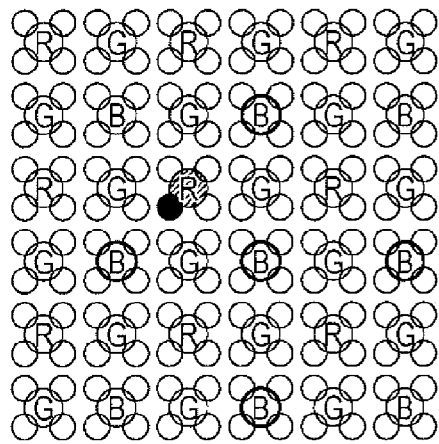
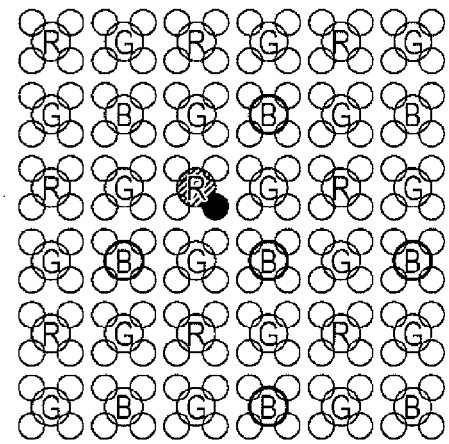

FIG. 27B
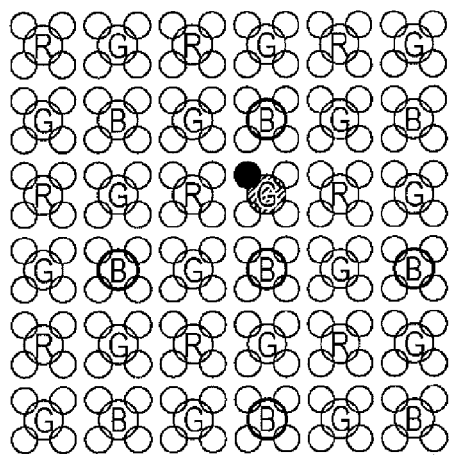
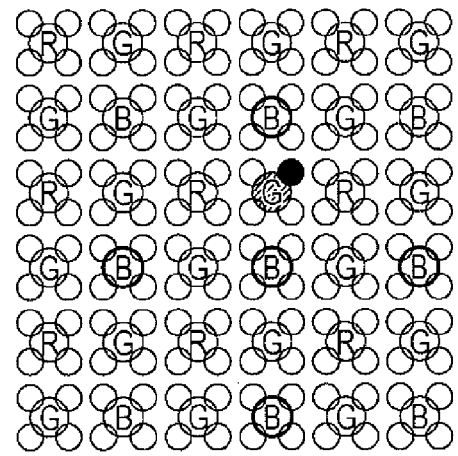
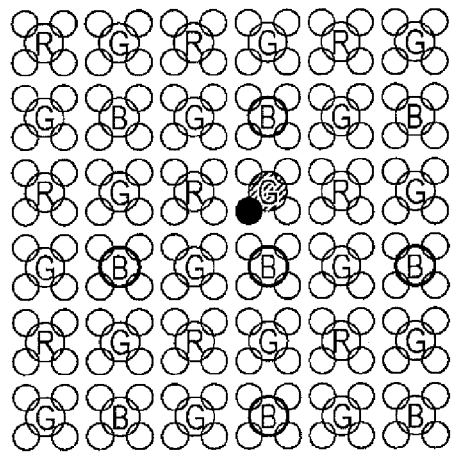
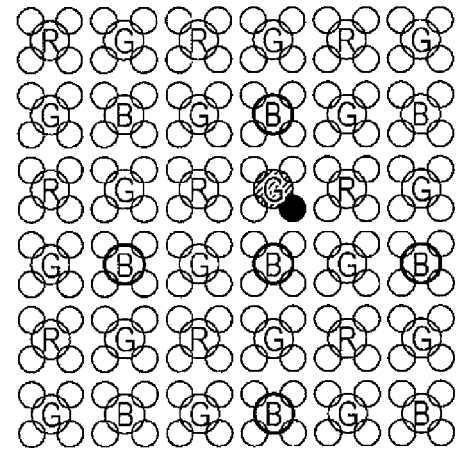

FIG. 27C
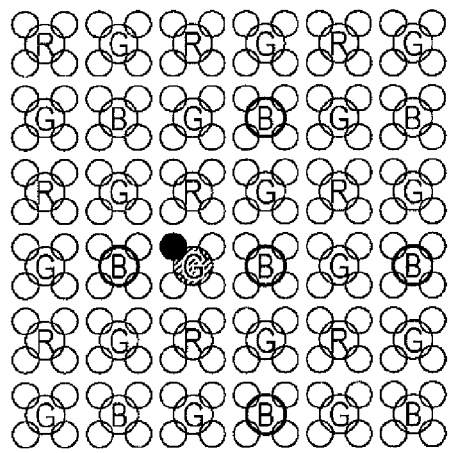
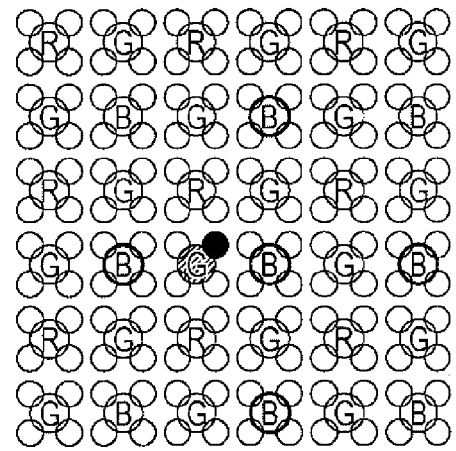
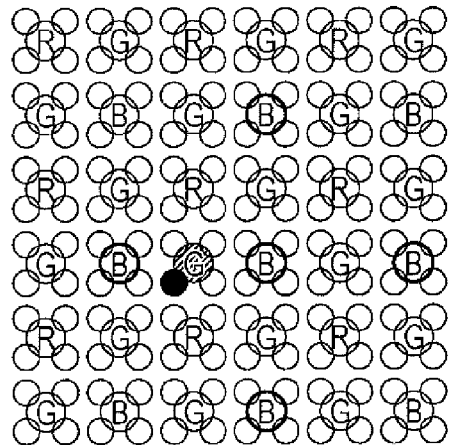
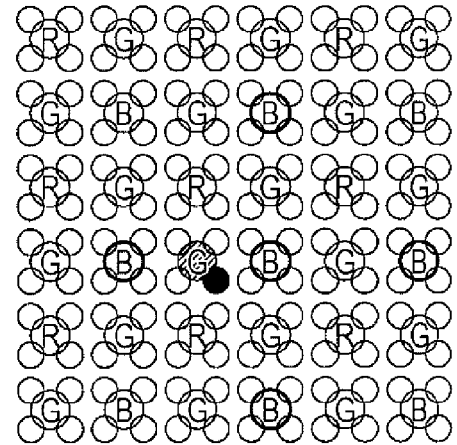

FIG. 27D
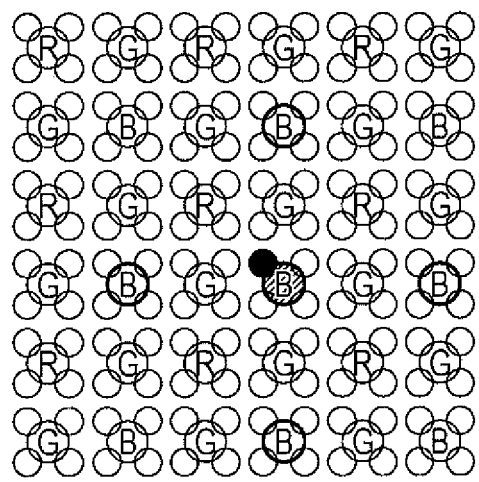
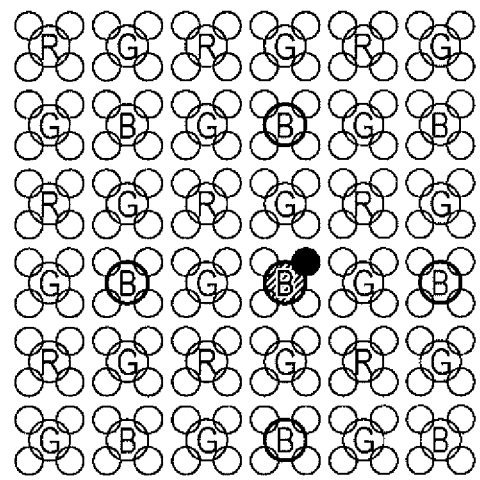
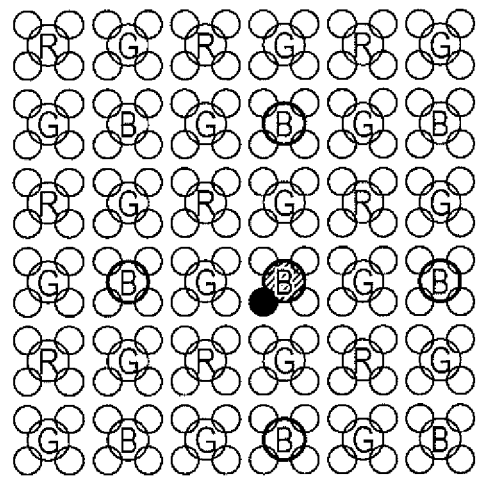
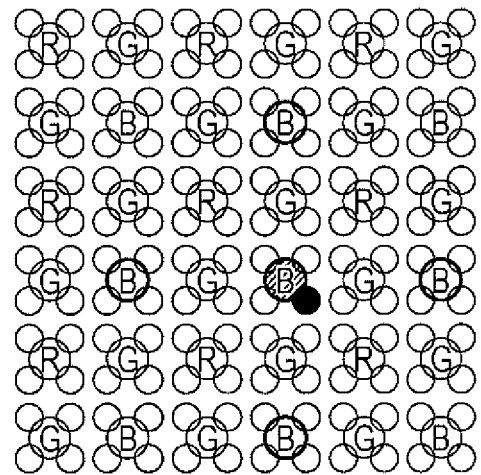

FIG. 28A
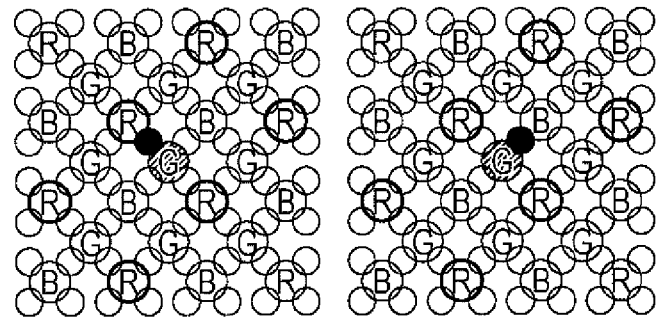
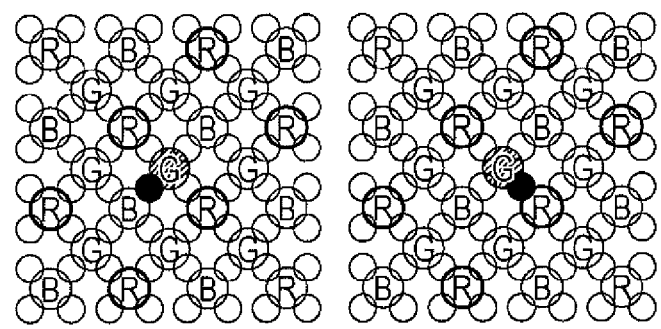
FIG. 28B
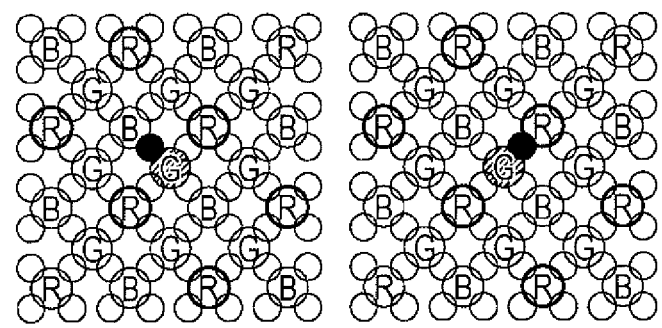
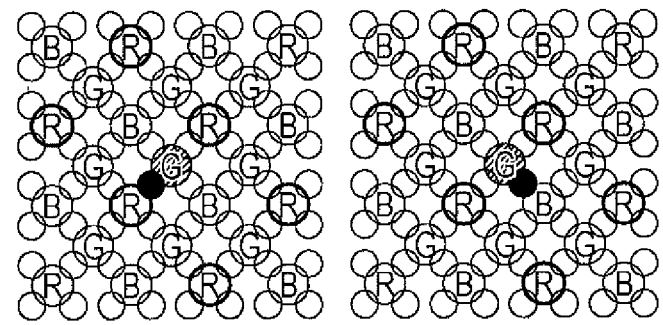

FIG. 29A
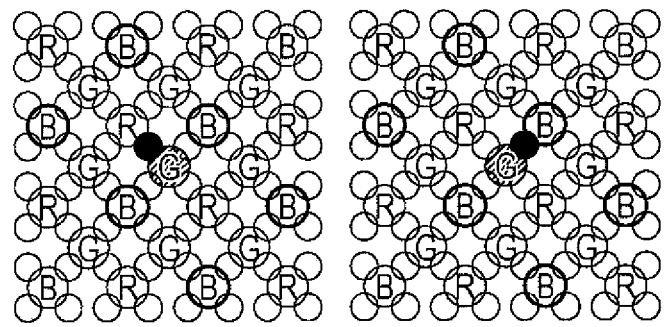
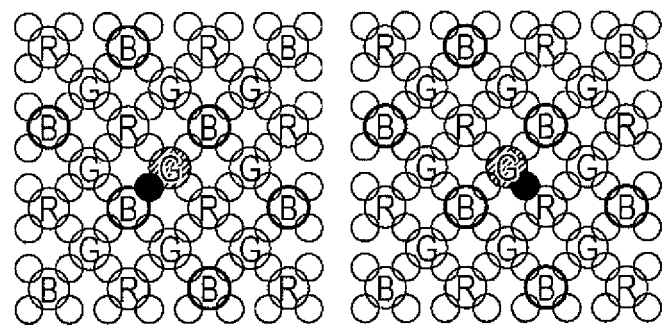
FIG. 29B
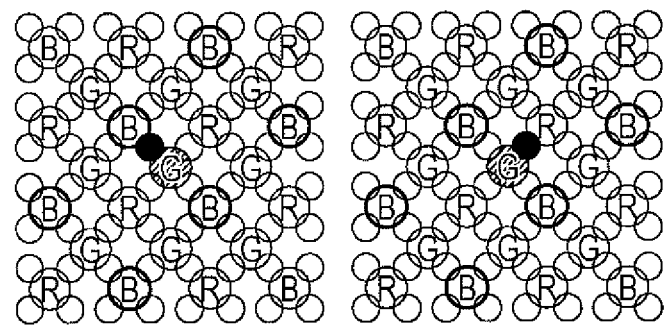
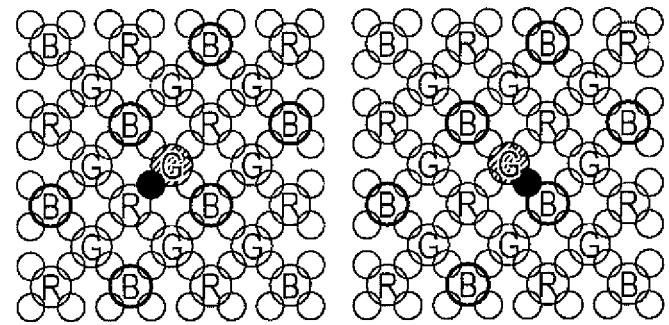

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2013-074577 filed Mar. 29, 2013, the entire contents of which are incorporated herein by reference.

BACKGROUND

The present technology relates to an image processing apparatus, an image processing method, and a program, and particularly to an image processing apparatus, an image processing method, and a program that are capable of obtaining an image signal of each color component from an output from an image sensor with a color filter array that is configured from multiple color components, without degrading image quality when performing image processing for resolution conversion.

In recent years, there has been an increasing demand for an improvement in image resolution, such as so-called 4 k2 k or 8 k4 k. However, for example, even though the size of an image sensor may be increased, it is difficult to realize sufficient improvement in resolution in terms of the size, the weight, or the like of an optical system. Furthermore, it is also difficult to increase a frame rate in terms of sensitivity of the image sensor.

Because of this, a technology has been pursued in which resolution is improved without decreasing an area of a cell of the image sensor to more than a predetermined extent. For example, a technology has been pursued in which a pixel of an output image is generated and the output image with a high resolution is obtained by performing image processing on an input image with a low resolution.

Furthermore, there are mainly two kinds of imaging apparatuses that use the image sensor. One is a one-chip apparatus (hereinafter referred to as a one-chip camera) that uses one image sensor. The other is a three-chip apparatus (hereinafter referred to as a three-chip camera) that uses three image sensors.

In the three-chip camera, for example, three image sensors are used, one for an R signal, one for a G signal, and one for a B signal, and thus three primary color signals are obtained by the three image sensors. Then, a color image signal that is generated from the three primary color signals are stored in a recording medium.

In the one-chip camera, one image sensor is used in which a color coding filter made from a color filter array assigned to every one pixel is installed in the front, and a signal of a color component that is color-coded by the color coding filter is obtained for every one pixel. As the color filter array that makes up the color coding filter, for example, primary color filter arrays for red (R), green (G), and blue (B) or complementary filter arrays for yellow (Ye), cyan (Cy), and magenta (Ma) are used. Then, in the one-chip camera, a signal of one color component is obtained for one pixel by the image sensor, a color signal other than the signal of the color component retained by each pixel is generated by performing linear interpolation processing, and thus an image close to an image that is obtained by the three-chip camera is obtained. In a video camera, a one-chip method is employed for miniaturization and weight saving.

As the color filter array that makes up the color coding filter, the color filter array in a Bayer layout is used most of the time. In the Bayer layout, G color filters are arranged in a checkered pattern and R's and B's are alternately arranged in every line on the remaining portion.

In this case, in the image sensor, from each pixel in which a filter for one color among three primary colors, R, G, and B is arranged, only an image signal corresponding to such a filter color is output. That is, from the pixel in which an R color filter is arranged, an image signal of an R component is output, but image signals for a G component and a B component are not output. In the same manner, from a G pixel, only an image signal of the G component is output and the image signals for the R component and the B component are not output. From a B pixel, only the image signal of the B component is output and the image signals for the R component and the G component are not output.

However, the image signals of the R component, the G component and the B component are necessary at the time of the processing of the signal of each pixel on the downstream side of the image processing. Accordingly, in the technology in the related art, the image signal of n×m R pixels, the image signal of n×m G pixels, and the image signal of n×m B pixels are obtained, by their respective interpolation calculations, from an output from the image sensor that is configured from n×m (n and m are positive integers) pixels, and are output to the downstream side.

Furthermore, a technology is proposed in which the image signal of 2n×2m R pixels is obtained, by the interpolation calculation, from the image signal of n×m R pixels, the image signal of 2n×2m G pixels is obtained, by the interpolation calculation, from the image signal of n×m G pixels, and the image signal of 2n×2m B pixels is obtained, by the interpolation calculation, from the image signal of n×m B pixels (for example, refer to Japanese Unexamined Patent Application Publication No. 2000-341705).

In Japanese Unexamined Patent Application Publication No. 2000-341705, pixel values for the pixel corresponding to an observation pixel and for the vicinity thereof are set to be variables in an input image, and the pixel value for the observation pixel of an output pixel is predicted by a product and sum calculation that uses a coefficient that is obtained by prior learning. By doing this, the three primary color signals can be generated from an output from the image sensor of the one-chip camera, and an image signal with pixel density four times that of an original image can be generated.

SUMMARY

Incidentally, in Japanese Unexamined Patent Application Publication No. 2000-341705, the pixel value, as is, corresponding to each of R, G, and B in the image sensor is used as a tap, a variable of prediction calculation.

However, because a correlation among the pixel values of R, G, and B is originally low, for example, even though multiple pixel values for the vicinity of the observation pixel are input as the tap, it is difficult to produce a sufficient effect in the prediction calculation.

Furthermore, in the image sensor of the one-chip camera, in order to avoid the influence of a false color, an artifact or the like, light incident on the image sensor generally is set to pass through an optical low pass filter.

However, the image fades by setting the light incident on the image sensor to pass through the optical low pass filter in this manner.

That is, in the technology in the related art, it is difficult to obtain the three primary color signals without causing image degradation, such as the fading of the image, the false color, or the artifact, in the one-chip camera.

Under this condition, it is difficult to achieve the sufficient effect because also in the image processing that obtains the output image with a high resolution from the input image with a low resolution, the image degradation, such as the false color or the artifact, that occurs at the time of the Bayer conversion is emphasized in the technology in the related art.

It is desirable to obtain an image signal of each color component from an output from an image sensor having a color filter array, that is configured from multiple color components, without degrading image quality, when image processing is performed for resolution conversion.

According to an embodiment of the present technology, there is provided an image processing apparatus including a representative value calculation unit that selects a designation area, that is an area which is configured from a predetermined number of pixels, from a first image which is configured by using an image signal which is output from a one-chip pixel unit in which pixels corresponding to each color component in multiple color components, are regularly arranged on a plane, and that calculates a representative value of each of the color components in the designation area; a class classification unit that performs class classification on the designation area, based on an amount of characteristics that are obtained from a pixel value of the designation area; a coefficient reading unit that reads a coefficient that is stored in advance, based on a result of performing the class classification; a color component conversion unit that sets the pixel value relating to a predetermined pixel within the designation area to be a prediction tap, sets the pixel value of one color component, among the multiple color components, to be a reference, and converts the pixel value of each color component of the prediction tap into a conversion value that is obtained by performing offset using the representative value; and a product and sum calculation unit that sets the conversion value to be a variable and calculates each of the pixel values of a second image which is configured from only the pixels corresponding to each color component in the multiple color components and which is an image different in resolution from the first image, by performing product and sum calculation which uses the coefficient which is read.

In the image processing apparatus, the one-chip pixel unit may be a pixel unit that has R, G, and B color components, and the representative value calculation unit may calculate an interpolation value g of the R or B pixel, based on the G pixel in the vicinity of the R or B pixel, may calculate an interpolation value r and an interpolation value b of each of the G pixels, based on the R pixel or the B pixel in the vicinity of the G pixel, may calculate the representative value of G by using an average value of an input value G obtained directly from the G pixel and the interpolation value g, may calculate the representative value of R, based on a difference between the interpolation value r and the input value G and a difference between the input value R directly obtained from the R pixel and the interpolation value g, and the representative value of the G, and may calculate the representative value of B, based on a difference between the interpolation value b and the input value G and a difference between the input value B obtained directly from the B pixel and interpolation value g, and the representative value of the G.

In the image processing apparatus, if the second image is an image that is configured from only the G pixels, the color component conversion unit may offset the input value R by using a difference between the representative value of the R and the representative value of the G, and may offset the input value B by using a difference between the representative value of the B and the representative value of the G; if the second image is an image that is configured from only the R pixels, the color component conversion unit may offset the input value G by using a difference between the representative value of the G and the representative value of the R, and may offset the input value B by using a difference between the representative value of the B and the representative value of the R; and if the second image is an image that is configured from only the B pixels, the color component conversion unit may offset the input value G by using a difference between the representative value of the G and the representative value of the B, and may offset the input value R by using a difference between the representative value of the R and the representative value of the B.

In the image processing apparatus, the one-chip image unit may be set to be a pixel unit in an oblique Bayer layout in which the pixels in the Bayer layout are obliquely arranged.

In the image processing apparatus, if the second image that is configured from only first color components is generated, among the images with the multiple color components, and the second image that is configured from only second color components different from the first color components may be generated, among the images with the multiple color components, the prediction tap may be acquired from the second image that is configured from only the first color components.

The image processing apparatus may further include a virtual color difference calculation unit that calculates a virtual color difference of the prediction tap, in which if the second image that is configured from only the second color components different from the first color components is generated among the images with the multiple color components, the product and sum calculation unit may set the virtual color difference of the prediction tap to be the variable, may calculate the virtual color difference of the second image by performing the product and sum calculation that uses the coefficient that is read, and the prediction tap that is configured from only the pixels corresponding to the second color component may be acquired from the designation area in the first image.

In the image processing apparatus, the virtual color difference calculation unit may calculate the virtual color difference by multiplying the value of the pixel that makes up the prediction tap by a matrix coefficient that is stipulated by specification for color space.

The image processing apparatus may further include a different color component conversion unit that sets the pixel value relating to a predetermined pixel within the designation area to be a class tap, sets the pixel value of one color component, among the multiple color components, to be a reference, and converts the pixel value of each color component of the class tap into a conversion value that is obtained by performing offset using the representative value, in which the class classification unit may determine an amount of characteristics of the class tap, based on the conversion value that results from the conversion by the different color component conversion unit.

In the image processing apparatus, the coefficient that is read by the coefficient reading unit may be obtained by prior learning; in the prior learning, the image that is configured by using each of the image signals that are output from the multiple pixel units, which are arranged in a position near a photographic subject, and each of which is configured from only the pixels corresponding to each of the multiple color components may be set to be a teacher image by using an optical low pass filter that is arranged between the one-chip pixel unit and the photographic subject; the image that is configured by using the image signal that is output from the one-chip pixel unit may be set to be a student image; and the coefficient may be calculated by solving a normal equation in which the pixel of the student image and the pixel of the teacher image are mapped to each other.

According to another embodiment of the present technology, there is provided an image processing method including enabling a representative value calculation unit to select a designation area that is an area which is configured from a predetermined number of pixels, from a first image which is configured by using an image signal which is output from a one-chip pixel unit in which pixels corresponding to each color component in multiple color components are regularly arranged on a plane, and to calculate a representative value of each of the color components in the designation area; enabling a class classification unit to perform class classification on the designation area, based on an amount of characteristics that are obtained from a pixel value of the designation area; enabling a coefficient reading unit to read a coefficient that is stored in advance, based on a result of performing the class classification; enabling a color component conversion unit to set the pixel value relating to a predetermined pixel within the designation area to be a prediction tap, to set the pixel value of one color component, among the multiple color components, to be a reference, and to convert the pixel value of each color component of the prediction tap into a conversion value that is obtained by performing offset using the representative value; and enabling a product and sum calculation unit to set the conversion value to be a variable and to calculate each of the pixel values of a second image which is configured from only the pixels corresponding to each color component in the multiple color components and which is an image different in resolution from the first image, by performing product and sum calculation which uses the coefficient which is read.

According to still another embodiment of the present technology, there is provided a program for causing a computer to function as an image processing apparatus including a representative value calculation unit that selects a designation area that is an area which is configured from a predetermined number of pixels, from a first image which is configured by using an image signal which is output from a one-chip pixel unit in which pixels corresponding to each color component in multiple color components are regularly arranged on a plane, and that calculates a representative value of each of the color components in the designation area; a class classification unit that performs class classification on the designation area, based on an amount of characteristics that are obtained from a pixel value of the designation area; a coefficient reading unit that reads a coefficient that is stored in advance, based on a result of performing the class classification; a color component conversion unit that sets the pixel value relating to a predetermined pixel within the designation area to be a prediction tap, sets the pixel value of one color component, among the multiple color components, to be a reference, and converts the pixel value of each color component of the prediction tap into a conversion value that is obtained by performing offset using the representative value; and a product and sum calculation unit that sets the conversion value to be a variable and calculates each of the pixel values of a second image which is configured from only the pixels corresponding to each color component in the multiple color components and which is an image which is different in resolution from the first image, by performing product and sum calculation which uses the coefficient which is read.

According to the embodiments of the present technology, a designation area, an area which is configured from a predetermined number of pixels, is selected from a first image which is configured by using an image signal which is output from a one-chip pixel unit in which pixels corresponding to each color component in multiple color components are regularly arranged on a plane, and a representative value of each of the color components in the designation area is calculated; class classification is performed on the designation area, based on an amount of characteristics that are obtained from a pixel value of the designation area; a coefficient that is stored in advance is read based on a result of performing the class classification; the pixel value relating to a predetermined pixel within the designation area is set to be a prediction tap, the pixel value of one color component, among the multiple color components, is set to be a reference, and the pixel value of each color component of the prediction tap is converted into a conversion value that is obtained by performing offset using the representative value; and the conversion value is set to be a variable and each of the pixel values of a second image which is configured from only the pixels corresponding to each color component in the multiple color components and which is an image which is different in resolution from the first image, is calculated by performing product and sum calculation which uses the coefficient which is read.

According to the present technology, an image signal of each component can be obtained from an output from an image sensor having a color filter array that is configured from multiple color components, without degrading image quality, when image processing is performed for resolution conversion.

BRIEF DESCRIPTION OF THE DRAWINGS

FIG. 7 is a block diagram illustrating a configuration example of a learning apparatus corresponding to the image processing apparatus in FIG. 2;

FIG. 9 is a flow chart describing an example of image processing by the image processing apparatus in FIG. 2;

FIGS. 15A to 15D are diagrams, each illustrating an example of the structure of the class tap or the prediction tap that is acquired in the image processing apparatus in FIG. 12;

FIGS. 17A to 17D are diagrams, each illustrating an example of the structure of the class tap or the prediction tap that is acquired in the image processing apparatus in FIG. 16;

FIGS. 25A to 25D are diagrams for describing the class tap or the prediction tap in the case of converting the resolution of the image configured from the pixels in the Bayer layout in the image processing apparatus in FIG. 16;

FIGS. 26A to 26D are diagrams for describing the class tap or the prediction tap in the case of converting the resolution of the image configured from the pixels in the Bayer layout in the image processing apparatus in FIG. 16;

FIGS. 27A to 27D are diagrams for describing the class tap or the prediction tap in the case of converting the resolution of the image configured from the pixels in the Bayer layout in the image processing apparatus in FIG. 16;

FIGS. 28A and 28B are diagrams for describing an example of the class tap or the prediction tap in the case of converting the resolution of the image configured from the pixels in the oblique Bayer layout in the image processing apparatus in FIG. 16;

FIGS. 29A and 29B are diagrams for describing an example of the class tap or the prediction tap in the case of converting the resolution of the image configured from the pixels in the oblique Bayer layout in the image processing apparatus in FIG. 16.

DETAILED DESCRIPTION OF EMBODIMENTS

Figure 1:
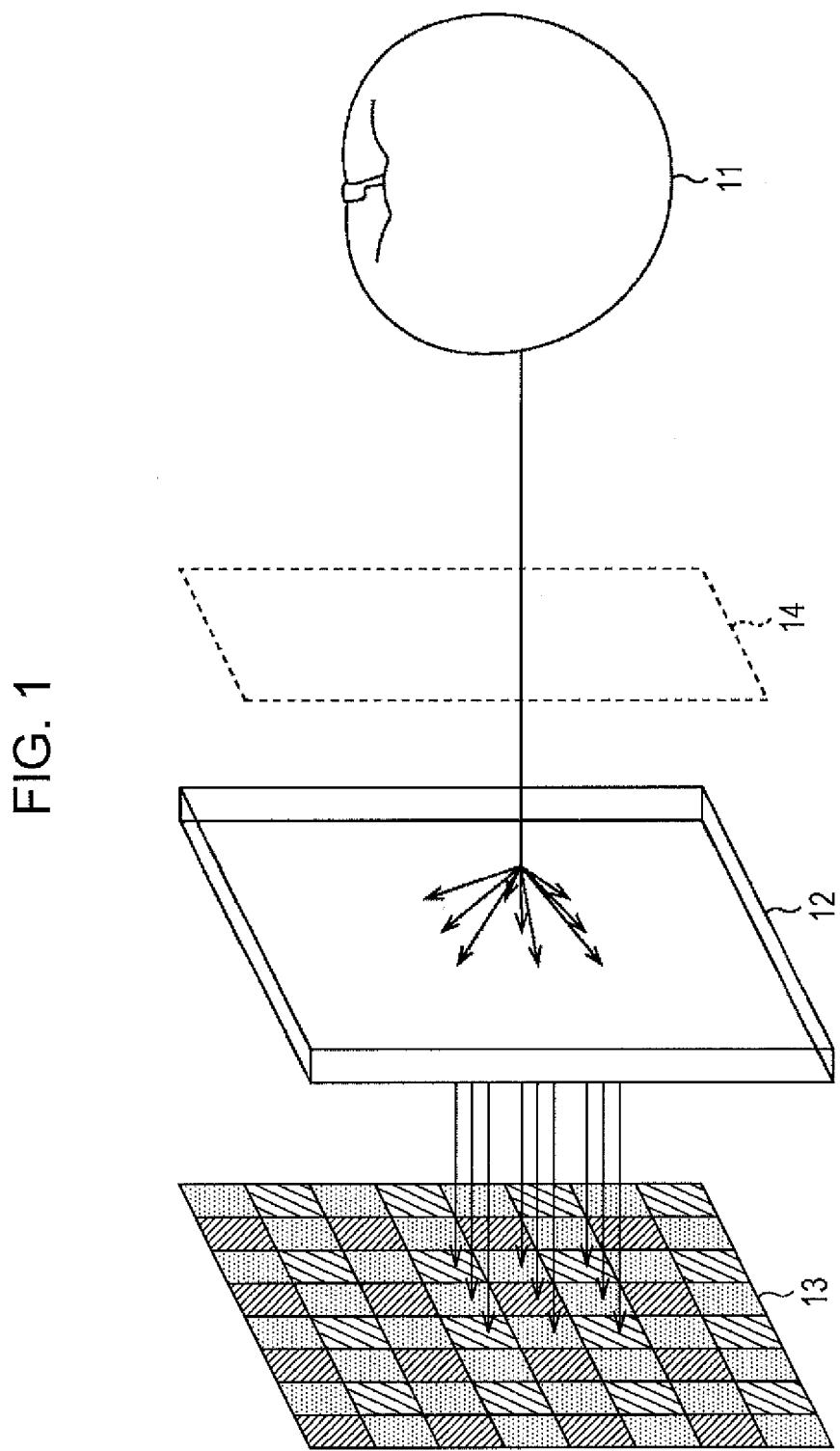
FIG. 1 is a diagram for describing a method of acquiring an image signal in an image sensor of a one-chip camera.

Embodiments of the technology disclosed in the present specification are described below referring to the drawings.

FIG. 1 is a diagram for describing a method of acquiring an image signal in a one-chip camera image sensor.

In this example, light reflected from a photographic subject 11 passes through an optical low pass filter 12 and is received by an image sensor 13.

In the one-chip camera, one image sensor is used in which a color coding filter made from a color filter array assigned to every one pixel is installed in the front, and a signal of a color component that is color-coded by the color coding filter is obtained for every one pixel.

At this point, the color filter array in a Bayer layout is used in the image sensor 13, G color filters are arranged in a checkered pattern, and R's and B's are alternately arranged in every line on the remaining portion. That is, the four pixels within a rectangular region in the image sensor 13 are configured from two G pixels, and one R pixel and one B pixel.

In one-chip camera, image signals for an R component, a G component and a B component are necessary for every pixel at the time of the processing of a signal of each pixel on the downstream side of image processing. Because of this, it is necessary to obtain the pixel values for the R component, the G component and the B component for every pixel by performing an interpolation operation, based on a pixel value that is output from the image sensor 13.

Furthermore, in the image sensor 13, in order to avoid the influence of a false color, an artifact or the like, light incident on the image sensor is set to pass through the optical low pass filter 12. However, an image fades by setting the light incident on the image sensor to pass through the optical low pass filter 12 in this manner.

Accordingly, according to the present technology, it is possible to obtain the pixel value that is obtained when three of the image sensors corresponding to the R component, the G component, and the B component, respectively, are arranged in what appears like a frame (a rectangle indicated by a dotted line in the drawing) 14, based on the pixel value that is output from the image sensor 13.

Figure 2:
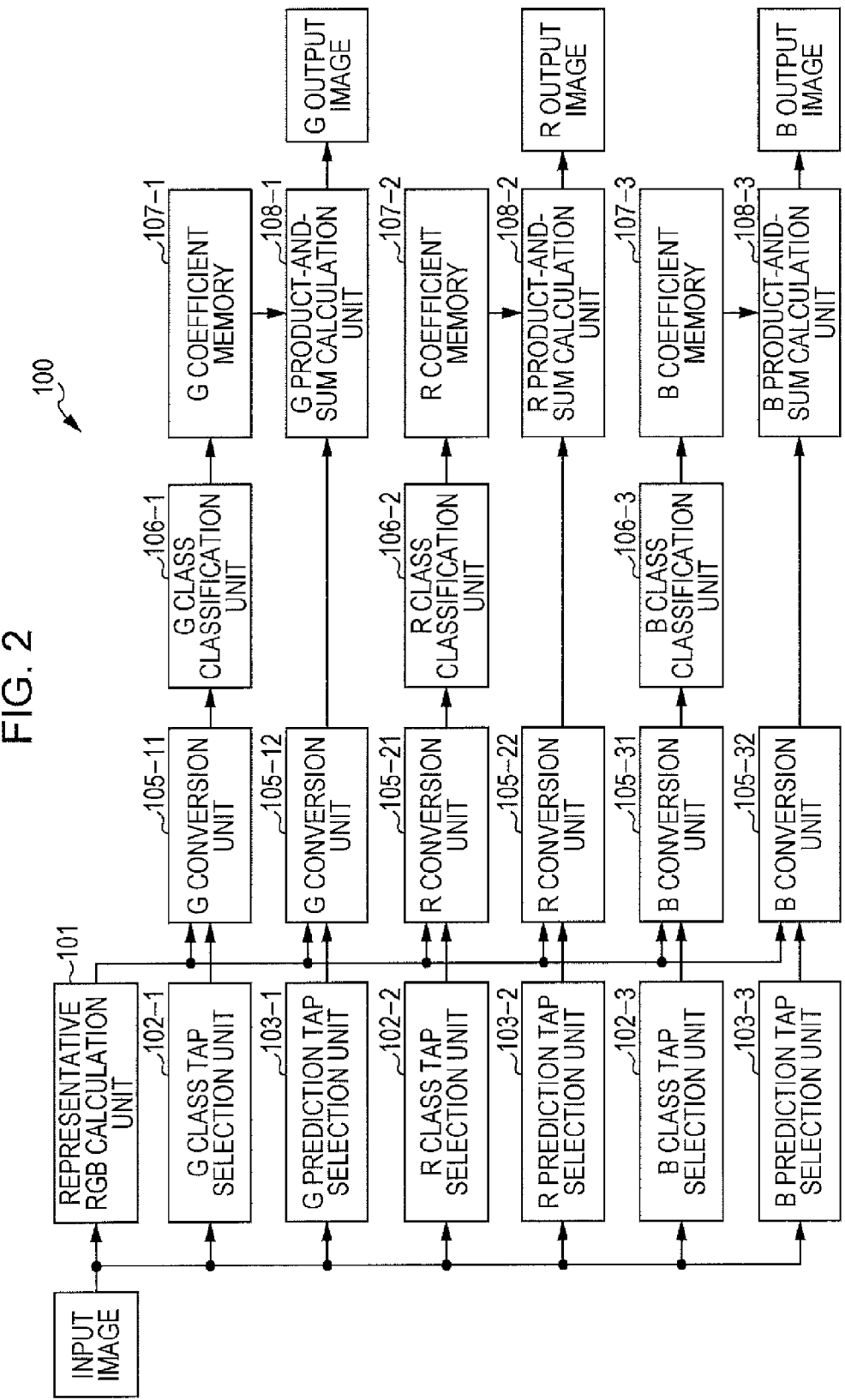
FIG. 2 is a block diagram illustrating a configuration example according to one embodiment of an image processing apparatus to which the present technology is applied.

FIG. 2 is a block diagram illustrating a configuration example according to one embodiment of an image processing device to which the present technology is applied. In the image processing apparatus 100, the pixel values for the pixel corresponding to an observation pixel and for the vicinity thereof are set to be variables in an input image, and the pixel value for the observation pixel of an output image is predicted by a product and sum calculation that uses a coefficient that is obtained by prior learning.

The input image that is input into the image processing apparatus 100, for example, is set to be an image configured with an output value for the image sensor in which the color filter array in a Bayer layout is used. That is, the input image is set to be an image corresponding to a signal that is input from the image sensor 13 in FIG. 1. Therefore, in the input image, the image signal of the R component is obtained from the pixel on which an R color filter is arranged, but the image signals of the G component and the B component are not obtained. In the same manner, only the image signal of the G component is obtained from a G pixel, the image signals of the R component and the B component are not obtained. Then, only the image signal of the B component is obtained from a B pixel and the image signals of the R component and the G component are not obtained.

The image processing apparatus 100 in FIG. 2 is configured from a representative RGB calculation unit 101, and class tap selection units that correspond to RGB colors, respectively, prediction tap selection units that correspond to the RGB colors, respectively, color conversion units that correspond to the RGB colors, respectively, class classification units that correspond to the RGB colors, respectively, coefficient memories that correspond to the RGB colors, respectively, and product and sum calculation units that correspond to the RGB colors, respectively.

In a region (referred to as a designation area) in the image for acquiring a class tap or a prediction tap described below, the representative RGB calculation unit 101 calculates Dr, Db, and Dg as representative values that are set to be references for the pixel values of the color components of R, G, and B, respectively.

Figure 3:
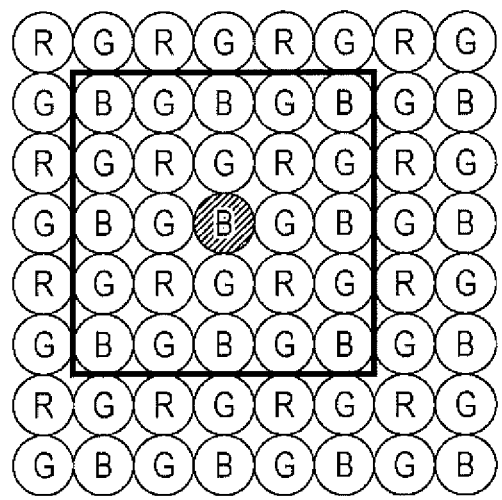
FIG. 3 is a diagram illustrating an example of a designation area.

For example, as indicated by a thick-line frame in FIG. 3, the designation area is set. In FIG. 3, each circle in the drawing represents the pixel of the input image and the pixel indicated by a hatched circle in the center is set to be a central pixel of the class tap or the prediction tap. Moreover, letters R, G, B, each of which is written within each circle, express the color component of each pixel.

The designation area, a region that includes the class tap or the prediction tap with the central pixel being set to be the center, is arbitrarily set, but when the designation area is set to be a region that largely exceeds the class tap or the prediction tap, optimal processing according to the region of the image is difficult to perform. Because of this, it is preferable that the designation area be set to be the same as the class tap or the prediction tap.

Moreover, in the following description, an average value, an interpolation value, a representative value, and the like that are calculated by an operation are properly referred to, but the pixel values of the pre-operation input image are referred to as an input value G, an input value R, and an input value B, respectively, according to the color component of each pixel in order to distinguish among the pixel values. That is, the pixel value that is obtained directly from the pixel in which the R color filter of the image sensor in the Bayer layout is arranged is set to be the input value R, the pixel value that is obtained directly from the pixel in which the G color filter of the image sensor in the Bayer layout is arranged is set to be the input value G, and the pixel value that is obtained directly from the pixel in which the B color filter of the image sensor in the Bayer layout is arranged is set to be the input value B.

In this example, the region that is surrounded by the thick line in the drawing and that is configured from 25 (=5×5) pixels with the central pixel being set to be the center is set to be the designation area.

First, the representative RGB calculation unit 101 calculates the representative value Dg of the G component.

Figure 4:
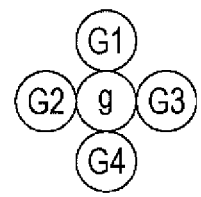
FIG. 4 is a diagram for describing an example of a method of calculating an interpolation value g.

At this time, the representative RGB calculation unit 101, as illustrated in FIG. 4, averages an input value G1 to an input value G4 of a pixel G1 to a pixel G4, the four G pixels in the vicinity (in the upward, downward, leftward, and rightward directions) of the central pixel, with an R component pixel or a B component pixel with the designation area being set to be the center, and thus calculates the interpolation value g that is a value of the interpolated G component in a pixel position of the central pixel. By doing this, the R component pixel and the B component pixel that do not have the G component in the input image have the interpolated G component (the interpolation value g).

Then, the representative RGB calculation unit 101 calculates as the representative value Dg the average value of the input values G of all the G pixels (here, 12 pieces) within the designation area and the interpolation value g.

Figure 5:
FIG. 5 is a diagram for describing an example of a method of calculating an interpolation value r.

Next, the representative RGB calculation unit 101 calculates the representative value Dr of the R component. At this time, the representative RGB calculation unit 101 calculates the interpolation value r that is a value of the interpolated R component in each pixel position of the G pixels within the designation area. For example, if the interpolation value r in the position indicated by the pixel C1 or the pixel G4 in FIG. 4 is calculated, as illustrated in FIG. 5, the average value of a pixel R1 and a pixel R2 that are positioned immediately to the left of the G pixel and immediately to the right of the G pixel, respectively, is set to be the interpolation value r.

By doing this, the input value G and the interpolation value r can be obtained in the pixel position of the G pixel within the designation area, and the input value R and the interpolation value g can be obtained in the pixel position of the R pixel within the designation area.

Then, in each pixel position, (the interpolation value r−the input value G) and (the input value R−the interpolation value g) are calculated, and the representative value Dr is calculated as a value that results from adding the representative value Dg to the average value of calculated (the interpolation value r−the input value G) and (the input value R−the interpolation value g).

Figure 6:
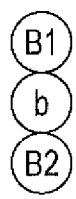
FIG. 6 is a diagram for describing an example of a method of calculating an interpolation value b.

Additionally, the representative RGB calculation unit 101 calculates the representative value Db of the B component. At this time, the representative RGB calculation unit 101 calculates an interpolation value b that is a value of the interpolated B component in each pixel position of the G pixels within the designation area. For example, if the interpolation value b in the position indicated by the pixel G1 or the pixel G4 in FIG. 4 is calculated, as illustrated in FIG. 6, the average value of a pixel B1 and a pixel B2 that are positioned immediately over the G pixel and immediately under the G pixel, respectively, is set to be the interpolation value b.

By doing this, the input value G and the interpolation value b can be obtained in the pixel position of the G pixel within the designation area, and the input value B and the interpolation value g can be obtained in the pixel position of the B pixel within the designation area.

Then, in each pixel position, (the interpolation value b−the input value G) and (the input value B−the interpolation value g) are calculated, and the representative value Db is calculated as a value that results from adding the representative value Dg to the average value of the calculated (the interpolation value b−the input value G) and the calculated (the input value B−the interpolation value g).

Referring back to FIG. 2, a G class tap selection unit 102-1 selects from the input image a G class tap that is a class tap necessary for generating a G component image and acquires the G class tap. The G class tap, for example, is configured from a predetermined number of pixels in which the pixel of the input image in the position corresponding to the observation pixel of an output image is set to be the central pixel and the central pixel is set to be the center.

The G class tap selected by the G class tap selection unit 102-1 is supplied to a G conversion unit 105-11. The G conversion unit 105-11 is set to perform G conversion processing on each pixel value that makes up the G class tap.

The G conversion processing, for example, is performed as follows. If the pixel value that makes up the G class tap is the input value G, a conversion value G' is calculated, if the pixel value that makes up the G class tap is the input value R, a conversion value R' is calculated, and if the pixel value that makes up the G class tap is the input value B, a conversion value B' is calculated.

At this point, the conversion value G', the conversion value R', and the conversion value B' are calculated using Equations (1) to (3).

$$G' = G \quad (1)$$

$$R' = R - (Dr - Dg) \quad (2)$$

$$B' = B - (Db - Dg) \quad (3)$$

Correlation between the pixel values, each of which makes up the G class tap, is increased by performing the G conversion processing. That is, the pixel value of each of the R pixel and the B pixel of the input image is offset with the pixel value of the G pixel being set to be the reference, and thus a change due to a difference in color component between the pixel values, each of which makes up the G class tap can be removed.

Referring back to FIG. 2, the G class tap that is output from the G conversion unit 105-11 is supplied to a G class classification unit 106-1. Moreover, the G class tap that is output from the G conversion unit 105-11 is configured from the conversion value G', the conversion value R', and the conversion value B' that are calculated using Equations (1) to (3) described above.

The G class classification unit 106-1 codes the supplied G class tap using adaptive dynamic range coding (ADRC), and thus generates a class code. The class code generated here is output to a G coefficient memory 107-1.

The G coefficient memory 107-1 reads the coefficient that is stored with it being mapped to the class code that is output from the G class classification unit 106-1. Then, the G coefficient memory 107-1 supplies the read coefficient to a G product and sum calculation unit 108-1. Moreover, the coefficient that is a coefficient obtained by prior learning and that is used in the product and sum calculation described below is stored in the G coefficient memory 107-1 with it being mapped to the class code.

A G prediction tap selection unit 103-1 selects from the input image a G prediction tap that is a prediction tap necessary for generating the G component image and acquires the G prediction tap. The G prediction tap, for example, is configured from a predetermined number of pixels in which the pixel of the input image in the position corresponding to the observation pixel of the output image is set to be the central pixel and the central pixel is set to be the center.

The G prediction tap selected by the G prediction tap selection unit 103-1 is supplied to a G conversion unit 105-12. The G conversion unit 105-12 is set to perform the G conversion processing on each pixel value that makes up the G prediction tap.

The G conversion processing by the G conversion unit 105-12 is the same as that by the G conversion unit 105-11. That is, using Equations (1) to (3) described above, if the pixel value that makes up the G prediction tap is the input value G, the conversion value G' is calculated, if the pixel value that makes up the G prediction tap is the input value R, the conversion value R' is calculated, and if the pixel value that makes up the G prediction tap is the input value B, the conversion value B' is calculated.

The G prediction tap that is output from the G conversion unit 105-12 is supplied to the G product and sum calculation unit 108-1. Moreover, the G prediction tap that is output from the G conversion unit 105-12 is configured from the conversion value G', the conversion value R', and the conversion value B' that are calculated using Equations (1) to (3) described above.

The G product and sum calculation unit 108-1 substitutes the G prediction tap, as the variable, which is output from the G conversion unit 105-12 in a pre-constructed linear simple equation, and performs a prediction value operation using the coefficient that is supplied from the G coefficient memory 107-1. That is, the G product and sum calculation unit 108-1 performs prediction calculation on the pixel value of the observation pixel in the G component image (referred to as a G output image) that becomes the output image, based on the G prediction tap.

At this point, the prediction calculation of the pixel value of the observation pixel of the output image is described.

Now, for example, image data that is output from the image sensor that has the color filter array in the Bayer layout is defined as first image data, and the image data that is output from the G component image sensor that is arranged in a frame 14 in FIG. 1 is defined as second image data. Then, it is considered that the pixel values of the second image data are obtained from the pixel values of the first image data using predetermined prediction calculation.

When for example, linear simple prediction calculation, as the predetermined prediction calculation, is set to be employed, a pixel value y of the pixel of the second image data (hereinafter suitably referred to as the pixel of the second image) is obtained using the following linear simple expression.

$$y = \sum_{n=1}^{N} w_n x_n \tag{4}$$

However, in Equation (4), $x_n$ indicates the pixel value of the pixel (hereinafter properly referred to as the pixel of a first image) of n-th first image data, which makes up the prediction tap for a pixel y of a second image, and $w_n$ indicates an n-th tap coefficient that is multiplied by the pixel (the pixel value of) of an n-th first image. Moreover, in Equation (4), the prediction tap is configured from the n pixels $x_1$, $x_2$, and so forth up to $x_N$ of the first image.

At this point, the pixel value y of the pixel of the second image can be obtained also by a quadratic or higher equation, not the linear simple equation expressed in Equation (4).

Now, when a true value of the pixel value of the pixel of the second image in a k-th sample is indicated by $y_k$ and a prediction value of the true value $y_k$ thereof that is obtained by Equation (4) is $y_k'$, a prediction error $e_k$ thereof is expressed by the following equation.

$$e_k = y_k - y_k' \tag{5}$$

Now, because the prediction value $y_k'$ in Equation (5) is obtained according to Equation (4), when $y_k'$ in Equation (5) is replaced according to Equation (4), the following equation is obtained.

$$e_k = y_k - \left( \sum_{n=1}^{N} w_n x_{n,k} \right) \tag{6}$$

However, in Equation (6), $x_{n,k}$ indicates the pixel of the n-th first image that makes up the prediction tap for the pixel of the second image in the k-th sample.

A tap coefficient $w_n$ that sets the prediction error $e_k$ in Equation (6) (or Equation (5)) to be 0 is optimal when predicting the pixel of the second image, but generally it is difficult to obtain the tap coefficient $w_n$ for all pixels of all the second images.

Accordingly, when a least-squares method, for example, is employed as a standard for indicating that the tap coefficient $w_n$ is optimal, the optimal tap coefficient $w_n$ can be obtained by minimizing a sum total E of square errors that is expressed by the following equation.

$$E = \sum_{k=1}^{K} e_k^2 \qquad (7)$$

However, in Equation (7), K indicates the number (the number of learning samples) of samples of sets of a pixel $y_k$ of the second image and pixels $x_{1,k}$, $x_{2,k}$, and so forth up to $x_{N,k}$ of the first image, each of which makes up the prediction tap for the pixel $y_k$ of the second image.

A minimum value (the smallest value) of the sum total E of the square error in Equation (7), as illustrated in Equation (8), is given by $w_n$ that sets a result of partially differentiating the sum total E with the tap coefficient $w_n$ to be 0.

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \ (n = 1, 2, \ldots, N) \qquad (8)$$

Accordingly, when Equation (6) described above is partially differentiated with the tap coefficient $w_n$, the following equation is obtained.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \ (k = 1, 2, \ldots, K) \qquad (9)$$

The following equation is obtained from Equations (8) and (9).

$$\sum_{k=1}^{K} e_k x_1, k = 0, \sum_{k=1}^{K} e_k x_2, k = 0, \ldots \sum_{k=1}^{K} e_k x_N, k = 0 \qquad (10)$$

Equation (10) can be expressed by a normal equation expressed in Equation (11) when Equation (6) is substituted for $e_k$ in Equation (10).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \qquad (11)$$

The normal equation in Equation (11), for example, can be solved for the tap coefficient $w_n$ using a sweep-out method (a Gauss-Jordan elimination method) and the like.

The optimal tap coefficient $w_n$ (here, the tap coefficient that minimizes the sum total E of the square error) can be obtained for every class by making and solving the normal equation in Equation (11) for every class. For example, the tap coefficient $w_n$ that is obtained in this manner is stored, as a G coefficient, in the G coefficient memory 107-1. Moreover, a method of obtaining the coefficient by prior learning is described in detail below.

For example, the G prediction tap that goes through the processing by the G conversion unit 105-12 is substituted for pixels $x_1$, $x_2$, and so forth up to $x_N$ in Equation (4), the tap coefficient $w_n$ in Equation (4) is supplied from the G coefficient memory 107-1, and the operation in Equation (4) is performed in the G product and sum calculation unit 108-1. Thus, the pixel value of an observation image of the output image is predicted.

In this manner, the G output image can be obtained by predicting each observation pixel.

An R class tap selection unit 102-2 selects from the input image an R class tap that is a class tap necessary for generating an R component image and acquires the R class tap. The R class tap, for example, is configured from a predetermined number of pixels in which the pixel of the input image in the position corresponding to the observation pixel of the output image is set to be the central pixel and the central pixel is set to be the center.

The R class tap selected by the R class tap selection unit 102-2 is supplied to an R conversion unit 105-21. The R conversion unit 105-21 performs R conversion processing on each pixel value that makes up the R class tap.

The R conversion processing, for example, is performed as follows. If the pixel value that makes up the R class tap is the input value G, the conversion value G' is calculated, if the pixel value that makes up the R class tap is the input value R, the conversion value R' is calculated, and if the pixel value that makes up the R class tap is the input value B, the conversion value B' is calculated.

At this point, the conversion value G', the conversion value R', and the conversion value B' are calculated using Equations (12) to (14).

$$G'=G-(Dg-Dr) \qquad (12)$$

$$R'=R \qquad (13)$$

$$B'=B-(Db-Dr) \qquad (14)$$

The correlation between the pixel values, each of which makes up the R class tap, is increased by performing the R conversion processing. That is, the pixel value of each of the G pixel and the B pixel of the input image is offset with the pixel value of the R pixel being set to be the reference, and thus the change due to the difference in color component between the pixel values, each of which makes up the R class tap, can be removed.

Referring back to FIG. 2, the R class tap that is output from the R conversion unit 105-21 is supplied to an R class classification unit 106-2. Moreover, the R class tap that is output from the R conversion unit 105-21 is configured from the conversion value G', the conversion value R', and the conversion value B' that are calculated using Equations (12) to (14) described above.

The R class classification unit 106-2 codes the supplied R class tap by performing the adaptive dynamic range coding (ADRC), and thus generates a class code. The class code generated here is output to the R coefficient memory 107-2.

The R coefficient memory 107-2 reads the coefficient that is stored with it being mapped to the class code that is output from the R class classification unit 106-2. Then, the R coefficient memory 107-2 supplies the read coefficient to an R product and sum calculation unit 108-2. Moreover, the coefficient that is a coefficient obtained by prior learning and that is used in the product and sum calculation described below is stored in the R coefficient memory 107-2 with it being mapped to the class code.

An R prediction tap selection unit 103-2 selects from the input image an R prediction tap that is a prediction tap necessary for generating the R component image and acquires the R prediction tap. The R prediction tap, for example, is configured from a predetermined number of pixels in which the pixel of the input image in the position corresponding to the observation pixel of the output image is set to be the central pixel and the central pixel is set to be the center.

The R prediction tap selected by the R prediction tap selection unit 103-2 is supplied to an R conversion unit 105-22. The R conversion unit 105-22 performs the R conversion processing on each pixel value that makes up the R prediction tap.

The R conversion processing by the R conversion unit 105-22 is the same as that by the R conversion unit 105-21. That is, using Equations (12) to (14) described above, if the pixel value that makes up the R prediction tap is the input value G, the conversion value G' is calculated, if the pixel value that makes up the R prediction tap is the input value R, the conversion value R' is calculated, and if the pixel value that makes up the R prediction tap is the input value B, the conversion value B' is calculated.

The R prediction tap that is output from the R conversion unit 105-22 is supplied to the R product and sum calculation unit 108-2. Moreover, the R prediction tap that is output from the R conversion unit 105-21 is configured from the conversion value G', the conversion value R', and the conversion value B' that are calculated using Equations (12) to (14) described above.

The R product and sum calculation unit 108-2 substitutes the R prediction tap, as the variable, which is output from the R conversion unit 105-22 in the pre-constructed linear simple equation, and performs the prediction value operation using the coefficient that is supplied from the R coefficient memory 107-2. That is, the R product and sum calculation unit 108-2 performs the prediction calculation on the pixel value of the observation pixel in the R component image (referred to as an R output image) that becomes the output image, based on the R prediction tap.

For example, the R prediction tap that goes through the processing by the R conversion unit 105-22 is substituted for the pixels $x_1$, $x_2$, and so forth up to $x_N$ in Equation (4), the tap coefficient $w_n$ in Equation (4) is supplied from the R coefficient memory 107-2, and the operation in Equation (4) is performed in the R product and sum calculation unit 108-2. Thus, the pixel value of the observation image of the output image is predicted.

In this manner, the R output image can be obtained by predicting each observation pixel.

A B class tap selection unit 102-3 selects from the input image a B class tap that is a class tap necessary for generating a B component image and acquires the B class tap. The B class tap, for example, is configured from a predetermined number of pixels in which the pixel of the input image in the position corresponding to the observation pixel of the output image is set to be the central pixel and the central pixel is set to be the center.

The B class tap selected by the B class tap selection unit 102-3 is supplied to a B conversion unit 105-31. The B conversion unit 105-31 performs B conversion processing on each pixel value that makes up the B class tap.

The B conversion processing, for example, is performed as follows. If the pixel value that makes up the B class tap is the input value G, the conversion value G' is calculated, if the pixel value that makes up the B class tap is the input value R, the conversion value R' is calculated, and if the pixel value that makes up the B class tap is the input value B, the conversion value B' is calculated.

At this point, the conversion value G', the conversion value R', and the conversion value B' are calculated using Equations (15) to (17).

$$G'=G-(Dg-Db) \tag{15}$$

$$R'=R-(Dr-Db) \tag{16}$$

$$B'=B \tag{17}$$

The correlation between the pixel values, each of which makes up the B class tap, is increased by performing the B conversion processing. That is, the pixel value of each of the G pixel and the R pixel of the input image is offset with the pixel value of the B pixel being set to be the reference, and thus the change due to the difference in color component between the pixel values, each of which makes up the B class tap can be removed.

Referring back to FIG. 2, the B class tap that is output from the B conversion unit 105-31 is supplied to a B class classification unit 106-3. Moreover, the B class tap that is output from the B conversion unit 105-31 is configured from the conversion value G', the conversion value R', and the conversion value B' that are calculated using Equations (15) to (17) described above.

The B class classification unit 106-3 codes the supplied B class tap by performing the adaptive dynamic range coding (ADRC), and thus generates a class code. The class code generated here is output to the B coefficient memory 107-3.

The B coefficient memory 107-3 reads the coefficient that is stored with it being mapped to the class code that is output from the B class classification unit 106-3. Then, the B coefficient memory 107-3 supplies the read coefficient to a B product and sum calculation unit 108-3. Moreover, the coefficient that is a coefficient obtained by prior learning and that is used in the product and sum calculation described below is stored in the B coefficient memory 107-3 with it being mapped to the class code.

A B prediction tap selection unit 103-3 selects from the input image a B prediction tap that is a prediction tap necessary for generating the B component image and acquires the B prediction tap. The B prediction tap, for example, is configured from a predetermined number of pixels in which the pixel of the input image in the position corresponding to the observation pixel of the output image is set to be the central pixel and the central pixel is set to be the center.

The B prediction tap selected by the B prediction tap selection unit 103-3 is supplied to a B conversion unit 105-32. The B conversion unit 105-32 performs the B conversion processing on each pixel value that makes up the B prediction tap.

The B conversion processing by the B conversion unit 105-32 is the same as that by the B conversion unit 105-31. That is, using Equations (15) to (17) described above, if the pixel value that makes up the B prediction tap is the input value G, the conversion value G' is calculated, if the pixel value that makes up the B prediction tap is the input value R, the conversion value R' is calculated, and if the pixel value that makes up the B prediction tap is the input value B, the conversion value B' is calculated.

The B prediction tap that is output from the B conversion unit 105-32 is supplied to the B product and sum calculation unit 108-3. Moreover, the B prediction tap that is output from the B conversion unit 105-31 is configured from the conversion value G', the conversion value R', and the conversion value B' that are calculated using Equations (15) to (17) described above.

The B product and sum calculation unit 108-3 substitutes the B prediction tap, as the variable, which is output from the B conversion unit 105-32 in the pre-constructed linear simple equation, and performs the prediction value operation using the coefficient that is supplied from the B coefficient memory 107-3. That is, the B product and sum calculation unit 108-3 performs prediction calculation on the pixel value of the observation pixel in the B component image (referred to as a B output image) that becomes the output image, based on the B prediction tap.

For example, the B prediction tap that goes through the processing by the B conversion unit 105-32 is substituted for the pixels $x_1$, $x_2$, and so forth up to $x_N$ in Equation (4), the tap coefficient $w_n$ in Equation (4) is supplied from the B coefficient memory 107-3, and the operation in Equation (4) is performed in the B product and sum calculation unit 108-3. Thus, the pixel value of the observation image of the output image is predicted.

In this manner, the B output image can be obtained by predicting each observation pixel.

Next, the performing of the learning on the coefficient that is stored in the G coefficient memory 107-1, the R coefficient memory 107-2, and the B coefficient memory 107-3 is described.

FIG. 7 is a block diagram illustrating a configuration example of a learning apparatus corresponding to the image processing apparatus 100 in FIG. 2.

As illustrated in FIG. 7, a learning apparatus 200 includes an observation pixel selection unit 201, a student image generation unit 202, a representative RGB calculation unit 203, a class tap selection unit 204, a prediction tap selection unit 205, a color conversion unit 206-1, a color conversion unit 206-2, a class classification unit 207, a normal equation addition unit 208, and a coefficient data generation unit 209.

If the learning apparatus 200 performs the learning on the coefficients, for example, the G component image, the R component image, and the B component image, as teacher images that are obtained by arranging in the frame 14 in FIG. 1 the three image sensors that correspond to the R component, the G component, and the B component, respectively, are prepared.

For example, by using a simulation model for an optical low pass filter and so forth, the student image generation unit 202 degrades the teacher image and generates the image that is output from the image sensor that is configured from the pixels arranged according to the Bayer layout. The image that is generated in this manner is defined as a student image.

The observation pixel selection unit 201 selects one arbitrary pixel, as the observation pixel, from the teacher images. Moreover, a coordinate value of the pixel selected as the observation pixel and the like are set in such a manner that they are supplied to the representative RGB calculation unit 203, the class tap selection unit 204, and the prediction tap selection unit 205.

The representative RGB calculation unit 203 calculates a representative value Dg, a representative value Dr, and a representative value Db for the pixel within the designation area in the student image, as is the case with the representative RGB calculation unit 101 in FIG. 2. Moreover, the designation area is set to be a predetermined region in which the pixel in the position corresponding to the observation pixel selected by the observation pixel selection unit 201 is set to be the center.

The class tap selection unit 204 selects the class tap from the pixels within the designation area in the student image and acquires the class tap. Moreover, if the observation pixel selection unit 201 selects the observation pixel from the G component image among the teacher images, the class tap selection unit 204 is set in such a manner that it selects the G class tap. Furthermore, if the observation pixel selection unit 201 selects the observation pixel from the R component image among the teacher images, the class tap selection unit 204 is set to select the R class tap, and if the observation pixel selection unit 201 selects the observation pixel from the B component image among the teacher images, the class tap selection unit 204 is set to select the B class tap.

The prediction tap selection unit 205 selects the prediction tap from the pixels within the designation area in the student image and acquires the prediction tap. Moreover, if the observation pixel selection unit 201 selects the observation pixel from the G component image among the teacher images, the prediction tap selection unit 205 is set to select the G prediction tap. Furthermore, if the observation pixel selection unit 201 selects the observation pixel from the R component image among the teacher images, the prediction tap selection unit 205 is set to select the R prediction tap, and if the observation pixel selection unit 201 selects the observation pixel from the B component image among the teacher images, the prediction tap selection unit 205 is set to select the B prediction tap.

The color conversion unit 206-1 performs predetermined conversion processing on the class tap that is acquired by the class tap selection unit 204. At this point, if the G class tap is acquired by the class tap selection unit 204, the color conversion unit 206-1 is set to perform the G conversion processing. Furthermore, if the R class tap is acquired by the class tap selection unit 204, the color conversion unit 206-1 is set to perform the R conversion processing, and if the B class tap is acquired by the class tap selection unit 204, the color conversion unit 206-1 is set to perform the B conversion processing.

The class tap that goes through the processing by the color conversion unit 206-1 is supplied to the class classification unit 207.

The color conversion unit 206-2 performs a predetermined conversion processing on the prediction tap acquired by the prediction tap selection unit 205. At this point, if the G prediction tap is acquired by the prediction tap selection unit 205, the color conversion unit 206-2 is set to perform the G conversion processing. Furthermore, if the R prediction tap is acquired by the prediction tap selection unit 205, the color conversion unit 206-2 is set to perform the R conversion processing, and if the B prediction tap is acquired by the prediction tap selection unit 205, the color conversion unit 206-2 is set to perform the B conversion processing.

The prediction tap that goes through the processing by the color conversion unit 206-2 is supplied to the normal equation addition unit 208.

The class classification unit 207 codes the supplied class tap by performing the adaptive dynamic range coding (ADRC), and thus generates a class code. The class code generated here is supplied to the normal equation addition unit 208, along with the class tap.

The normal equation addition unit 208, for example, generates the linear simple equation expressed in Equation (4). At this time, the class taps that go through the processing by the color conversion unit are used as the pixels $x_1$, $x_2$ and so forth up to $x_N$ in Equation (4).

When the observation pixel selection unit 201 selects a new observation pixel, a new linear simple equation is generated in the same manner as in the case above described. The normal equation addition unit 208 adds the linear simple equation generated in this manner to every class code and thus generates the normal equation in Equation (11).

The coefficient data generation unit 209 solves the normal equation in Equation (11) for the tap coefficient $w_n$ by using the sweep-out method (the Gauss-Jordan elimination method) and the like. Then, according to a type of teacher image (the G component image, the R component image, or the B component image) in which the observation pixel is set, the coefficient data generation unit 209 outputs the obtained tap coefficient $w_n$, as a G coefficient necessary for performing the prediction calculation of the G output image, an R coefficient necessary for performing the prediction calculation of the R output image, or a B coefficient necessary for performing the prediction calculation of the B output image.

Thus, the G coefficient, the R coefficient, and the B coefficient for every class code obtained are stored in the G coefficient memory 107-1, the R coefficient memory 107-2, and the B coefficient memory 107-3 in FIG. 2, respectively.

Thus, the learning is performed on the coefficient.

FIGS. 8A to 8D are diagrams, each illustrating an example of a structure of the class tap or the prediction tap that is acquired in the image processing apparatus 100 in FIG. 2 or the learning apparatus 200 in FIG. 7. At this point, the class tap refers collectively to the G class tap, the R class tap, and the B class tap that are described above, and the prediction tap refers collectively to the G prediction tap, the R prediction tap, and the B prediction tap that are described above.

In each of the examples in FIGS. 8A to 8D, the class tap or the prediction tap that is configured from nine (=3×3) pixels in which the pixel (the central pixel) of the input image corresponding to the observation pixel of the output image is set to be the center is illustrated. Furthermore, at this point, in a case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

Figure 8A:
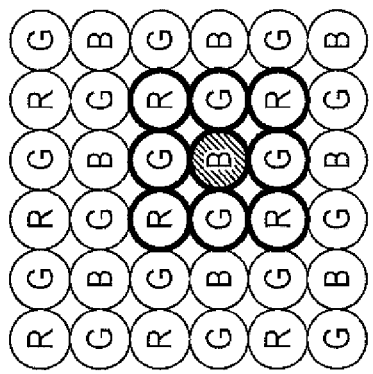
FIGS. 8A to 8D are diagrams, each illustrating an example of a structure of a class tap or a prediction tap that is acquired in the image processing apparatus in FIG. 2 or the learning apparatus in FIG. 7.

FIG. 8A is a diagram illustrating an example of the class tap or the prediction tap in a case where in the pixels in the Bayer layer, the R component pixel is set to be the central pixel.

Figure 8B:
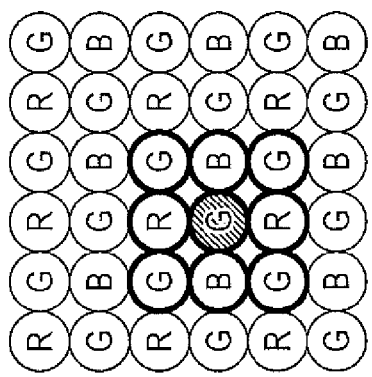

FIG. 8B is a diagram illustrating an example of the class tap or the prediction tap in a case where in the pixels in the Bayer layer, the G component pixel is set to be the central pixel.

Figure 8C:
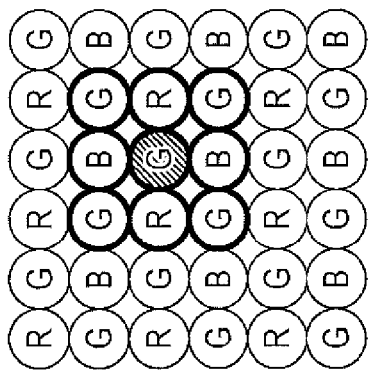

FIG. 8C is a diagram illustrating an example of the class tap or the prediction tap in a case where in the pixels in the Bayer layer, the different G component pixel is set to be the central pixel.

Figure 8D:
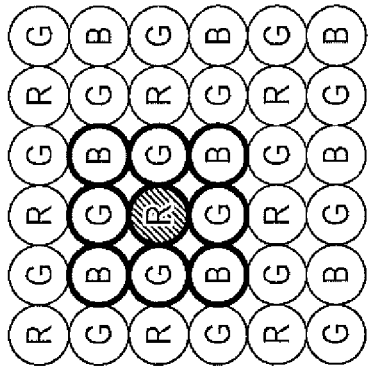

FIG. 8D is a diagram illustrating an example of the class tap or the prediction tap in a case where in the pixels in the Bayer layer, the B component pixel is set to be the central pixel.

Moreover, the class tap and the prediction tap may have the same structures or may have different structures. Furthermore, in the class tap, the G class tap, the R class tap, and the B class tap may have the same structures or may have different structures. In the same manner, in the prediction tap, the G prediction tap, the R prediction tap, and the B prediction tap may have the same structures or may have different structures.

FIG. 9 is a flow chart describing an example of the image processing by the image processing apparatus 100 in FIG. 2.

In Step S21, it is determined whether or not the image (the input image) intended for a target of image processing is input and the processing waits until it is determined that the image intended for a target of image processing is input. In Step S21, the processing proceeds to Step S22 if it is determined that the image is input.

Moreover, as illustrated, the input image, for example, is set to be an image that is configured from the output values from the image sensor in which the color filter array in the Bayer layout is used. Therefore, in the input image, the image signal of the R component is obtained from the pixel on which the R color filter is arranged, but the image signals of the G component and the B component are not obtained. In the same manner, only the image signal of the G component is obtained from a G pixel, the image signals of the R component and the B component are not obtained. Then, only the image signal of the B component is obtained from the B pixel and the image signals of the R component and the G component are not obtained.

In Step S22, the observation pixel is set. By doing this, the central pixel is decided in the input image.

In Step S23, the representative RGB calculation unit 101 performs representative RGB calculation processing that is described below referring to FIG. 10. By doing this, the representative value Dg, the representative value Dr, and the representative value Db are calculated.

In Step S24, the G class tap selection unit 102-1, the R class tap selection unit 102-2, and the B class tap selection unit 102-3 acquire the G class tap, the R class tap, and the B class tap, respectively.

Moreover, if the G output image is generated, the G class tap is acquired, if the R output image is generated, the R class tap is acquired, and if the B output image is generated, the B class tap is acquired. From now on, for brief description, a case where the G output image is generated is described.

In Step S25, color conversion is performed. For example, in a case where the G output image is generated, the G conversion unit 105-11 performs G conversion. At this time, the conversion value G', the conversion value R', and the conversion value B' are calculated using Equations (1) to (3) described above.

In Step S26, class classification is performed. For example, if the G output image is generated, the G class classification unit 106-1 performs the class classification by coding the supplied G class tap by performing the adaptive dynamic range coding (ADRC) and thus generating the class code.

In Step S27, the prediction tap is acquired. For example, if the G output image is generated, the G prediction tap selection unit 103-1 acquires the G prediction tap.

In Step S28, the color conversion is performed. For example, if the G output image is generated, the G conversion unit 105-12 performs the G conversion. At this time, the conversion value G', the conversion value R', and the conversion value B' are calculated using Equations (1) to (3) described above.

In Step S29, the coefficient is read. For example, if the G output image is generated, the coefficient that is stored with it being mapped to the class code generated in Step S26 is read from the G coefficient memory 107-1.

In Step S30, an observation pixel value is predicted. For example, if the G output image is generated, the G prediction tap that is color-converted by the processing in Step S28 is substituted for the pixels $x_1$, $x_2$, and so forth up to $x_N$ in Equation (4), the coefficient that is read by the processing in Step S29 is supplied as the tap coefficient $w_n$ in Equation (4), and the G product and sum calculation unit 108-1 performs the calculation in Equation (4), thereby predicting the pixel value of the observation image of the output image.

In Step S31, it is determined whether or not a following observation pixel is present. If it is determined that the next observation pixel is present, the processing returns to Step S22. Then, Step S22 and the subsequent steps are repeatedly performed.

In Step S31, if it is determined that the next observation pixel is not present, the processing stops.

Thus, image generation processing is performed.

Figure 10:
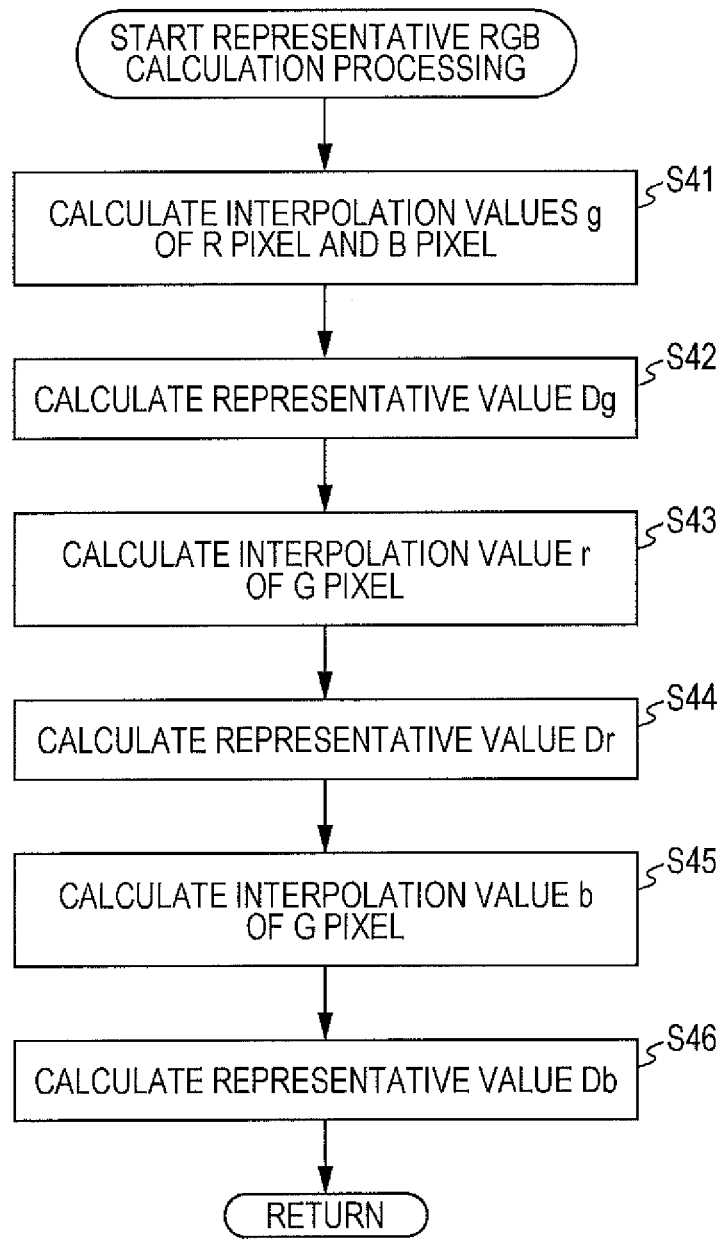
FIG. 10 is a flow chart describing an example of representative RGB calculation processing.

Next, a detailed example of the representative RGB calculation processing in Step S23 in FIG. 9 is described referring to the flow chart in FIG. 10.

In Step S41, the representative RGB calculation unit 101 calculates the interpolation values g of the R component pixel and the B component pixel in the designation area in the input image. At this time, for example, as illustrated in FIG. 4, the input value G1 to the input value G4 of the pixels G1 to G4, four G pixels in the vicinity (in the upward, downward, leftward, and rightward directions) of the central pixel within the designation area are averaged and thus the interpolation value g, a value of the interpolated G component in the pixel position of the central pixel is calculated.

In Step S42, the representative RGB calculation unit 101 calculates the representative value Dg. At this time, an average of the input values G of all the G pixels within the designation area and the interpolation value g calculated in Steps S41 is calculated as the representative value Dg.

In Step S43, the representative RGB calculation unit 101 calculates the interpolation value r of a G component pixel. For example, if the interpolation value r in the position indicated by the pixel G1 or the pixel G4 in FIG. 4 is calculated, as illustrated in FIG. 5, the average value of a pixel R1 and a pixel R2 that are positioned immediately to the left of the G pixel and immediately to the right of the G pixel, respectively, is set to be the interpolation value r.

By doing this, the input value G and the interpolation value r can be obtained in the pixel position of the G pixel within the designation area, and the input value R and the interpolation value g can be obtained in the pixel position of the R pixel within the designation area.

In Step S44, the representative RGB calculation unit 101 calculates the representative value Dr. At this time, in each pixel position, (the interpolation value r–the input value G) and (the input value R–the interpolation value g) are calculated, and the representative value Dr is calculated as the value that results from adding the representative value Dg to the average value of the calculated (the interpolation value r–the input value G) and the calculated (the input value R–the interpolation value g).

In Step S45, the representative RGB calculation unit 101 calculates an interpolation value b of the G component pixel. For example, if the interpolation value b in the position indicated by the pixel G1 or the pixel G4 in FIG. 4 is calculated, as illustrated in FIG. 6, the average value of a pixel B1 and a pixel B2 that are positioned immediately over the G pixel and immediately under the G pixel, respectively, is set to be the interpolation value b.

By doing this, the input value G and the interpolation value b can be obtained in the pixel position of the G pixel within the designation area, and the input value B and the interpolation value g can be obtained in the pixel position of the B pixel within the designation area.

In Step S46, the representative RGB calculation unit 101 calculates the representative value Db. At this time, in each pixel position, (the interpolation value b–the input value G) and (the input value B–the interpolation value g) are calculated, and the representative value Db is calculated as the value that results from adding the representative value Dg to the average value of the calculated (the interpolation value b–the input value G) and the calculated (the input value B–the interpolation value g).

Thus, the representative RGB calculation processing is performed.

Figure 11:
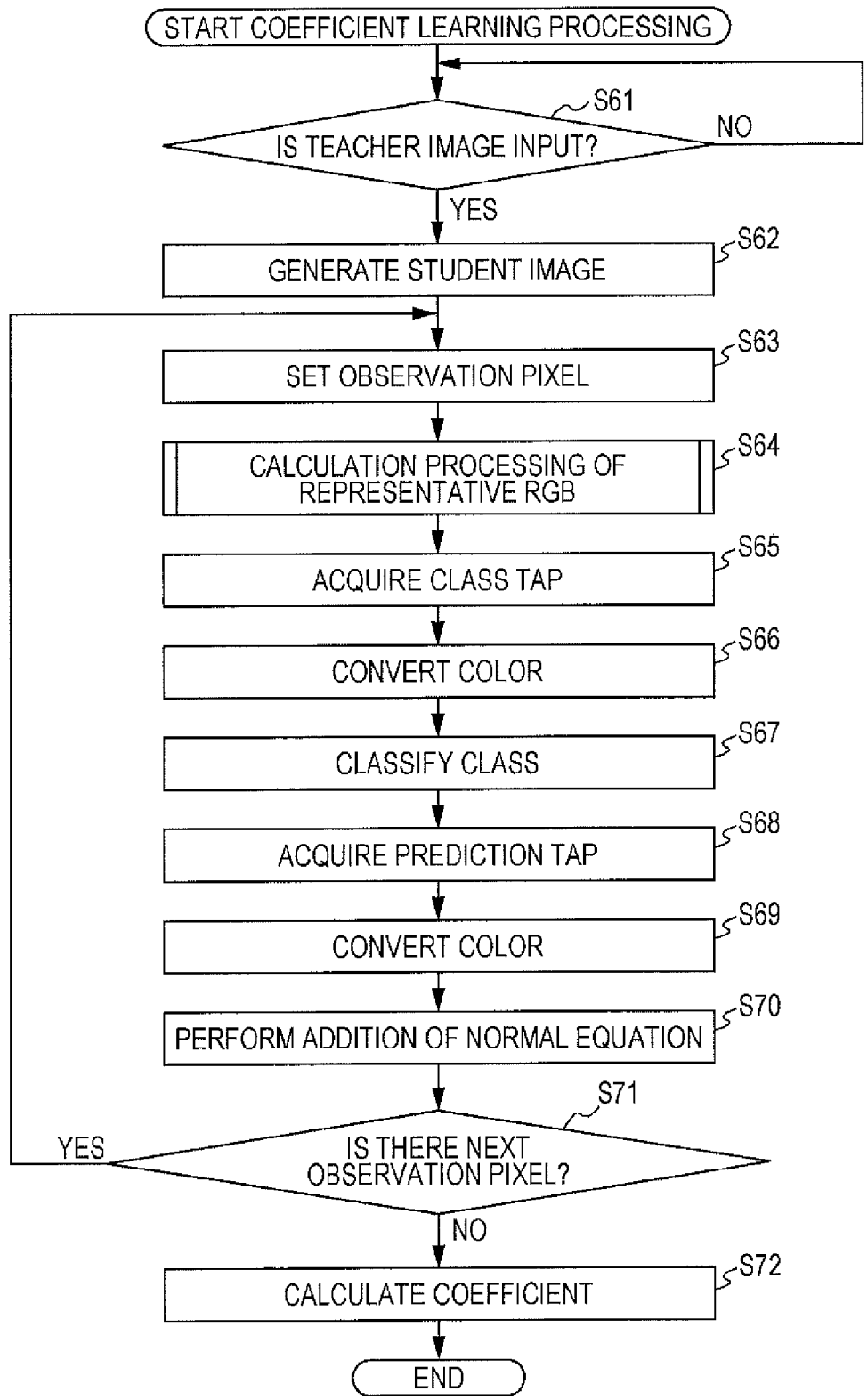
FIG. 11 is a flow chart describing an example of coefficient learning processing by the learning apparatus in FIG. 7.

Next, an example of coefficient learning processing by the learning apparatus 200 in FIG. 7 is described referring to a flow chart in FIG. 11.

In Step S61, it is determined whether or not the teacher image is input, and the processing waits until it is determined that the teacher image is input. In Step S61, if it is determined that the teacher image is input, the processing proceeds to Step S62.

Moreover, as described, for example, the teacher images are set to be the G component image, the R component image, and the B component image that are obtained by arranging the three image sensors that correspond to the R component, the G component, and the B component, respectively, in the frame 14 in FIG. 1.

In Step S62, the student image generation unit 202 generates the student image. At this time, for example, by using the simulation model for the optical low pass filter and so forth, the teacher image is degraded and the image that is output from the image sensor that is configured from the pixels arranged according to the Bayer layout is generated and is set to be the student image.

In Step S63, the observation pixel selection unit 201 selects (sets) an arbitrary one pixel, as the observation pixel, from the teacher images. By doing this, the central pixel in the student image is decided.

In Step S64, the representative RGB calculation unit 203 performs the representative RGB calculation processing that is described referring to the flow chart in FIG. 10. By doing this, the representative value Dg, the representative value Dr, the representative value Db are calculated.

In Step S65, the class tap selection unit 204 selects the class tap from the pixels within the designation area in the student image and acquires the class tap.

Moreover, if the observation pixel selection unit 201 selects the observation pixel from the G component image among the teacher images, the class tap selection unit 204 is set in such a manner that it selects the G class tap. Furthermore, if the observation pixel selection unit 201 selects the observation pixel from the R component image among the teacher images, the class tap selection unit 204 is set to select the R class tap, and if the observation pixel selection unit 201 selects the observation pixel from the B component image among the teacher images, the class tap selection unit 204 is set to select the B class tap.

In Step S66, the color conversion unit 206-1 performs a predetermined conversion processing on the class tap that is acquired by the processing in Step S65.

At this point, if the G class tap is acquired by the class tap selection unit 204, the color conversion unit 206-1 is set to perform the G conversion processing. Furthermore, if the R class tap is acquired by the class tap selection unit 204, the color conversion unit 206-1 is set to perform the R conversion processing, and if the B class tap is acquired by the class tap selection unit 204, the color conversion unit 206-1 is set to perform the B conversion processing.

In Step 67, the class classification unit 207 codes the supplied class tap by performing the adaptive dynamic range coding (ADRC), and thus generates a class code. The class code generated here is supplied to the normal equation addition unit 208, along with the class tap.

In Step S68, the prediction tap selection unit 205 selects the prediction tap from the pixels within the designation area in the student image and acquires the prediction tap.

At this point, if the observation pixel selection unit 201 selects the observation pixel from the G component image among the teacher images, the prediction tap selection unit 205 is set to select the G prediction tap. Furthermore, if the observation pixel selection unit 201 selects the observation pixel from the R component image among the teacher images, the prediction tap selection unit 205 is set to select the R prediction tap, and if the observation pixel selection unit 201 selects the observation pixel from the B component image among the teacher images, the prediction tap selection unit 205 is set to select the B prediction tap.

In Step S69, the color conversion unit 206-2 performs a predetermined conversion processing on the prediction tap that is acquired in Step S68.

At this point, if the G prediction tap is acquired by the prediction tap selection unit 205, the color conversion unit 206-2 is set to perform the G conversion processing. Furthermore, if the R prediction tap is acquired by the prediction tap selection unit 205, the color conversion unit 206-2 is set to perform the R conversion processing, and if the B prediction tap is acquired by the prediction tap selection unit 205, the color conversion unit 206-2 is set to perform the B conversion processing.

In Step S70, the normal equation addition unit 208 performs adding of the normal equation.

As described above, the normal equation addition unit 208 generates, for example, the linear simple equation expressed in Equation (4) described above and the class tap that goes through the processing by the color conversion unit is used as the pixels $x_1$, $x_2$, and so forth up to $x_N$ in Equation (4). Then, the normal equation addition unit 208 adds the linear simple equation generated in this manner to every class code generated in Step S67 and thus generates the normal equation in Equation (11).

In Step S71, it is determined whether or not the following observation pixel is present. If it is determined that the next observation pixel is present, the processing returns to Step S63. Then, Step S63 and the subsequent steps are repeatedly performed.

On the one hand, in Step S71, if it is determined that the next observation pixel is not present, the processing proceeds to Step S72.

In Step S72, the coefficient data generation unit 209 calculates the coefficient.

At this time, as described above, the coefficient data generation unit 209 solves the normal equation in Equation (11) for the tap coefficient $w_n$ by using the sweep-out method (the Gauss-Jordan elimination method) and the like. Then, according to a type of teacher image (the G component image, the R component image, or the B component image) in which the observation pixel is set, the coefficient data generation unit 209 outputs the obtained tap coefficient $w_n$, as a G coefficient necessary for performing the prediction calculation of the G output image, an R coefficient necessary for performing the prediction calculation of the R output image, or a B coefficient necessary for performing the prediction calculation of the B output image.

Thus, the G coefficient, the R coefficient, the B coefficient for every class code obtained are stored in the G coefficient memory 107-1, the R coefficient memory 107-2, and the B coefficient memory 107-3 in FIG. 2, respectively, and are set to be read in the processing in Step S29 in FIG. 9.

Thus, the coefficient learning processing is performed.

Incidentally, according to the embodiment described referring to FIG. 2, the G output image, the R output image, and the B output image are set to be obtained at the same time. However, because the number of G pixels is greater per unit of area in the Bayer layout, prediction accuracy is high. Furthermore, G is higher in S/N ratio than R or B because of characteristics of a color filter. Because of this, for example, the G output image may be generated first, and then the R output image and the B output image may be set to be generated using the generated G output image. By doing this, the image processing that provides higher quality in terms of an amount of noise and resolution (frequency characteristics) can be performed.

Figure 12:
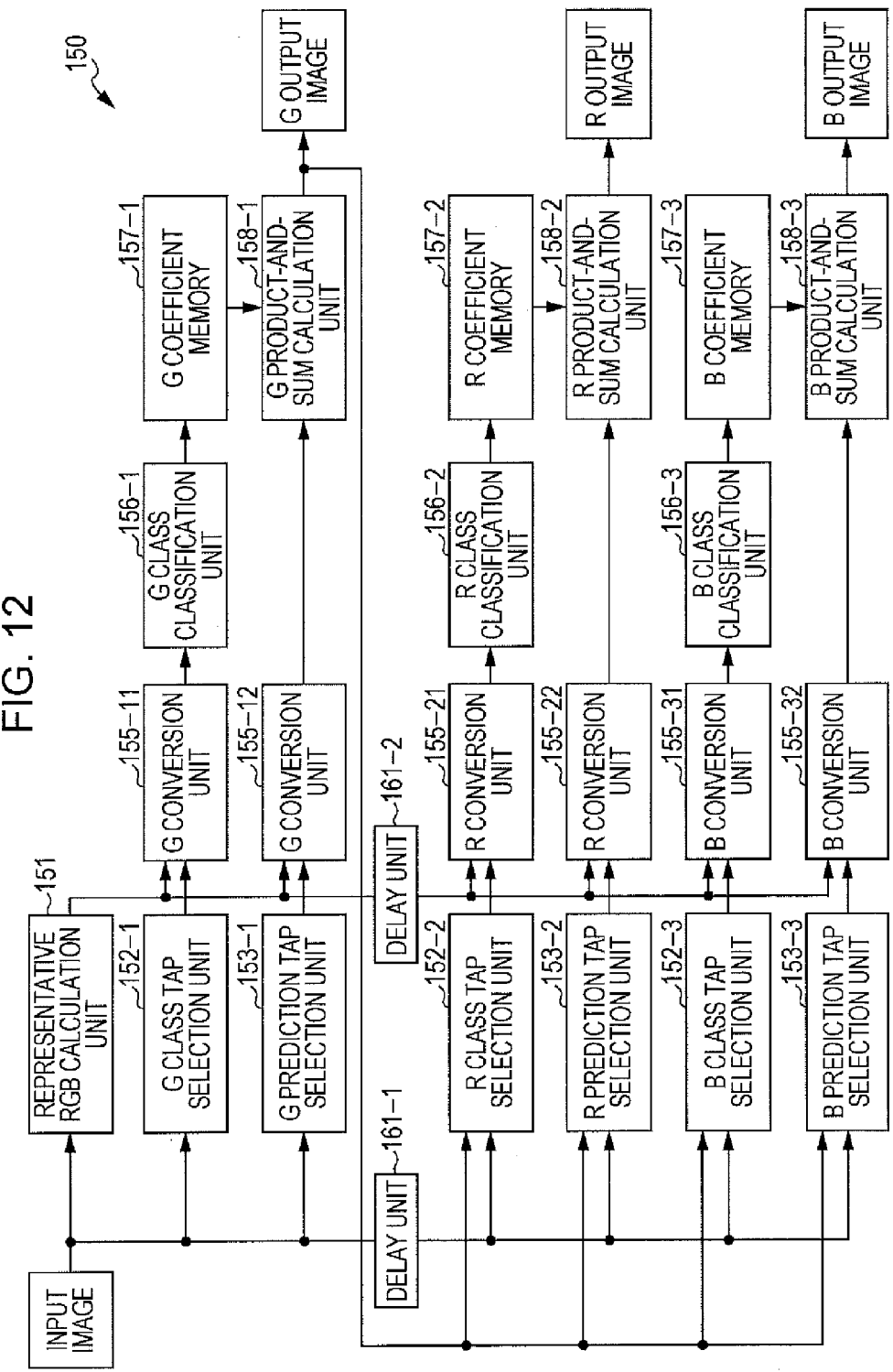
FIG. 12 is a block diagram illustrating a configuration example of an image processing apparatus according to another embodiment, to which the present technology is applied.

FIG. 12 is a block diagram illustrating a configuration example of an image processing apparatus according to another embodiment, to which the present technology is applied. An image processing apparatus 150 illustrated in FIG. 12 is first set to generate the G output image and then is set to generate the R output image and the B output image using the generated G output image.

A representative RGB calculation unit 151 in FIG. 12 has the same configuration as the representative RGB calculation unit 101 in FIG. 2, and thus a detailed description thereof is omitted.

Furthermore, a G class tap selection unit 152-1, a G conversion unit 155-11, a G class classification unit 156-1, a G coefficient memory 157-1, a G prediction tap selection unit 153-1, a G conversion unit 155-12, and a G product and sum calculation unit 158-1, each of which is a functional block relating to the generation of the G output image in FIG. 12, have the same configurations as the G class tap selection unit 102-1, the G conversion unit 105-11, the G class classification unit 106-1, the G coefficient memory 107-1, the G prediction tap selection unit 103-1, the G conversion unit 105-12, and the G product and sum calculation unit 108-1 that are illustrated in FIG. 2, respectively, and thus detailed descriptions thereof are omitted.

In a case of the configuration in FIG. 12, unlike in a case of the configuration in FIG. 2, the data that is output from the G product and sum calculation unit 108-1 is set in such a manner that the data is supplied through a delay unit 161-1 to an R class tap selection unit 152-2 and an R prediction tap selection unit 153-2, and to a B class tap selection unit 152-3 and a B prediction tap selection unit 153-3. Furthermore, in a case of the configuration in FIG. 12, unlike in a case of the configuration in FIG. 2, the data that is output from the representative RGB calculation unit 151 is set in such a manner that the data is supplied through a delay unit 161-2 to an R conversion unit 155-21 and an R conversion unit 155-22, and to a B conversion unit 155-31 and a B conversion unit 155-32.

In a case of the configuration in FIG. 12, the R class tap selection unit 152-2 selects from the G output image an R class tap, a class tap necessary for generating the R component image and thus acquires the R class tap. The R class tap, for example, is configured from a predetermined number of pixels in which the pixel of a G output image in the position corresponding to the observation pixel of the output image is set to be the central pixel and the central pixel is set to be the center.

The R class tap selected by the R class tap selection unit 152-2 is supplied to the R conversion unit 155-21. The R conversion unit 155-21 performs R conversion processing on each pixel value that makes up the R class tap.

The R conversion processing here, for example, is performed as follows.

In FIG. 12, unlike in FIG. 2, the R class tap is selected from the G output image by the R class tap selection unit 152-2.

Therefore, in this case, the R class tap is configured from all the G component pixels. Now, the G component pixel of the G output image is indicated by a prediction value Gp.

The R conversion unit 155-21 calculates a conversion value Gp' by performing the calculation in Equation (18) on each pixel value that makes up the R class tap.

$$Gp'=Gp-(Dg-Dr) \quad (18)$$

The correlation between the pixel values, each of which makes up the R class tap, is increased by performing the R conversion processing. That is, the pixel value of the G output image is offset with the pixel value of the R pixel of the input image being set to be the reference, and thus the change due to the difference in color component between the pixel values, each of which makes up the R class tap, can be removed.

The R class tap that is output from the R conversion unit 155-21 is supplied to an R class classification unit 156-2. Moreover, the R class tap that is output from the R conversion unit 155-21 is configured from the conversion value Gp' that is calculated using Equation (18) described above.

The R class classification unit 156-2 codes the supplied R class tap by performing the adaptive dynamic range coding (ARRC), and thus generates a class code. The class code generated here is output to the R coefficient memory 157-2.

The R coefficient memory 157-2 reads the coefficient that is stored with it being mapped to the class code that is output from the R class classification unit 156-2. Then, the R coefficient memory 157-2 supplies the read coefficient to an R product and sum calculation unit 158-2. Moreover, the coefficient that is a coefficient obtained by prior learning and that is used in the product and sum calculation described below is stored in the R coefficient memory 157-2 with it being mapped to the class code.

Moreover, if the image processing apparatus 150 as configured in FIG. 12 is used, even when the learning is performed on the coefficient that is stored in an R coefficient memory 157-2, the learning for generating the R output image with the G output image being set to be the teacher image is set to be performed as well.

The R prediction tap selection unit 153-2 selects from the G output image an R prediction tap that is a prediction tap necessary for generating the R component image and acquires the R prediction tap. The R prediction tap, for example, is configured from a predetermined number of pixels in which the pixel of the G output image in the position corresponding to the observation pixel of the output image is set to be the central pixel and the central pixel is set to be the center. Moreover, in FIG. 12, unlike in FIG. 2, the R prediction tap is selected from the G output image by the R prediction tap selection unit 153-2. Therefore, in this case, the R prediction tap is configured from all the G component pixels.

The R prediction tap selected by the R prediction tap selection unit 153-2 is supplied to the R conversion unit 155-22. The R conversion unit 155-22 performs the R conversion processing on each pixel value that makes up the R prediction tap.

The R conversion processing by the R conversion unit 155-22 is the same as that by the R conversion unit 155-21. That is, the conversion value Gp' is calculated using Equation (18) described above.

The R prediction tap that is output from the R conversion unit 155-22 is supplied to the R product and sum calculation unit 158-2. Moreover, the R prediction tap that is output from the R conversion unit 155-21 is configured from the conversion value Gp' that is calculated using Equation (18) described above.

The R product and sum calculation unit 158-2 has the same configuration as the R product and sum calculation unit 108-2 in FIG. 2, but performs the prediction calculation on the pixel value of the observation pixel in the R component image (referred to as the R output image) that becomes the output image, based on the R prediction tap.

In this manner, the R output image can be obtained by predicting each observation pixel.

Furthermore, in a case of the configuration in FIG. 12, the B class tap selection unit 152-3 selects from the G output image a B class tap, a class tap necessary for generating the B component image and thus acquires the B class tap. The B class tap, for example, is configured from a predetermined number of pixels in which the pixel of a G output image in the position corresponding to the observation pixel of the output image is set to be the central pixel and the central pixel is set to be the center.

The B class tap selected by the B class tap selection unit 152-3 is supplied to the B conversion unit 155-31. The B conversion unit 155-31 performs the B conversion processing on each pixel value that makes up the B class tap.

The B conversion processing here, for example, is performed as follows.

In FIG. 12, unlike in FIG. 2, the B class tap is selected from the G output image by the B class tap selection unit 152-3. Therefore, in this case, the B class tap is configured from all the G component pixels. Now, the G component pixel of the G output image is indicated by the prediction value Gp.

The B conversion unit 155-31 calculates the conversion value Gp' by performing the calculation in Equation (19) on each pixel value that makes up the B class tap.

$$Gp'=Gp-(Dg-Db) \quad (19)$$

The correlation between the pixel values, each of which makes up the B class tap, is increased by performing the B conversion processing. That is, the pixel value of the G output image is offset with the pixel value of the B pixel of the input image being set to be the reference, and thus the change due to the difference in color component between the pixel values, each of which makes up the B class tap, can be removed.

The B class tap that is output from the B conversion unit 155-31 is supplied to a B class classification unit 156-3. Moreover, the B class tap that is output from the B conversion unit 155-31 is configured from the conversion value Gp' that is calculated using Equation (19) described above.

The B class classification unit 156-3 codes the supplied B class tap by performing the adaptive dynamic range coding (ADRC), and thus generates a class code. The class code generated here is output to the B coefficient memory 157-3.

The B coefficient memory 157-3 reads the coefficient that is stored with it being mapped to the class code that is output from the B class classification unit 156-3. Then, the B coefficient memory 157-3 supplies the read coefficient to a B product and sum calculation unit 158-3. Moreover, the coefficient that is a coefficient obtained by prior learning and that is used in the product and sum calculation described below is stored in the B coefficient memory 157-3 with it being mapped to the class code.

Moreover, if the image processing apparatus 150 as configured in FIG. 12 is used, even when the learning is performed on the coefficient that is stored in the B coefficient memory 157-3, the learning for generating the B output image with the G output image being set to be the teacher image is set to be performed as well.

The B prediction tap selection unit 153-3 selects from the G output image a B prediction tap that is a prediction tap necessary for generating the B component image and acquires the B prediction tap. The B prediction tap, for example, is configured from a predetermined number of pixels in which the pixel of the G output image in the position corresponding to the observation pixel of the output image is set to be the central pixel and the central pixel is set to be the center. Moreover, in FIG. 12, unlike in FIG. 2, the B prediction tap is selected from the G output image by the B prediction tap selection unit 153-3. Therefore, in this case, the B prediction tap is configured from all the G component pixels.

The B prediction tap selected by the B prediction tap selection unit 153-3 is supplied to the B conversion unit 155-32. The B conversion unit 155-32 performs the B conversion processing on each pixel value that makes up the B prediction tap.

The B conversion processing by the B conversion unit 155-32 is the same as that by the B conversion unit 155-31. That is, the conversion value Gp' is calculated using Equation (19) described above.

The B prediction tap that is output from the B conversion unit 155-32 is supplied to the B product and sum calculation unit 158-3. Moreover, the B prediction tap that is output from the B conversion unit 155-31 is configured from the conversion value Gp' that is calculated using Equation (19) described above.

The B product and sum calculation unit 158-3 has the same configuration as the B product and sum calculation unit 108-3 in FIG. 2, but performs the prediction calculation on the pixel value of the observation pixel in the B component image (referred to as the B output image) that becomes the output image, based on the B prediction tap.

In this manner, the B output image can be obtained by predicting each observation pixel.

FIGS. 13A to 13D are diagrams, each illustrating an example of a structure of the G class tap or the G prediction tap that is acquired in the image processing apparatus 150 in FIG. 12.

In each of the examples in FIGS. 13A to 13D, the class tap or the prediction tap that is configured from nine (=3×3) pixels in which the pixel (the central pixel) of the input image corresponding to the observation pixel of the output image is set to be the center is illustrated. Furthermore, at this point, in a case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

Figure 13D:
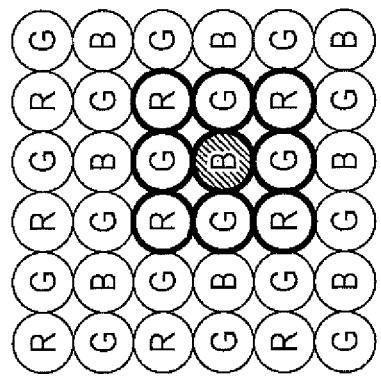
FIGS. 13A to 13D are diagrams, each illustrating an example of a structure of a class tap or a prediction tap that is acquired in the image processing apparatus in FIG. 12.
Figure 13C:
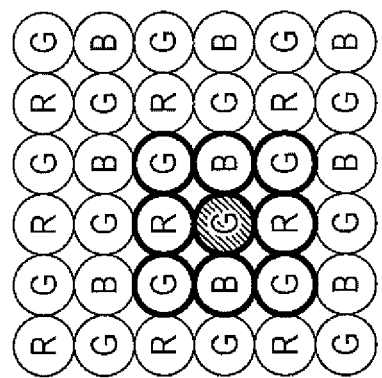
Figure 13B:
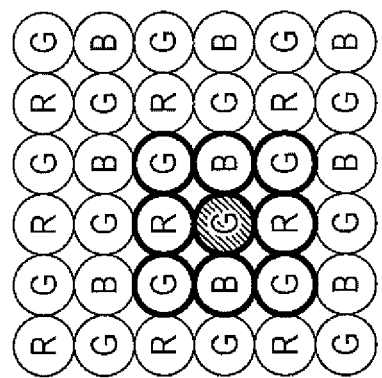
Figure 13A:
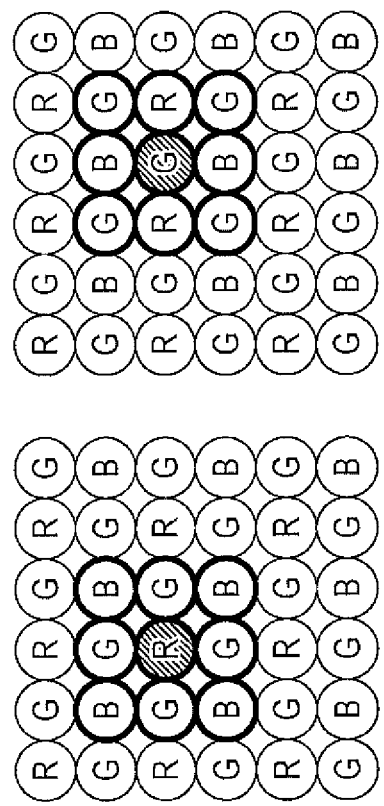

FIG. 13A is a diagram illustrating an example of the class tap or the prediction tap in a case where in the pixels in the Bayer layer, the R component pixel is set to be the central pixel.

FIG. 13B is a diagram illustrating an example of the class tap or the prediction tap in a case where in the pixels in the Bayer layer, the G component pixel is set to be the central pixel.

FIG. 13C is a diagram illustrating an example of the class tap or the prediction tap in a case where in the pixels in the Bayer layer, the different G component pixel is set to be the central pixel.

FIG. 13D is a diagram illustrating an example of the class tap or the prediction tap in a case where in the pixels in the Bayer layer, the B component pixel is set to be the central pixel.

Moreover, the class tap and the prediction tap may have the same structures or may have different structures.

FIGS. 14A to 14D are diagrams, each illustrating an example of a structure of the R class tap or the R prediction tap that is acquired in the image processing apparatus 150 in FIG. 12. As illustrated in FIGS. 14A to 14D, because the R class tap or the R prediction tap is acquired from the G output image, all the R class taps or all the R prediction taps are all indicated by Gp within circles in the drawings.

In each of the examples in FIGS. 14A to 14D, the class tap or the prediction tap that is configured from the five pixels in the form of a cross in which the pixel (the central pixel) of the input image corresponding to the observation pixel of the output image is set to be the center is illustrated. Furthermore, at this point, in a case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

Figures 14A, 14B, 14C, 14D:
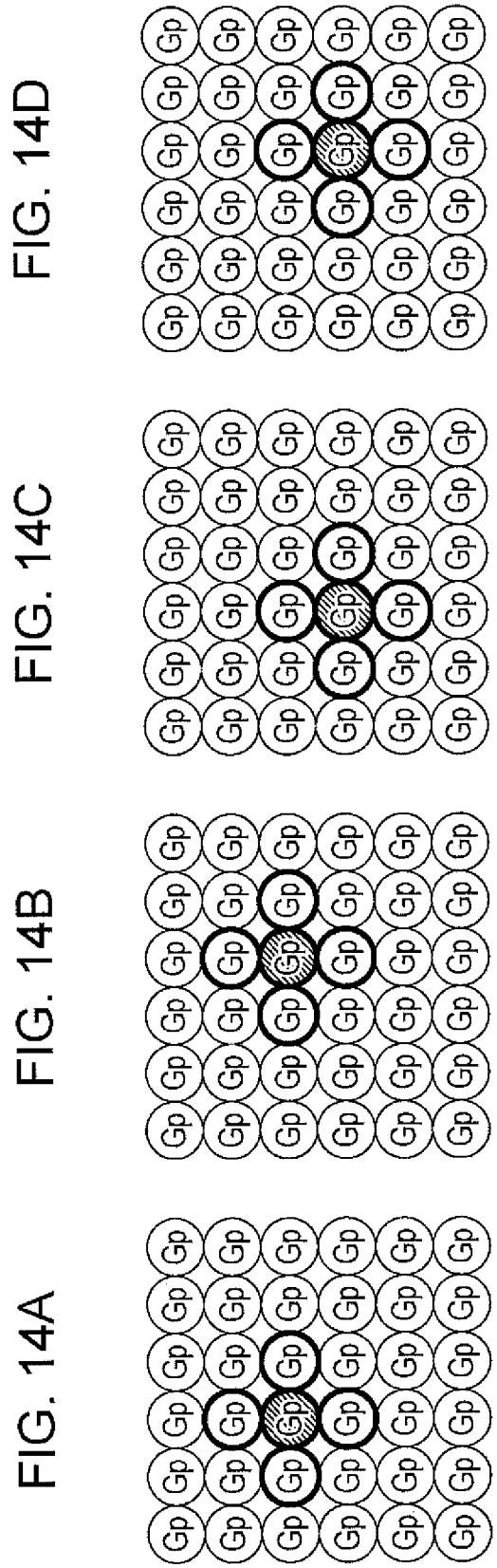
FIGS. 14A to 14D are diagrams, each illustrating an example of the structure of the class tap or the prediction tap that is acquired in the image processing apparatus in FIG. 12.

FIG. 14A is a diagram illustrating an example of the class tap or the prediction tap in a case where in the pixels in the Bayer layer, the R component pixel is set to be the central pixel.

FIG. 14B is a diagram illustrating an example of the class tap or the prediction tap in a case where in the pixels in the Bayer layer, the G component pixel is set to be the central pixel.

FIG. 14C is a diagram illustrating an example of the class tap or the prediction tap in a case where in the pixels in the Bayer layer, the different G component pixel is set to be the central pixel.

FIG. 14D is a diagram illustrating an example of the class tap or the prediction tap in a case where in the pixels in the Bayer layer, the B component pixel is set to be the central pixel.

Moreover, the class tap and the prediction tap may have the same structures or may have different structures.

FIGS. 15A to 15D are diagrams, each illustrating an example of a structure of the B class tap or the B prediction tap that is acquired in the image processing apparatus 150 in FIG. 12. As illustrated in FIGS. 15A to 15D, because the B class tap or the B prediction tap is acquired from the G output image, all the B class taps or all the B prediction taps are all indicated by Gp within circles in the drawings.

In each of the examples in FIGS. 15A to 15D, the class tap or the prediction tap that is configured from the five pixels in the form of a cross in which the pixel (the central pixel) of the input image corresponding to the observation pixel of the output image is set to be the center is illustrated. Furthermore, at this point, in a case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

FIG. 15A is a diagram illustrating an example of the class tap or the prediction tap in a case where in the pixels in the Bayer layer, the R component pixel is set to be the central pixel.

FIG. 15B is a diagram illustrating an example of the class tap or the prediction tap in a case where in the pixels in the Bayer layer, the G component pixel is set to be the central pixel.

FIG. 15C is a diagram illustrating an example of the class tap or the prediction tap in a case where in the pixels in the Bayer layer, the different G component pixel is set to be the central pixel.

FIG. 15D is a diagram illustrating an example of the class tap or the prediction tap in the case where in the pixels in the Bayer layer, the B component pixel is set to be the central pixel.

Moreover, the class tap and the prediction tap may have the same structures or may have different structures.

For example, the image processing that provides higher quality in terms of an amount of noise and resolution (frequency characteristics) compared to the configuration in FIG. 2 can be performed by configuring the image processing apparatus as illustrated in FIG. 12.

In the examples that are described referring to FIG. 2 and FIG. 12, a conversion value is substituted for the pixel value by performing the color conversion, and thus the class classification, and the product and sum calculation are performed, but for example, a color difference may be substituted for the pixel value, and thus the class classification, and the product and sum calculation may be performed.

Figure 16:
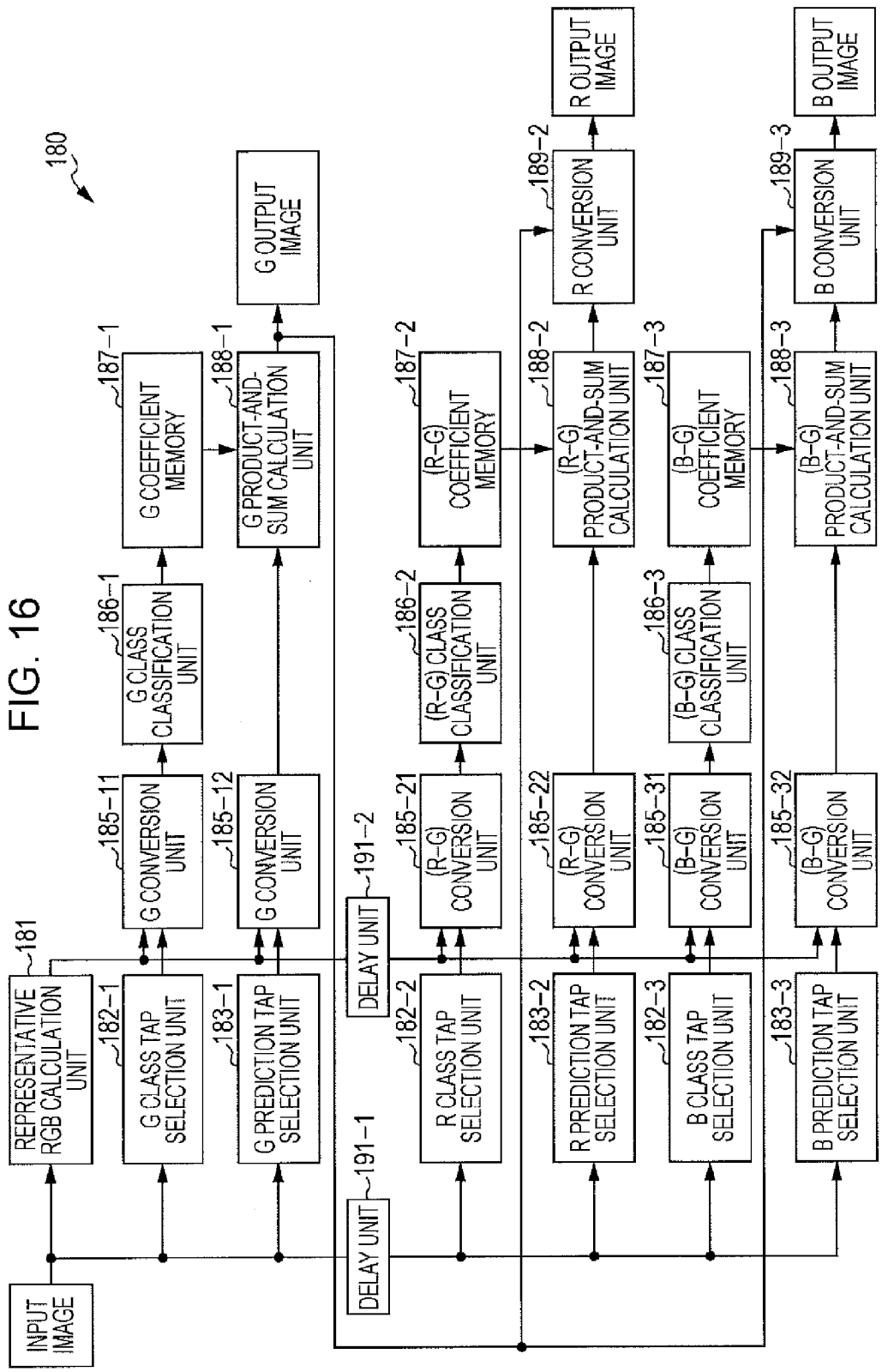
FIG. 16 is a block diagram illustrating a configuration example of an image processing apparatus according to another embodiment, to which the present technology is applied.

FIG. 16 is a block diagram illustrating a configuration example of an image processing apparatus according to another embodiment, to which the present technology is applied. An image processing apparatus 180 illustrated in FIG. 16 is first set to generate the G output image and then is set to generate the R output image and the B output image using the generated G output image. Furthermore, when the R output image and the B output image are generated using the generated G output image, the color difference is substituted for the pixel value, and thus the class classification and the product and sum calculation are set to be performed.

Because a representative RGB calculation unit 181 in FIG. 16 has the same configuration as the representative RGB calculation unit 101 in FIG. 2, a detailed description thereof is omitted.

Furthermore, a G class tap selection unit 182-1, a G conversion unit 185-11, a G class classification unit 186-1, a G coefficient memory 187-1, a G prediction tap selection unit 183-1, a G conversion unit 185-12, and a G product and sum calculation unit 188-1, each of which is a functional block relating to the generation of the G output image in FIG. 16, have the same configurations as the G class tap selection unit 102-1, the G conversion unit 105-11, the G class classification unit 106-1, the G coefficient memory 107-1, the G prediction tap selection unit 103-1, the G conversion unit 105-12, and the G product and sum calculation unit 108-1 that are illustrated in FIG. 2, respectively, and thus detailed descriptions thereof are omitted.

In a case of the configuration in FIG. 16, unlike in a case of the configuration in FIG. 2, the input image is set in such a manner that the input image is supplied through a delay unit 191-1 to an R class tap selection unit 182-2 and an R prediction tap selection unit 183-2, and to a B class tap selection unit 182-3 and the B prediction tap selection unit 183-3.

Furthermore, in the case of the configuration in FIG. 16, unlike in a case of the configuration in FIG. 2, the data that is output from the G product and sum calculation unit 108-1 is set in such a manner that the data is supplied to an R conversion unit 189-2 and a B conversion unit 189-3.

Furthermore, in the case of the configuration in FIG. 16, the data that is output from the representative RGB calculation unit 181 is set in such a manner that the data is supplied through a relay unit 191-2 to an (R–G) conversion unit 185-21 and an (R–G) conversion unit 185-22, and to a (B–G) conversion unit 185-31 and an (B–G) conversion unit 185-32.

Additionally, in a case where the configuration in FIG. 16 is employed, the R class tap, the B class tap, the R prediction tap, and the B prediction tap are different in structure from those in FIG. 2 or in FIG. 12, respectively. Moreover, even though the configuration in FIG. 16 is employed, the G class tap and the G prediction tap are the same in structure as those described above referring to FIG. 13, respectively.

FIGS. 17A to 17D are diagrams, each illustrating an example of a structure of the R class tap or the R prediction tap that is acquired in the image processing apparatus 180 in FIG. 16.

In each of the examples in FIGS. 17A to 17D, the class tap or the prediction tap is illustrated that is configured from the five pixels in the form of a cross. Furthermore, at this point, in a case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

FIG. 17A is a diagram illustrating an example of the class tap or the prediction tap in a case where in the pixels in the Bayer layer, the R component pixel is set to be the central pixel.

FIG. 17B is a diagram illustrating an example of the class tap or the prediction tap in a case where in the pixels in the Bayer layer, the G component pixel is set to be the central pixel.

FIG. 17C is a diagram illustrating an example of the class tap or the prediction tap in a case where in the pixels in the Bayer layer, the different G component pixel is set to be the central pixel.

FIG. 17D is a diagram illustrating an example of the class tap or the prediction tap in the case where in the pixels in the Bayer layer, the B component pixel is set to be the central pixel.

As illustrated in FIGS. 17A to 17D, the five pixels that make up the R class tap or the R prediction tap are all set to be the R component pixels, and do not include the G component pixel and the B component pixel. Furthermore, in FIGS. 17B to 17D, the pixel that is the center of the R class tap or the R prediction tap is set to be the pixel in a position adjacent to the original center pixel that is indicated by a hatched circle in the drawings.

Moreover, the class tap and the prediction tap may have the same structures or may have different structures.

FIGS. 18A to 18D are diagrams, each illustrating an example of a structure of the B class tap or the B prediction tap that is acquired in the image processing apparatus 180 in FIG. 16.

In each of the examples in FIGS. 18A to 18D, the class tap or the prediction tap is configured from the five pixels in the form of a cross. Furthermore, at this point, in a case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

Figures 18A, 18B, 18C, 18D:
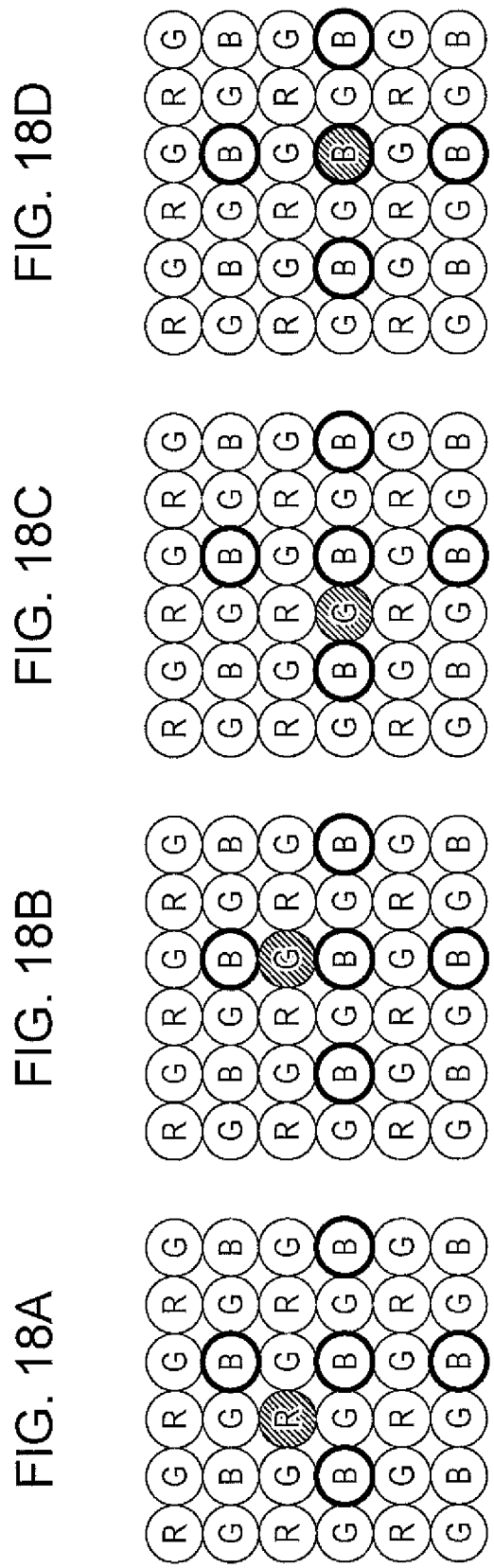
FIGS. 18A to 18D are diagrams, each illustrating an example of the structure of the class tap or the prediction tap that is acquired in the image processing apparatus in FIG. 12.

FIG. 18A is a diagram illustrating an example of the class tap or the prediction tap in a case where in the pixels in the Bayer layer, the R component pixel is set to be the central pixel.

FIG. 18B is a diagram illustrating an example of the class tap or the prediction tap in a case where in the pixels in the Bayer layer, the G component pixel is set to be the central pixel.

FIG. 18C is a diagram illustrating an example of the class tap or the prediction tap in a case where in the pixels in the Bayer layer, the different G component pixel is set to be the central pixel.

FIG. 18D is a diagram illustrating an example of the class tap or the prediction tap in a case where in the pixels in the Bayer layer, the B component pixel is set to be the central pixel.

As illustrated in FIGS. 18A to 18D, the five pixels that make up the B class tap or the B prediction tap are all set to be the B component pixel, and do not include the G component pixel and the R component pixel. Furthermore, in FIGS. 18A to 18C, the pixel that is the center of the B class tap or the B prediction tap is set to be the pixel in a position adjacent to the original center pixel that is indicated by a hatched circle in the drawings.

Moreover, the class tap and the prediction tap may have the same structures or may have different structures.

Referring back to FIG. 16, the R class tap selection unit 182-2 selects from the input image the R class tap that is a class tap necessary for generating the R component image and acquires the R class tap.

The R class tap selected by the R class tap selection unit 152-2 is supplied to the (R–G) conversion unit 185-21. The (R–G) conversion unit 185-21 is set to perform (R–G) conversion processing on each pixel value that makes up the R class tap, and a virtual color difference is calculated by the (R–G) conversion processing.

That is, the (R–G) conversion unit 185-21 performs the calculation in Equation (20) on each pixel value that makes up the R class tap and thus calculates a virtual color difference RGc.

$$RGc = R - g \qquad (20)$$

Moreover, the interpolation value g in Equation (20) is supplied from the representative RGB calculation unit 181.

The R class tap that is output from the (R–G) conversion unit 185-21 is supplied to an (R–G) class classification unit 186-2. Moreover, the R class tap that is output from the (R–G) conversion unit 185-21 is configured from the virtual color difference RGc that is calculated using Equation (20) described above.

The (R–G) class classification unit 186-2 codes the supplied R class tap by performing the adaptive dynamic range coding (ARRC), and thus generates a class code. The class code generated here is output to an (R–G) coefficient memory 187-2.

The (R–G) coefficient memory 187-2 reads the coefficient that is stored with it being mapped to the class code that is output from the (R–G) class classification unit 186-2. Then, the (R–G) coefficient memory 187-2 supplies the read coefficient to an (R–G) product and sum calculation unit 188-2. Moreover, the coefficient that is a coefficient obtained by prior learning and that is used in the product and sum calculation described below is stored in the (R–G) coefficient memory 187-2 with it being mapped to the class code.

Moreover, if the image processing apparatus 180 as configured in FIG. 16 is used, even when the learning is performed on the coefficient that is stored in the (R–G) coefficient memory 187-2, the learning for generating the R output image with the virtual color difference being set to be the class tap or the prediction tap is set to be performed as well.

The R prediction tap selection unit 183-2 selects from the input image an R prediction tap that is a prediction tap necessary for generating the R component image and acquires the R prediction tap.

The R prediction tap selected by the R prediction tap selection unit 183-2 is supplied to the (R–G) conversion unit 185-22. The (R–G) conversion unit 185-22 is set to perform (R–G) conversion processing on each pixel value that makes up the R prediction tap, and the virtual color difference is calculated by the (R–G) conversion processing.

The (R–G) conversion processing by the (R–G) conversion unit 185-22 is the same as that by the (R–G) conversion unit 185-21. That is, the virtual color difference RGc is calculated using Equation (20) described above.

The R prediction tap that is output from the (R–G) conversion unit 185-22 is supplied to the (R–G) product and sum calculation unit 188-2. Moreover, the R prediction tap that is output from the (R–G) conversion unit 185-21 is configured from the virtual color difference RGc that is calculated using Equation (20) described above.

The (R–G) product and sum calculation unit 188-2 performs the prediction calculation on (R–G) color difference of the observation pixel in the R component image (referred to as the R output image) that becomes the output image, based on the R prediction tap.

The R conversion unit 189-2 converts a prediction value (R–G)p of the (R–G) difference of the observation pixel that is output from the (R–G) product and sum calculation unit 188-2, for example, into a prediction value Rp for the pixel value of the R component by the calculation using Equation (21).

$$Rp = (R - G)p + Gp \qquad (21)$$

In this manner, the R output image can be obtained by predicting each observation pixel.

The B class tap selection unit 182-3 selects from the input image a B class tap that is a class tap necessary for generating the B component image and acquires the B class tap.

The B class tap selected by the B class tap selection unit 152-3 is supplied to the (B–G) conversion unit 185-31. The (B–G) conversion unit 185-31 is set to perform (B–G) conversion processing on each pixel value that makes up the B class tap, and the virtual color difference is calculated by the (B–G) conversion processing.

That is, the (B–G) conversion unit 185-31 performs the calculation in Equation (22) on each pixel value that makes up the B class tap and thus calculates a virtual color difference BGc.

$$BGc = B - g \qquad (22)$$

Moreover, the interpolation value g in Equation (22) is supplied from the representative RGB calculation unit 181.

The B class tap that is output from the (B–G) conversion unit 185-31 is supplied to a B class classification unit 186-3. Moreover, the B class tap that is output from the (B–G) conversion unit 185-31 is configured from the virtual color difference BGc that is calculated using Equation (20) described above.

The B class classification unit 186-3 codes the supplied B class tap by performing the adaptive dynamic range coding (ARRC), and thus generates a class code. The class code generated here is output to a (B–G) coefficient memory 187-3.

The (B–G) coefficient memory 187-3 reads the coefficient that is stored with it being mapped to the class code that is output from the B class classification unit 186-3. Then, the (B–G) coefficient memory 187-3 supplies the read coefficient to a (B–G) product and sum calculation unit 188-3. Moreover, the coefficient that is a coefficient obtained by prior learning and that is used in the product and sum calculation described below is stored in the (B–G) coefficient memory 187-3 with it being mapped to the class code.

Moreover, if the image processing apparatus 180 as configured in FIG. 16 is used, even when the learning is performed on the coefficient that is stored in the (B–G) coefficient memory 187-3, the learning for generating the B output image with the virtual color difference being set to be the class tap or the prediction tap is set to be performed as well.

The B prediction tap selection unit 183-3 selects from the input image a B prediction tap that is a prediction tap necessary for generating the B component image and acquires the B prediction tap.

The B prediction tap selected by the B prediction tap selection unit 183-3 is supplied to the (B–G) conversion unit 185-32. The (B–G) conversion unit 185-32 is set to perform (B–G) conversion processing on each pixel value that makes up the B prediction tap, and the virtual color difference is calculated by the (B–G) conversion processing.

The (B–G) conversion processing by the (B–G) conversion unit 185-32 is the same as that by the (B–G) conversion unit 185-31. That is, the virtual color difference BGc is calculated using Equation (22) described above.

The B prediction tap that is output from the (B–G) conversion unit 185-32 is supplied to the (B–G) product and sum calculation unit 188-3. Moreover, the B prediction tap that is output from the (B–G) conversion unit 185-31 is configured from the virtual color difference BGc that is calculated using Equation (22) described above.

The (B–G) product and sum calculation unit 188-3 performs the prediction calculation on (B–G) color difference of the observation pixel in the B component image (referred to as the B output image) that becomes the output image, based on the B prediction tap.

The B conversion unit 189-3 converts a prediction value (B–G)p of the (B–G) color difference of the observation pixel that is output from the (B–G) product and sum calculation unit 188-3, for example, into a prediction value Bp for the pixel value of the B component by the calculation using Equation (23).

$$Bp=(B-G)p+Gp \quad (23)$$

In this manner, the B output image can be obtained by predicting each observation pixel.

Furthermore, when the virtual color difference is calculated, the pixel value of each color component, for example, may be multiplied by a coefficient that is a matrix coefficient that is stipulated in BT 709, BT 601 and the like and that is used in performing a conversion from RGB into pb or pr. By doing this, a higher S/N ratio can be realized in the output image.

The example is described above in which each of the pixel values of the G output images with the same resolution, the R output image and the B output image is generated (predicted) based on the pixel value of the image corresponding to the image signal that is output from the image sensor of the one-chip camera.

However, each of the pixel values of the G output images with the different resolutions, the R output image, and the B output image also can be generated (predicted) based on the pixel value of the image corresponding to the image signal that is output from the image sensor of the one-chip camera. For example, each of the pixel values of the G output image, the R output image, and the B output image, each of which has the number of the pixels that exceeds the number of pixels that are arranged in the image sensor of the one-chip camera can be generated (predicted) and the resolution can be converted.

FIGS. 19A to 19D are diagrams for describing a relationship between the class tap or the prediction tap in a case of converting the resolution of the image configured from the pixels in the Bayer layout and positions of the pixels of the G output image, the R output image, and the B output image in the image processing apparatus 100 that is described above referring to FIG. 2. In each of the examples in FIGS. 19A to 19D, the class tap or the prediction tap is configured from nine (=3×3) pixels in which the central pixel is set to be the center.

Figure 19A:
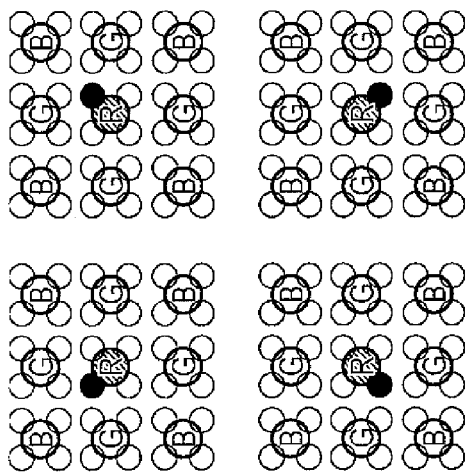
FIGS. 19A to 19D are diagrams for describing the class tap or the prediction tap in a case of converting a resolution of an image configured from pixels in a Bayer layout in the image processing apparatus in FIG. 2.

In FIG. 19A, among the pixels in the Bayer layout in the image sensor of the one-chip camera, the relationship is illustrated between the class tap or the prediction tap in a case where the R component pixel is set to be the central pixel and the positions of the pixels of the G output image, the R output image, and the B output image. In FIG. 19A, the pixel that is indicated by R written within a hatched circle is set to be the central pixel, and small black circles are set to be the positions of the pixels of the G output image, the R output image, and the B output image.

As illustrated in FIG. 19A, the pixels of the G output image, the R output image, and the B output image are arranged in the four positions in the vicinity of the R component pixel that is the central pixel. That is, four types of pixel values are predicted (generated) based on the nine prediction taps illustrated in FIG. 19A. Moreover, at this point, the G prediction tap, the R prediction tap, and the B prediction tap are set to have the same structure, and the four types of pixel values are set to be predicted (generated) for each of the G output image, the R output image, and the B output image.

Figure 19B:
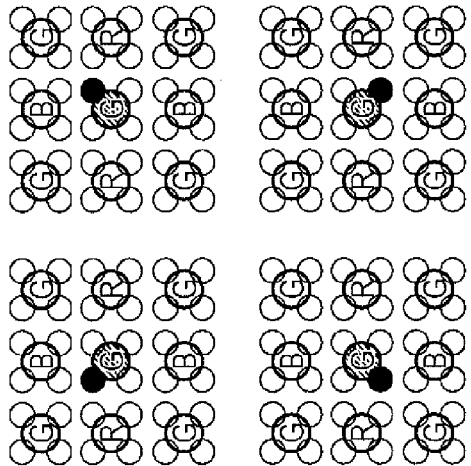

In FIG. 19B, among the pixels in the Bayer layout in the image sensor of the one-chip camera, the relationship is illustrated between the class tap or the prediction tap in a case where the G component pixel is set to be the central pixel and the positions of the pixels of the G output image, the R output image, and the B output image. In FIG. 19B, the pixel that is indicated by G written within a hatched circle is set to be the central pixel, and small black circles are set to be the positions of the pixels of the G output image, the R output image, and the B output image.

As illustrated in FIG. 19B, the pixels of the G output image, the R output image, and the B output image are arranged in the four positions in the vicinity of the G component pixel that is the central pixel. That is, the four types of pixel values are predicted (generated) based on the nine prediction taps illustrated in FIG. 19B. Moreover, at this point, the G prediction tap, the R prediction tap, and the B prediction tap are set to have the same structure, and the four types of pixel values are predicted (generated) for each of the G output image, the R output image, and the B output image.

Figure 19C:
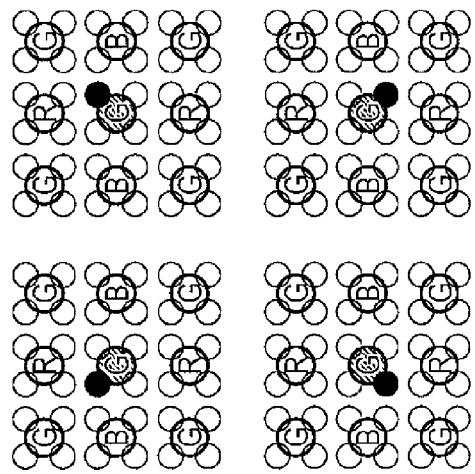
Figure 19D:
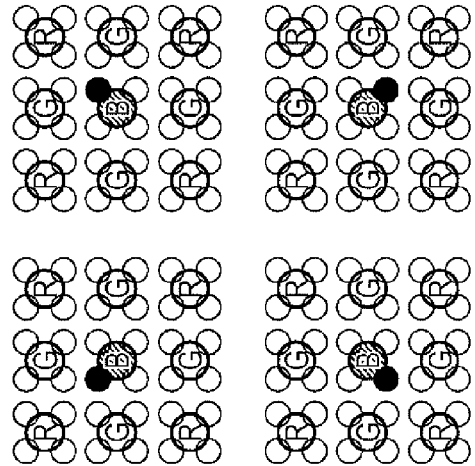

In the same manner, in FIG. 19C, among the pixels in the Bayer layout in the image sensor of the one-chip camera, the relationship is illustrated between the class tap or the prediction tap in a case where the different G component pixel is set to be the central pixel and the positions of the pixels of the G output image, the R output image, and the B output image. Furthermore, in FIG. 19D, among the pixels in the Bayer layout in the image sensor of the one-chip camera, the relationship is illustrated between the class tap or the prediction tap in a case where the B component pixel is set to be the central pixel and the positions of the pixels of the G output image, the R output image, and the B output image.

Incidentally, in recent years, a contrivance has been considered that increases pixel density of the image sensor of the one-chip camera. For example, the pixel density can be increased by obliquely changing the arrangement of the pixels in the Bayer layout in the image sensor.

Figures 20, 21:
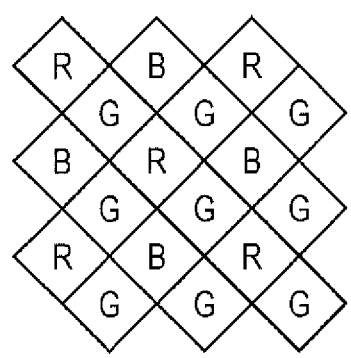
FIG. 20 is a diagram for describing an arrangement of the pixels in the Bayer layout.
FIG. 21 is a diagram for describing an arrangement of the pixels in an oblique Bayer layout.

For example, the arrangement of the pixels in the Bayer layout as illustrated in FIG. 20 is changed as illustrated in FIG. 21. The pixels of the image sensor are indicated by a small rectangle in FIG. 20 and FIG. 21, and letters R, G, and B written within the rectangles indicate the color components of each pixel.

When the pixels of the image sensor are arranged, for example, there is a limit to distance between the adjacent pixels in the upward, downward, leftward, and rightward directions in order to avoid a mixture of light and the like, and thus it is not possible to reduce the distance between the adjacent pixels to smaller than a given distance. However, the oblique arrangement of the pixels can increase the number of pixels per unit of area while maintaining the distance between the adjacent pixels in the upward, downward, leftward, and rightward directions.

For example, if the arrangement of the pixels in the Bayer layout illustrated in FIG. 20 is changed as illustrated in FIG. 21, twice the number of pixels can be arranged per the same area.

At this point, the arrangement of the pixels as illustrated in FIG. 21 is referred to as an oblique Bayer arrangement.

Figure 22A:
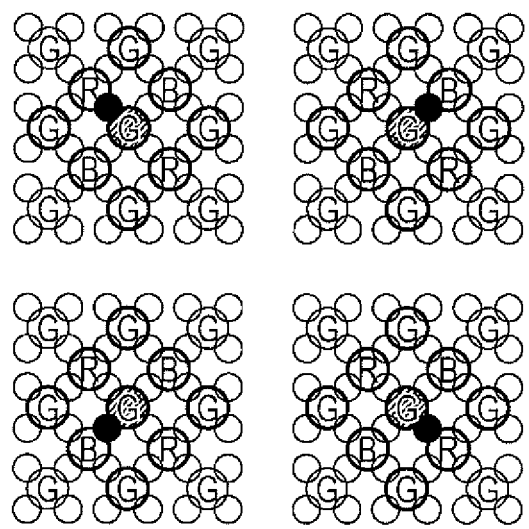
FIGS. 22A and 22B are diagrams for describing the class tap or the prediction tap in a case of converting a resolution of an image configured from the pixels in the oblique Bayer layout in the image processing apparatus in FIG. 2.
Figure 22B:
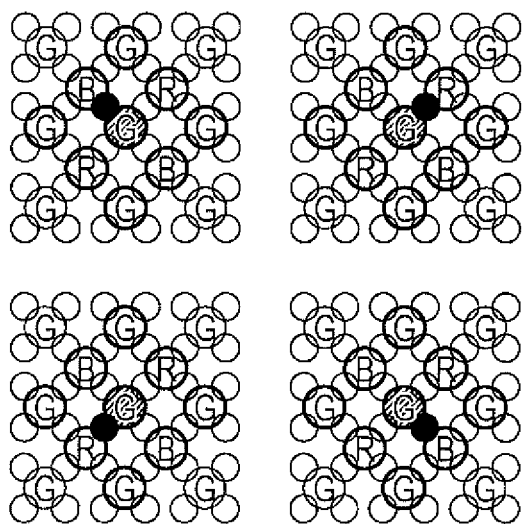

FIGS. 22A and 22B are diagrams for describing a relationship between the class tap or the prediction tap in a case of converting the resolution of the image configured from the pixels in the oblique Bayer layout and the positions of the pixels of the G output image, the R output image, and the B output image in the image processing apparatus 100 that is described above referring to FIG. 2. In examples in FIGS. 22A and 22B, the class tap or the prediction tap is configured from nine (=3×3) pixels in which the central pixel is set to be the center. In FIG. 19B, the pixel that is indicated by G written within a hatched circle is set to be the central pixel, and small black circles are set to be the positions of the pixels of the G output image, the R output image, and the B output image.

As illustrated in FIGS. 22A and 22B, the pixels of the G output image, the R output image, and the B output image are arranged between the G component pixel and the R component pixel or between the G component pixel and the B component pixel in the input image. Therefore, the class tap or the prediction tap in a case of converting the resolution of the image that is configured from the pixels in the oblique Bayer layout is such that the G component pixel is set to be the center, and the class tap or the prediction tap is acquired as illustrated in FIG. 22A or FIG. 22B.

Moreover, at this point, the G prediction tap, the R prediction tap, and the B prediction tap are set to have the same structure, and as illustrated in FIG. 22A or FIG. 22B, the pixel values are set to be predicted (generated) for each of the G output image, the R output image, and the B output image.

Furthermore, even though the resolution of the image is converted, for example, the G output image may be generated first, and then the R output image and the B output image may be set to be generated using the generated G output image. By doing this, the image processing that provides higher quality in terms of an amount of noise and resolution (frequency characteristics) can be performed.

FIGS. 23A to 23D are diagrams, each illustrating an example of the R class tap or the R prediction tap, or an example of the B class tap or the B prediction tap in a case of converting the resolution of the image configured from the pixels in the Bayer layout, in the image processing apparatus 150 that is described above referring to FIG. 12. In the examples in FIGS. 23A to 23D, the G class tap or the G prediction tap is configured from nine (=3×3) pixels in which the central pixel is set to be the center. As described above, the image processing apparatus 150 is first set to generate the G output image and then is set to generate the R output image and the B output image using the generated G output image.

Moreover, in the image processing apparatus 150 that is described above referring to FIG. 12, the relationship between the class tap or the prediction tap in the case of converting the resolution of the image configured from the pixels in the Bayer layout and the position of the pixel of the G output image is the same as in FIGS. 19A to 19D.

Therefore, in the image processing apparatus 150 that is described above referring to FIG. 12, the G prediction tap (or the G class tap) and the R prediction tap (or the R class tap) are different in structure from each other in the case of converting the resolution of the image configured from the pixels in the Bayer layout. Furthermore, the G prediction tap (or the G class tap) and the B prediction tap (or the B class tap) are different in structure from each other.

In FIGS. 23A to 23D, the pixel of the input image is indicated by a circle within which a letter R, G, or B is written, and four white circles in the vicinity of the circle within which the letter R, G, or B is written indicate the pixels of the G output image. Then, in the G output image, what are indicated by dotted line circles are set to be the class tap or the prediction tap, and a black dotted line circle indicates the central pixel of the class tap or the prediction tap.

Figure 23A:
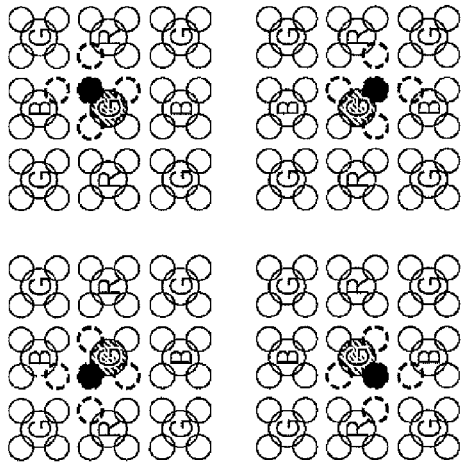
FIGS. 23A to 23D are diagrams for describing an example of the class tap or the prediction tap in the case of converting the resolution of the image configured from the pixels in the Bayer layout in the image processing apparatus in FIG. 12.

In FIG. 23A, in the case where the G prediction tap (or the G class tap) at the time of the generation of the G output image is such that the R component pixel is set to be the central pixel among the pixels in the Bayer layout in the image sensor of the one-chip camera, the R prediction tap (or the R class tap) or the B prediction tap (or the B class tap) is illustrated.

Figure 23B:
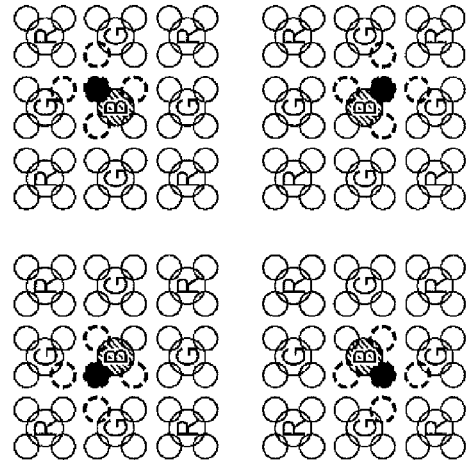

In FIG. 23B, in the case where the G prediction tap (or the G class tap) at the time of the generation of the G output image is such that the G component pixel is set to be the central pixel among the pixels in the Bayer layout in the image sensor of the one-chip camera, the R prediction tap (or the R class tap) or the B prediction tap (or the B class tap) is illustrated.

Figure 23C:
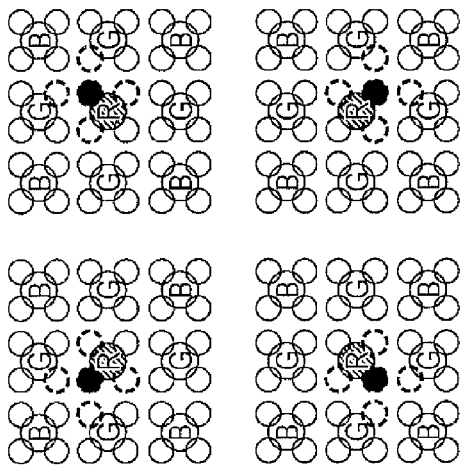

In FIG. 23C, in the case where the G prediction tap (or the G class tap) at the time of the generation of the G output image is such that the different G component pixel is set to be the central pixel among the pixels in the Bayer layout in the image sensor of the one-chip camera, the R prediction tap (or the R class tap) or the B prediction tap (or the B class tap) is illustrated.

Figure 23D:
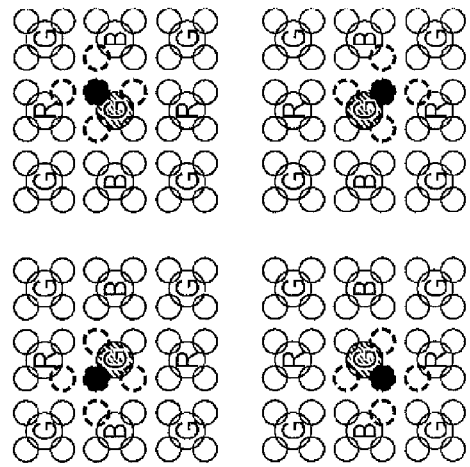

In FIG. 23D, in the case where the G prediction tap (or the G class tap) at the time of the generation of the G output image is such that the B component pixel is set to be the central pixel among the pixels in the Bayer layout in the image sensor of the one-chip camera, the R prediction tap (or the R class tap) or the B prediction tap (or the B class tap) is illustrated.

Figure 24A:
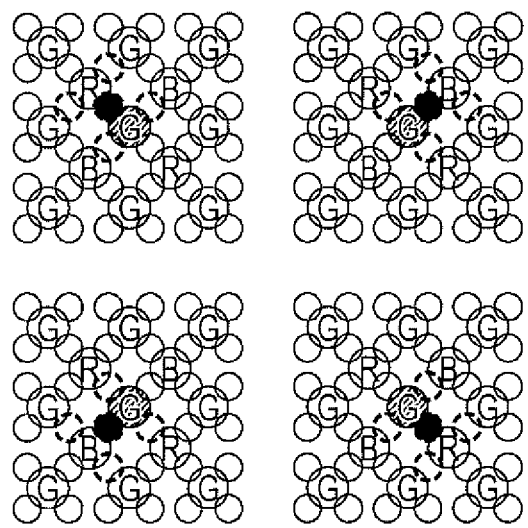
FIGS. 24A and 24B are diagrams for describing an example of the class tap or the prediction tap in the case of converting the resolution of the image configured from the pixels in the oblique Bayer layout in the image processing apparatus in FIG. 12.
Figure 24B:
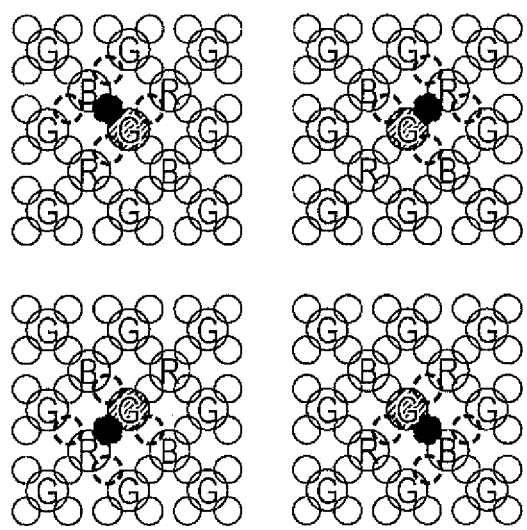

FIGS. 24A and 24B are diagrams, each illustrating an example of the R class tap or the R prediction tap, or an example of the B class tap or the B prediction tap in a case of converting the resolution of the image configured from the pixels in the oblique Bayer layout, in the image processing apparatus 150 that is described above referring to FIG. 12. In the examples in FIGS. 24A and 24B, the G class tap or the G prediction tap is configured from nine (=3×3) pixels in which the central pixel is set to be the center. As described above, the image processing apparatus 150 is first set to generate the G output image and then is set to generate the R output image and the B output image using the generated G output image.

Moreover, in the image processing apparatus 150 that is described above referring to FIG. 12, the relationship between the class tap or the prediction tap in the case of converting the resolution of the image configured from the pixels in the oblique Bayer layout and the position of the pixel of the G output image is the same as in FIGS. 22A to 22B.

Therefore, in the image processing apparatus 150 that is described above referring to FIG. 12, the G prediction tap (or the G class tap) and the R prediction tap (or the R class tap) are different in structure from each other in the case of converting the resolution of the image configured from the pixels in the oblique Bayer layout. Furthermore, the G prediction tap (or the G class tap) and the B prediction tap (or the B class tap) are different in structure from each other.

In FIGS. 24A and 24B, the pixel of the input image is indicated by a circle within which a letter R, G, or B is written, and four white circles in the vicinity of the circle within which the letter R, G, or B is written indicate the pixels of the G output image. Then, in the G output image, what are indicated by dotted line circles are set to be the class tap or the prediction tap, and a black dotted line circle indicates the central pixel of the class tap or the prediction tap.

In FIG. 24A, in the case where the G prediction tap (or the G class tap) at the time of the generation of the G output image is as illustrated in FIG. 22A, the R prediction tap (or the R class tap) or the B prediction tap (or the B class tap) is illustrated.

In FIG. 24B, in the case where the G prediction tap (or the G class tap) at the time of the generation of the G output image is as illustrated in FIG. 22B, the R prediction tap (or the R class tap) or the B prediction tap (or the B class tap) is illustrated.

Furthermore, also in the case of converting the resolution of the image, for example, the color difference is substituted for the pixel value, and thus the class classification, and the product and sum calculation may be performed.

FIGS. 25A to 25D are diagrams for describing a relationship between the G class tap or the G prediction tap in the case of converting the resolution of the image configured from the pixels in the Bayer layout and the position of the pixel of the G output image, in the image processing apparatus 180 that is described above referring to FIG. 16. In FIGS. 25A to 25D, the class tap or the prediction tap is configured from nine (=3×3) pixels in which the central pixel is set to be the center. Furthermore, at this point, in the case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

In FIGS. 25A to 25D, the pixel of the input image is indicated by a circle within which a letter R, G, or B is written, and four white circles in the vicinity of the circle within which the letter R, G, or B is written indicate the pixels of the G output image.

As described above, the image processing apparatus 180 is first set to generate the G output image and then is set to generate the R output image and the B output image using the generated G output image. However, the R class tap and the R prediction tap, and the B class tap and the B prediction tap are acquired directly from the input image. Furthermore, when the R output image and the B output image are generated using the generated G output image, the color difference is substituted for the pixel value, and thus the class classification and the product and sum calculation are set to be performed.

Figure 25A:
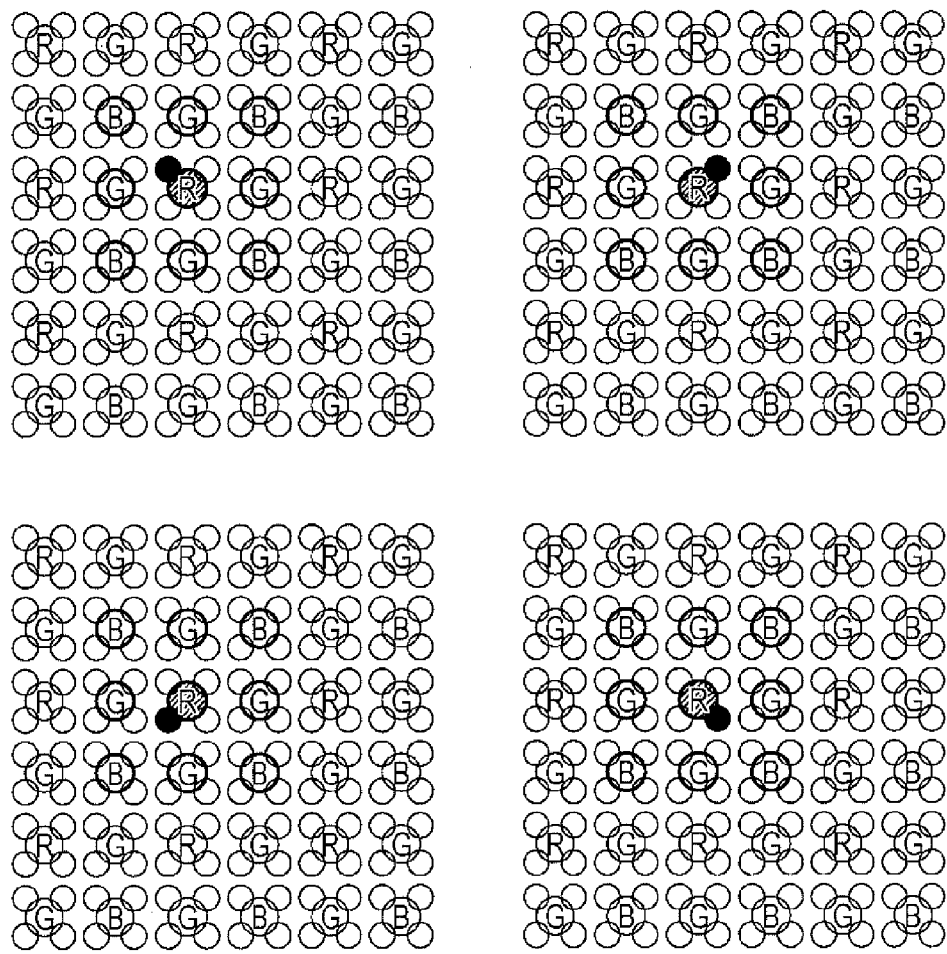

In FIG. 25A, among the pixels in the Bayer layout in the image sensor of the one-chip camera, the relationship is illustrated between the G class tap or the G prediction tap in the case where the R component pixel is set to be the central pixel and the position of the pixel of the G output image. In FIG. 25A, the pixel that is indicated by R written within a hatched circle is set to be the central pixel, and a small black circle is set to be the position of the pixel of the G output image that is generated from now on. Furthermore, in FIG. 25A, the positions of all the pixels of the G output image are indicated by small white circles for the sake of reference.

As illustrated in FIG. 25A, the pixels of the G output image are arranged in the four positions in the vicinity of the R component pixel that is the central pixel. That is, four types of pixel values are predicted (generated) based on the nine prediction taps illustrated in FIG. 25A.

In FIG. 25B, among the pixels in the Bayer layout in the image sensor of the one-chip camera, the relationship is illustrated between the G class tap or the G prediction tap in the case where the G component pixel is set to be the central pixel and the position of the pixel of the G output image. In FIG. 25B, the pixel that is indicated by G written within a hatched circle is set to be the central pixel, and a small black circle is set to be the position of the pixel of the G output image that is generated from now on. Furthermore, in FIG. 25B, the positions of all the pixels of the G output image are indicated by small white circles for the sake of reference.

As illustrated in FIG. 25B, the pixels of the G output image are arranged in the four positions in the vicinity of the G component pixel that is the central pixel. That is, the four types of pixel values are predicted (generated) based on the nine prediction taps illustrated in FIG. 25B.

Likewise, in FIG. 25C, among the pixels in the Bayer layout in the image sensor of the one-chip camera, the relationship is illustrated between the G class tap or the G prediction tap in the case where the different G component pixel is set to be the central pixel and the position of the pixel of the G output image. In FIG. 25D, among the pixels in the Bayer layout in the image sensor of the one-chip camera, the relationship is illustrated between the G class tap or the G prediction tap in the case where the B component pixel is set to be the central pixel and the position of the pixel of the G output image.

Moreover, the class tap and the prediction tap may have the same structures or may have different structures.

FIGS. 26A to 26D are diagrams for describing a relationship between the R class tap or the R prediction tap in the case of converting the resolution of the image configured from the pixels in the Bayer layout and the position of the pixel of the R output image, in the image processing apparatus 180 that is described above referring to FIG. 16. In each of the examples in FIGS. 26A to 26D, the class tap or the prediction tap is configured from the five pixels in the form of a cross.

Furthermore, at this point, in the case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

FIG. 26A is a diagram illustrating an example of the class tap or the prediction tap in a case where in the pixels in the Bayer layer, the R component pixel is set to be the central pixel.

In FIG. 26A, the pixel that is indicated by R written within a hatched circle is set to be the central pixel, and a small black circle is set to be the position of the pixel of the R output image that is generated from now on. Furthermore, in FIG. 26A, the positions of all the pixels of the R output image are indicated by small white circles for the sake of reference.

As illustrated in FIG. 26A, the pixels of the R output image are arranged in the four positions in the vicinity of the R component pixel that is the central pixel. That is, four types of pixel values are predicted (generated) based on the five prediction taps illustrated in FIG. 26A.

FIG. 26B is a diagram illustrating an example of the class tap or the prediction tap in a case where in the pixels in the Bayer layer, the G component pixel is set to be the central pixel.

In FIG. 26B, the pixel that is indicated by G written within a hatched circle is set to be the central pixel, and a small black circle is set to be the position of the pixel of the R output image that is generated from now on. Furthermore, in FIG. 26B, the positions of all the pixels of the R output image are indicated by small white circles for the sake of reference.

As illustrated in FIG. 26B, the pixels of the R output image are arranged in the four positions in the vicinity of the G component pixel that is the central pixel. That is, the four types of pixel values are predicted (generated) based on the five prediction taps illustrated in FIG. 26B.

In the same manner, FIG. 26C is a diagram illustrating an example of the class tap or the prediction tap in the case where in the pixels in the Bayer layout, the different G component pixel is set to be the central pixel. FIG. 26D is a diagram illustrating an example of the class tap or the prediction tap in the case where in the pixels in the Bayer layout, the B component pixel is set to be the central pixel.

As illustrated in FIGS. 26A to 26D, the five pixels that make up the R class tap or the R prediction tap are all set to be the R component pixels, and do not include the G component pixel and the B component pixel. Furthermore, in FIGS. 26B to 26D, the pixel that is the center of the R class tap or the R prediction tap is set to be the pixel in a position adjacent to the original center pixel that is indicated by a hatched circle in the drawings.

Moreover, the class tap and the prediction tap may have the same structures or may have different structures.

FIGS. 27A to 27D are diagrams for describing a relationship between the B class tap or the B prediction tap in the case of converting the resolution of the image configured from the pixels in the Bayer layout and the position of the pixel of the B output image, in the image processing apparatus 180 that is described above referring to FIG. 16. In each of the examples in FIGS. 27A to 27D, the class tap or the prediction tap is configured from the five pixels in the form of a cross.

Furthermore, at this point, in the case of the pixels in the Bayer layout that is configured from a unit of four pixels (one R component pixel, one B component pixel, and two G component pixels), an example of the structure of the class tap or the prediction tap in which each of the four unit pixels is set to be the central pixel is illustrated.

FIG. 27A is a diagram illustrating an example of the class tap or the prediction tap in a case where in the pixels in the Bayer layer, the R component pixel is set to be the central pixel.

In FIG. 27A, the pixel that is indicated by R written within a hatched circle is set to be the central pixel, and a small black circle is set to be the position of the pixel of the B output image that is generated from now on. Furthermore, in FIG. 27A, the positions of all the pixels of the B output image are indicated by small white circles for the sake of reference.

As illustrated in FIG. 27A, the pixels of the B output image are arranged in the four positions in the vicinity of the R component pixel that is the central pixel. That is, four types of pixel values are predicted (generated) based on the five prediction taps illustrated in FIG. 27A.

FIG. 27B is a diagram illustrating an example of the class tap or the prediction tap in a case where in the pixels in the Bayer layer, the G component pixel is set to be the central pixel.

In FIG. 27B, the pixel that is indicated by G written within a hatched circle is set to be the central pixel, and a small black circle is set to be the position of the pixel of the B output image that is generated from now on. Furthermore, in FIG. 27B, the positions of all the pixels of the B output image are indicated by small white circles for the sake of reference.

As illustrated in FIG. 27B, the pixels of the B output image are arranged in the four positions in the vicinity of the B component pixel that is the central pixel. That is, the four types of pixel values are predicted (generated) based on the five prediction taps illustrated in FIG. 27B.

In the same manner, FIG. 27C is a diagram illustrating an example of the class tap or the prediction tap in the case where in the pixels in the Bayer layout, the different G component pixel is set to be the central pixel. FIG. 27D is a diagram illustrating an example of the class tap or the prediction tap in the case where in the pixels in the Bayer layout, the B component pixel is set to be the central pixel.

As illustrated in FIGS. 27A to 27D, the five pixels that make up the B class tap or the B prediction tap are all set to be the B component pixels, and do not include the G component pixel and the R component pixel. Furthermore, in FIGS. 27A to 27C, the pixel that is the center of the B class tap or the B prediction tap is set to be the pixel in a position adjacent to the original center pixel that is indicated by a hatched circle in the drawings.

Moreover, the class tap and the prediction tap may have the same structures or may have different structures.

FIGS. 28A and 28B are diagrams illustrating an example of the R class tap or the R prediction tap in the case of converting the resolution of the image configured from the pixels in the oblique Bayer layout, in the image processing apparatus 180 that is described above referring to FIG. 16. As described above, the image processing apparatus 150 is first set to generate the G output image and then is set to generate the R output image and the B output image using the generated G output image. However, the R class tap and the R prediction tap, and the B class tap and the B prediction tap are acquired directly from the input image. Furthermore, when the R output image and the B output image are generated using the generated G output image, the color difference is substituted for the pixel value, and thus the class classification and the product and sum calculation are set to be performed.

Moreover, in the image processing apparatus 150 that is described above referring to FIG. 16, the relationship between the G class tap or the G prediction tap in the case of converting the resolution of the image configured from the pixels in the oblique Bayer layout and the position of the pixel of the G output image is the same as in FIGS. 22A to 22B.

In FIGS. 28A and 28B, the pixel of the input image is indicated by a circle within which a letter R, G, or B is written, and four white circles in the vicinity of the circle within which the letter R, G, or B is written indicate the pixels of the G output image, the pixels of the R output image or the pixels of the B output image.

In FIGS. 28A and 28B, the pixel that is indicated by G written within a hatched circle is set to be the central pixel, and a small black circle is set to be the position of the pixel of the R output image that is generated from now on. Furthermore, in FIGS. 28A and 28B, the positions of all the pixels of the R output image are indicated by small white circles for the sake of reference. At this point, the R class tap or the R prediction tap is configured from the six pixels in the form of a right- or left-oblique rectangle.

In FIG. 28A, in the case where the G prediction tap (or the G class tap) is as illustrated in FIG. 22A, the R prediction tap or the R class tap is illustrated.

In FIG. 28B, in the case where the G prediction tap (or the G class tap) is as illustrated in FIG. 22B, the R prediction tap or the R class tap is illustrated.

As illustrated in FIGS. 28A and 28B, the pixels of the R output image are arranged in the four positions in the vicinity of the G component pixel that is the central pixel. That is, four types of pixel values are predicted (generated) based on the six prediction taps illustrated in FIGS. 28A and 28B.

FIGS. 29A and 29B are diagrams illustrating an example of the B class tap or the B prediction tap in the case of converting the resolution of the image configured from the pixels in the oblique Bayer layout, in the image processing apparatus 180 that is described above referring to FIG. 16.

In FIGS. 29A and 29B, the pixel of the input image is indicated by a circle within which a letter R, G, or B is written, and four white circles in the vicinity of the circle within which the letter R, G, or B is written indicate the pixels of the G output image, the pixels of the R output image or the pixels of the B output image.

In FIGS. 29A and 29B, the pixel that is indicated by G written within a hatched circle is set to be the central pixel, and a small black circle is set to be the position of the pixel of the R output image that is generated from now on. Furthermore, in FIGS. 29A and 29B, the positions of all the pixels of the B output image are indicated by small white circles for the sake of reference. At this point, the B class tap or the B prediction tap is configured from the six pixels in the form of a rectangle that is oblique to the left or to the right.

In FIG. 29A, in the case where the G prediction tap (or the G class tap) is as illustrated in FIG. 22A, the B prediction tap or the B class tap is illustrated.

In FIG. 29B, in the case where the G prediction tap (or the G class tap) is as illustrated in FIG. 22B, the B prediction tap or the B class tap is illustrated.

As illustrated in FIG. 29A or 29B, the pixels of the R output image are arranged in the four positions in the vicinity of the G component pixel that is the central pixel. That is, four types of pixel values are predicted (generated) based on the six prediction taps illustrated in FIG. 29A or 29B.

In this manner, according to the present technology, each of the pixel values of the G output images with the different resolutions, the R output image, and the B output image also can be generated (predicted) based on the pixel value of the image corresponding to the image signal that is output from the image sensor of the one-chip camera. For example, at this time, for example, the resolution of the image corresponding to the image signal that is output from the image sensor in the oblique Bayer arrangement, in which the pixel density is set to be increased, can be converted by obliquely changing the arrangement of the pixels in the Bayer layout in the image sensor.

Moreover, a sequence of processing operations described above may be executed in hardware and may be executed in software. If the sequence of processing operations described above is executed in software, a program for executing the sequence of processing operations in software is installed from a recording medium or over a network on a computer that is built into dedicated hardware, or on a general-purpose personal computer 700 capable of executing various functions by installing various programs, for example one as illustrated in FIG. 30.

Figure 30:
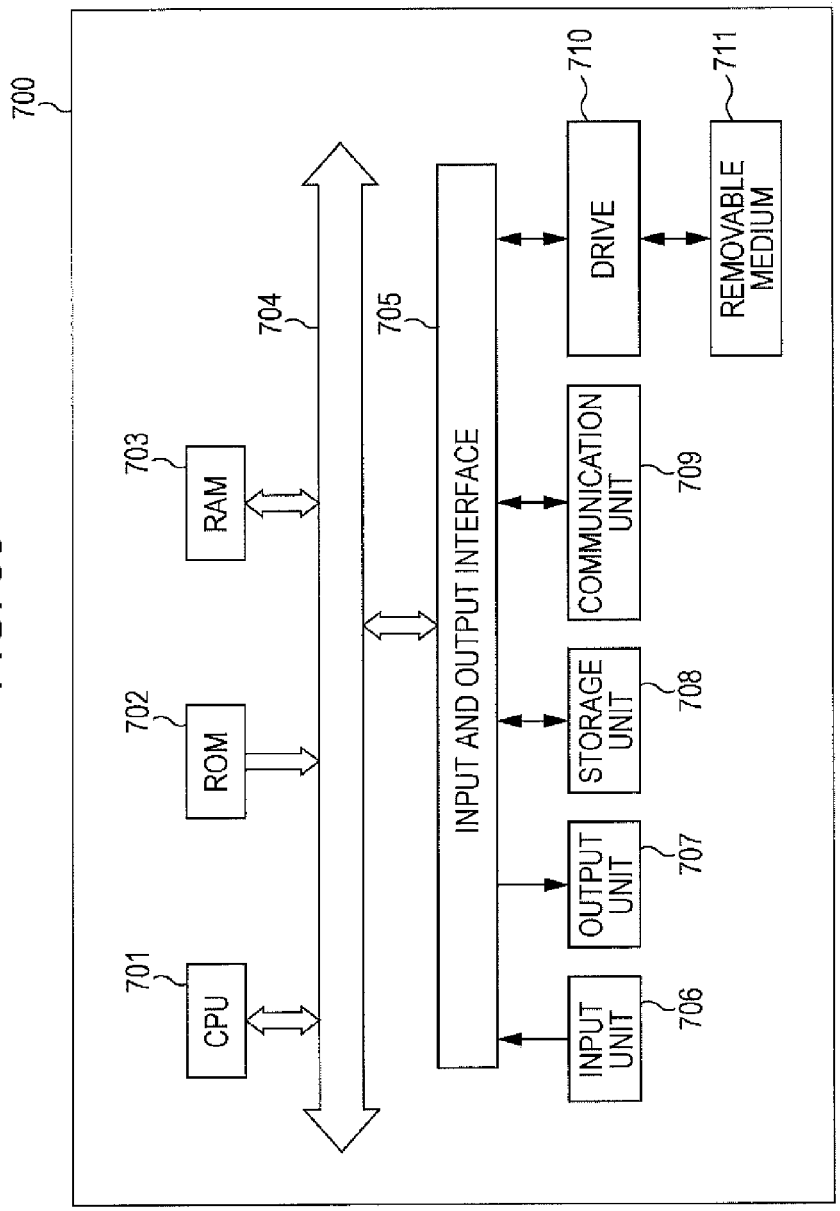
FIG. 30 is a block diagram illustrating a configuration example of a personal computer.

In FIG. 30, a central processing unit (CPU) 701 executes various processing operations according to the program that is stored in a read only memory (ROM) 702 or the program that is loaded from a storage unit 708 onto a random access memory (RAM) 703. Data, necessary for CPU 701 to perform various processing operations, and the like are properly stored in RAM 703.

CPU 701, ROM 702, and RAM 703 are connected to one another through a bus 704. An input and output interface 705 is also connected to the bus 704.

To the input and output interface 705 is connected an input unit 706, such as a keyboard or a mouse, a display, made from a liquid crystal display (LCD) and the like, an output unit 707, made from a speaker and the like, a storage unit 708, configured from a hard disk and the like, and a communication unit 709, configured from a network interface card, such as a modem, or a LAN card. The communication unit 709 performs communication processing over networks including the Internet.

A drive 710 is connected to the input and output interface 705 whenever necessary, and a magnetic disk, an optical disc, an optical magnetic disc, or a removable medium 711 such as a semiconductor memory is properly mounted to the input and output interface 705. A computer program that is read from these is installed on the storage unit 708 whenever necessary.

If the sequence of processing operations described above is executed in software, the program for executing the sequence of processing operations in software is installed over a network such as the Internet, or through the recording medium, made from the removable medium 711.

Moreover, the recording medium is configured from a magnetic disk (including a floppy disk (registered trademark)), an optical disc (including a Compact Disc-Read Only Memory (CD-ROM), and a digital versatile disc (DVD)), an optical magnetic disc (including a Mini-Disc (MD) (registered trademark)), or the removable medium 711, made from a semiconductor memory and the like in which the program is stored, which is distributed in order to deliver the program to a user separately from a main body of an apparatus illustrated in FIG. 30. In addition, the recording medium is configured from ROM 702 or the hard disk included in the storage unit 708, which is delivered to a user in a state where it is in advance built into the main body of the apparatus and on which the program is stored.

In the present disclosure, the sequence of processing operation described above includes not only processing that is performed in time series according to an order created, but also processing that although necessarily performed in time series, is performed in parallel or individually.

Moreover, embodiments of the present technology are not limited to the embodiments described above and various modifications can be made within a scope not departing from the gist of the present technology.

Moreover, the present technology can have the following configurations.

(1)

An image processing apparatus including a representative value calculation unit that selects a designation area that is an area which is configured from a predetermined number of pixels, from a first image which is configured by using an image signal which is output from a one-chip pixel unit in which pixels corresponding to each color component in multiple color components are regularly arranged on a plane, and that calculates a representative value of each of the color components in the designation area; a class classification unit that performs class classification on the designation area, based on an amount of characteristics that are obtained from a pixel value of the designation area; a coefficient reading unit that reads a coefficient that is stored in advance, based on a result of performing the class classification; a color component conversion unit that sets the pixel value relating to a predetermined pixel within the designation area to be a prediction tap, sets the pixel value of one color component, among the multiple color components, to be a reference, and converts the pixel value of each color component of the prediction tap into a conversion value that is obtained by performing offset using the representative value; and a product and sum calculation unit that sets the conversion value to be a variable and calculates each of the pixel values of a second image which is configured from only the pixels corresponding to each color component in the multiple color components and which is an image different in resolution from the first image, by performing product and sum calculation which uses the coefficient which is read.

(2)

The image processing apparatus according to (1), in which the one-chip pixel unit is a pixel unit that has R, G, and B color components; and in which the representative value calculation unit calculates an interpolation value g of the R or B pixel, based on the G pixel in the vicinity of the R or B pixel, calculates an interpolation value r and an interpolation value b of each of the G pixels, based on the R pixel or the B pixel in the vicinity of the G pixel, calculates the representative value of G by using an average value of an input value G obtained directly from the G pixel and the interpolation value g, calculates the representative value of R, based on a difference between the interpolation value r and the input value G and a difference between the input value R directly obtained from the R pixel and the interpolation value g, and the representative value of the G, and calculates the representative value of B, based on a difference between the interpolation value b and the input value G and a difference between the input value B obtained directly from the B pixel and interpolation value g, and the representative value of the G.

(3)

The image processing apparatus according to (2), in which if the second image is an image that is configured from only the G pixels, the color component conversion unit offsets the input value R by using a difference between the representative value of the R and the representative value of the G, and offsets the input value B by using a difference between the representative value of the B and the representative value of the G; in which if the second image is an image that is configured from only the R pixels, the color component conversion unit offsets the input value G by using a difference between the representative value of the G and the representative value of the R, and offsets the input value B by using a difference between the representative value of the B and the representative value of the R; and in which if the second image is an image that is configured from only the B pixels, the color component conversion unit offsets the input value G by using a difference between the representative value of the G and the representative value of the B, and offsets the input value R by using a difference between the representative value of the R and the representative value of the B.

(4)

The image processing apparatus according to (3), in which the one-chip image unit is set to be a pixel unit in an oblique Bayer layout in which the pixels in the Bayer layout are obliquely arranged.

(5)

The image processing apparatus according to any one of (1) to (4), in which if the second image that is configured from only first color components is generated, among the images with the multiple color components, and the second image that is configured from only second color components different from the first color components is generated, among the images with the multiple color components, the prediction tap is acquired from the second image that is configured from only the first color components.

(6)

The image processing apparatus according to any one of (1) to (5), further including a virtual color difference calculation unit that calculates a virtual color difference of the prediction tap, in which if the second image that is configured from only the second color components different from the first color components is generated among the images with the multiple color components, the product and sum calculation unit sets the virtual color difference of the prediction tap to be the variable and calculates the virtual color difference of the second image by performing the product and sum calculation that uses the coefficient that is read; and in which the prediction tap that is configured from only the pixels corresponding to the second color component is acquired from the designation area in the first image.

(7)

The image processing apparatus according to (6), in which the virtual color difference calculation unit calculates the virtual color difference by multiplying the value of the pixel that makes up the prediction tap by a matrix coefficient that is stipulated by specification for color space.

(8)

The image processing apparatus according to any one of (1) to (7), further including a different color component conversion unit that sets the pixel value relating to a predetermined pixel within the designation area to be a class tap, sets the pixel value of one color component, among the multiple color components, to be a reference, and converts the pixel value of each color component of the class tap into a conversion value that is obtained by performing offset using the representative value, in which the class classification unit determines an amount of characteristics of the class tap, based on the conversion value that results from the conversion by the different color component conversion unit.

(9)

The image processing apparatus according to any one of (1) to (8), in which the coefficient that is read by the coefficient reading unit is obtained by prior learning; in which in the prior learning, the image that is configured by using each of the image signals that are output from the multiple pixel units, which are arranged in a position near a photographic subject, and each of which is configured from only the pixels corresponding to each of the multiple color components is set to be a teacher image by using an optical low pass filter that is arranged between the one-chip pixel unit and the photographic subject; in which the image that is configured by using the image signal that is output from the one-chip pixel unit is set to be a student image; and in which the coefficient is calculated by solving a normal equation in which the pixel of the student image and the pixel of the teacher image are mapped to each other.

(10)

An image processing method including enabling a representative value calculation unit to select a designation area that is an area which is configured from a predetermined number of pixels, from a first image which is configured by using an image signal which is output from a one-chip pixel unit in which pixels corresponding to each color component in multiple color components are regularly arranged on a plane, and to calculate a representative value of each of the color components in the designation area; enabling a class classification unit to perform class classification on the designation area, based on an amount of characteristics that are obtained from a pixel value of the designation area; enabling a coefficient reading unit to read a coefficient that is stored in advance, based on a result of performing the class classification; enabling a color component conversion unit to set the pixel value relating to a predetermined pixel within the designation area to be a prediction tap, to set the pixel value of one color component, among the multiple color components, to be a reference, and to convert the pixel value of each color component of the prediction tap into a conversion value that is obtained by performing offset using the representative value; and enabling a product and sum calculation unit to set the conversion value to be a variable and to calculate each of the pixel values of a second image which is configured from only the pixels corresponding to each color component in the multiple color components and which is an image different in resolution from the first image, by performing product and sum calculation which uses the coefficient which is read.

(11)

A program for causing a computer to function as an image processing apparatus including a representative value calculation unit that selects a designation area that is an area which is configured from a predetermined number of pixels, from a first image which is configured by using an image signal which is output from a one-chip pixel unit in which pixels corresponding to each color component in multiple color components are regularly arranged on a plane, and that calculates a representative value of each of the color components in the designation area; a class classification unit that performs class classification on the designation area based on an amount of characteristics that are obtained from a pixel value of the designation area; a coefficient reading unit that reads a coefficient that is stored in advance based on a result of performing the class classification; a color component conversion unit that sets the pixel value relating to a predetermined pixel within the designation area to be a prediction tap, sets the pixel value of one color component, among the multiple color components, to be a reference, and converts the pixel value of each color component of the prediction tap into a conversion value that is obtained by performing offset using the representative value; and a product and sum calculation unit that sets the conversion value to be a variable and calculates each of the pixel values of a second image which is configured from only the pixels corresponding to each color component in the multiple color components and which is an image which is different in resolution from the first image, by performing product and sum calculation which uses the coefficient which is read.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a representative value calculation unit that selects a designation area that is an area which is configured from a predetermined number of pixels, from a first image which is configured by using an image signal which is output from a one-chip pixel unit in which pixels corresponding to each color component in multiple color components are regularly arranged on a plane, and that calculates a representative value of each of the color components in the designation area;
a class classification unit that performs class classification on the designation area, based on an amount of characteristics that are obtained from a pixel value of the designation area;
a coefficient reading unit that reads a coefficient that is stored in advance, based on a result of performing the class classification;
a color component conversion unit that sets the pixel value relating to a predetermined pixel within the designation area to be a prediction tap, sets the pixel value of one color component, among the multiple color components, to be a reference, and converts the pixel value of each color component of the prediction tap into a conversion value that is obtained by performing offset using the representative value; and
a product and sum calculation unit that sets the conversion value to be a variable and calculates each of the pixel values of a second image which is configured from only the pixels corresponding to each color component in the multiple color components and which is an image different in resolution from the first image, by performing product and sum calculation which uses the coefficient which is read.

2. The image processing apparatus according to claim 1,
wherein the one-chip pixel unit is a pixel unit that has R, G, and B color components, and
wherein the representative value calculation unit,
calculates an interpolation value g of the R or B pixel, based on the G pixel in the vicinity of the R or B pixel,
calculates an interpolation value r and an interpolation value b of each of the G pixels, based on the R pixel or the B pixel in the vicinity of the G pixel,
calculates the representative value of G by using an average value of an input value G obtained directly from the G pixel and the interpolation value g,
calculates the representative value of R, based on a difference between the interpolation value r and the input value G and a difference between the input value R directly obtained from the R pixel and the interpolation value g, and the representative value of the G, and
calculates the representative value of B, based on a difference between the interpolation value b and the input value G and a difference between the input value B obtained directly from the B pixel and interpolation value g, and the representative value of the G.

3. The image processing apparatus according to claim 2,
wherein if the second image is an image that is configured from only the G pixels,
the color component conversion unit offsets the input value R by using a difference between the representative value of the R and the representative value of the G, and
offsets the input value B by using a difference between the representative value of the B and the representative value of the G,
wherein if the second image is an image that is configured from only the R pixels,
the color component conversion unit offsets the input value G by using a difference between the representative value of the G and the representative value of the R, and
offsets the input value B by using a difference between the representative value of the B and the representative value of the R, and
wherein if the second image is an image that is configured from only the B pixels,
the color component conversion unit offsets the input value G by using a difference between the representative value of the G and the representative value of the B, and
offsets the input value R by using a difference between the representative value of the R and the representative value of the B.

4. The image processing apparatus according to claim 3,
wherein the one-chip image unit is set to be a pixel unit in an oblique Bayer layout in which the pixels in the Bayer layout are obliquely arranged.

5. The image processing apparatus according to claim 1,
wherein if the second image that is configured from only first color components is generated, among the images with the multiple color components, and
the second image that is configured from only second color components different from the first color components is generated, among the images with the multiple color components,
the prediction tap is acquired from the second image that is configured from only the first color components.

6. The image processing apparatus according to claim 1, further comprising:
a virtual color difference calculation unit that calculates a virtual color difference of the prediction tap,
wherein if the second image that is configured from only the second color components different from the first color components is generated among the images with the multiple color components,
the product and sum calculation unit sets the virtual color difference of the prediction tap to be the variable and calculates the virtual color difference of the second image by performing the product and sum calculation that uses the coefficient that is read, and
wherein the prediction tap that is configured from only the pixels corresponding to the second color component is acquired from the designation area in the first image.

7. The image processing apparatus according to claim 6, wherein the virtual color difference calculation unit calculates the virtual color difference by multiplying the value of the pixel that makes up the prediction tap by a matrix coefficient that is stipulated by specification for color space.

8. The image processing apparatus according to claim 1, further comprising:
a different color component conversion unit that sets the pixel value relating to a predetermined pixel within the designation area to be a class tap, sets the pixel value of one color component, among the multiple color components, to be a reference, and converts the pixel value of each color component of the class tap into a conversion value that is obtained by performing offset using the representative value,
wherein the class classification unit determines an amount of characteristics of the class tap, based on the conversion value that results from the conversion by the different color component conversion unit.

9. The image processing apparatus according to claim 1, wherein the coefficient that is read by the coefficient reading unit is obtained by prior learning,
wherein in the prior learning,
the image that is configured by using each of the image signals that are output from the multiple pixel units, which are arranged in a position near a photographic subject, and each of which is configured from only the pixels corresponding to each of the multiple color components is set to be a teacher image by using an optical low pass filter that is arranged between the one-chip pixel unit and the photographic subject,
wherein the image that is configured by using the image signal that is output from the one-chip pixel unit is set to be a student image, and
wherein the coefficient is calculated by solving a normal equation in which the pixel of the student image and the pixel of the teacher image are mapped to each other.

10. An image processing method comprising:
enabling a representative value calculation unit to select a designation area that is an area which is configured from a predetermined number of pixels, from a first image which is configured by using an image signal which is output from a one-chip pixel unit in which pixels corresponding to each color component in multiple color components are regularly arranged on a plane, and to calculate a representative value of each of the color components in the designation area;
enabling a class classification unit to perform class classification on the designation area, based on an amount of characteristics that are obtained from a pixel value of the designation area;
enabling a coefficient reading unit to read a coefficient that is stored in advance, based on a result of performing the class classification;
enabling a color component conversion unit to set the pixel value relating to a predetermined pixel within the designation area to be a prediction tap, to set the pixel value of one color component, among the multiple color components, to be a reference, and to convert the pixel value of each color component of the prediction tap into a conversion value that is obtained by performing offset using the representative value; and
enabling a product and sum calculation unit to set the conversion value to be a variable and to calculate each of the pixel values of a second image which is configured from only the pixels corresponding to each color component in the multiple color components and which is an image different in resolution from the first image, by performing product and sum calculation which uses the coefficient which is read.

11. A non-transitory computer-readable medium on which is recorded a program for causing a computer to function as an image processing apparatus comprising:
a representative value calculation unit that selects a designation area that is an area which is configured from a predetermined number of pixels, from a first image which is configured by using an image signal which is output from a one-single pixel unit in which pixels corresponding to each color component in multiple color components are regularly arranged on a plane, and that calculates a representative value of each of the color components in the designation area,
a class classification unit that performs class classification on the designation area, based on an amount of characteristics that are obtained from a pixel value of the designation area,
a coefficient reading unit that reads a coefficient that is stored in advance, based on a result of performing the class classification,
a color component conversion unit that sets the pixel value relating to a predetermined pixel within the designation area to be a prediction tap, sets the pixel value of one color component, among the multiple color components, to be a reference, and converts the pixel value of each color component of the prediction tap into a conversion value that is obtained by performing offset using the representative value, and
a product and sum calculation unit that sets the conversion value to be a variable and calculates each of the pixel values of a second image which is configured from only the pixels corresponding to each color component in the multiple color components and which is an image different in resolution from the first image, by performing product and sum calculation which uses the coefficient which is read.

* * * * *